(12) United States Patent
Warmus et al.

(10) Patent No.: US 6,205,452 B1
(45) Date of Patent: Mar. 20, 2001

(54) METHOD OF REPRODUCING VARIABLE GRAPHICS IN A VARIABLE IMAGING SYSTEM

(75) Inventors: James L. Warmus, LaGrange; Mark G. Dreyer, Aurora, both of IL (US); Daniel W. Beery, Cumming, GA (US)

(73) Assignee: R. R. Donnelley & Sons Company, Downers Grove, IL (US)

( * ) Notice: Subject to any disclaimer, the term of this patent is extended or adjusted under 35 U.S.C. 154(b) by 0 days.

(21) Appl. No.: 08/959,683

(22) Filed: Oct. 29, 1997

(51) Int. Cl.[7] ............................. G06F 15/00; G06F 17/00
(52) U.S. Cl. ........................................... 707/500; 707/503
(58) Field of Search .................................... 707/500, 505, 707/517, 104, 515, 506, 100, 102, 520, 526, 513, 50; 358/449, 452, 448; 345/470, 116, 118

(56) References Cited

U.S. PATENT DOCUMENTS

| Re. 32,690 | 6/1988 | Wong ........................................ 270/54 |
|---|---|---|
| 3,872,460 | 3/1975 | Fredrickson et al. .......... 340/324 AD |
| 3,892,427 | 7/1975 | Kraynak et al. ..................... 281/15 R |
| 3,899,165 | 8/1975 | Abram et al. ........................... 270/54 |
| 3,982,744 | 9/1976 | Kraynak et al. ........................ 270/12 |
| 4,095,780 | 6/1978 | Gaspar et al. .......................... 270/73 |
| 4,121,818 | 10/1978 | Riley et al. ............................. 270/54 |
| 4,395,031 | 7/1983 | Gruber et al. .......................... 270/54 |

(List continued on next page.)

FOREIGN PATENT DOCUMENTS

| 0 602 547 | 6/1994 | (EP) ......................................... 15/20 |
|---|---|---|
| 0 703 524 A1 | 3/1996 | (EP) . |
| 0 703 524 B1 | 1/1997 | (EP) . |
| PCT/US86/ 00242 | 8/1986 | (WO) . |
| WO 95 07510 | 3/1995 | (WO) ....................................... 17/24 |

OTHER PUBLICATIONS

Keizer, One of six evaluation of presentation software packages for the IBM PC and Apple Macintosh, Computer Shoppers, p. 554, Aug. 1992.*

"Agfa's CR–A RIP varies data," *Seybold Special Report*, vol. 3, No. 2 (Oct. 10, 1994).

"Agfa poised to enter short–run color market. (Chromapress electrophotographic digital press system)," *MacWeek*, p. 18 (Oct. 31, 1994).

"Agfa Holds Expo, US Launch of ChromaPress Digital Printing," *Newsbytes News Network* (Nov. 4, 1994).

"The Latest Word," *The Seybold Report on Publishing Systems*, vol. 24, No. 6, (Nov. 30, 1994).

(List continued on next page.)

*Primary Examiner*—Joseph H. Feild
*Assistant Examiner*—Alford W Kindred
(74) *Attorney, Agent, or Firm*—Marshall, O'Toole, Gerstein, Murray & Borun

(57) ABSTRACT

The present invention comprises an apparatus and method for reproducing master and variable information, including variable graphics information, on a display device, such as a computer network or a demand printer. Variable graphics information is stored in a database. A user is prompted to specify graph parameters (i.e. graph type, size, labels, etc.) or default values are used. Template page files containing fixed information and placeholders for variable information are generated. Image boxes are used as placeholders for variable graphics information and an executable graph file is placed in the image boxes. A text box containing the specified graph parameters and variable graphics information from the database is layered over the image box and "tagged" to specify that it contains variable graphics information. During interpretation of the page file, an interpreter (RIP) determines if a text box is "tagged" and, if so, executes the graph file to generate a graph using the specified graph parameters and variable graphics information from the database.

52 Claims, 46 Drawing Sheets

U.S. PATENT DOCUMENTS

| | | | |
|---|---|---|---|
| 4,426,072 | 1/1984 | Cole et al. | 270/53 |
| 4,495,582 | 1/1985 | Dessert et al. | 364/469 |
| 4,500,083 | 2/1985 | Wong | 270/54 |
| 4,536,176 | 8/1985 | Gaspar | 493/365 |
| 4,554,044 | 11/1985 | Gaspar et al. | 156/510 |
| 4,601,003 | 7/1986 | Yoneyama et al. | 364/518 |
| 4,616,327 | 10/1986 | Rosewarne et al. | 364/518 |
| 4,672,462 | 6/1987 | Yamada | 358/280 |
| 4,674,052 | 6/1987 | Wong et al. | 364/466 |
| 4,718,784 | 1/1988 | Drisko | 400/68 |
| 4,727,402 | 2/1988 | Smith | 355/14 SH |
| 4,729,037 | 3/1988 | Doelves . | |
| 4,768,766 | 9/1988 | Berger et al. | 270/58 |
| 4,789,147 | 12/1988 | Berger et al. | 270/1.1 |
| 4,800,510 | 1/1989 | Vinberg et al. | 364/521 |
| 4,827,315 | 5/1989 | Woldberg et al. | 346/160 |
| 4,900,001 | 2/1990 | Lapeyre | 270/1.1 |
| 4,903,139 | 2/1990 | Minter | 358/296 |
| 4,910,612 | 3/1990 | Yamazaki | 358/496 |
| 4,928,252 | 5/1990 | Gabbe et al. | 364/519 |
| 4,933,880 | 6/1990 | Borgendale et al. | 364/523 |
| 4,937,761 | 6/1990 | Hassett | 364/518 |
| 4,968,993 | 11/1990 | Wolfberg et al. | 346/160 |
| 4,974,171 | 11/1990 | Yeh et al. | 364/519 |
| 5,001,500 | 3/1991 | Wolfberg et al. | 346/160 |
| 5,021,975 | 6/1991 | Yamanashi | 364/519 |
| 5,033,009 | 7/1991 | Dubnoff | 364/523 |
| 5,043,749 | 8/1991 | Punater et al. | 346/153.1 |
| 5,067,024 | 11/1991 | Anzai | 358/296 |
| 5,105,283 | 4/1992 | Forest et al. | 358/401 |
| 5,112,179 | 5/1992 | Chan et al. | 412/1 |
| 5,114,291 | 5/1992 | Hefty | 412/8 |
| 5,133,051 | 7/1992 | Handley . | |
| 5,136,316 | 8/1992 | Punater et al. | 346/153.1 |
| 5,142,618 * | 8/1992 | Fujiwara et al. | 707/516 |
| 5,142,667 | 8/1992 | Dimperio et al. . | |
| 5,144,562 | 9/1992 | Stikkelorum et al. | 364/478 |
| 5,177,877 | 1/1993 | Duchesne et al. | 34/51 |
| 5,178,063 | 1/1993 | Wolfberg et al. | 101/76 |
| 5,194,899 | 3/1993 | Buchanan | 355/244 |
| 5,245,701 | 9/1993 | Matsumoto | 395/129 |
| 5,267,155 | 11/1993 | Buchanan et al. . | |
| 5,271,065 | 12/1993 | Rourke et al. . | |
| 5,274,567 | 12/1993 | Kallin et al. | 364/478 |
| 5,274,757 | 12/1993 | Miyoski et al. | 395/146 |
| 5,289,569 | 2/1994 | Taniguchi . | |
| 5,295,236 | 3/1994 | Bjorge et al. . | |
| 5,299,310 | 3/1994 | Motoyama . | |
| 5,301,036 | 4/1994 | Barrett et al. | 358/448 |
| 5,303,334 | 4/1994 | Snyder et al. . | |
| 5,313,564 | 5/1994 | Kafri et al. . | |
| 5,333,246 | 7/1994 | Nagasaka . | |
| 5,349,648 | 9/1994 | Handley . | |
| 5,353,222 | 10/1994 | Takise et al. . | |
| 5,359,423 | 10/1994 | Loce | 358/296 |
| 5,359,432 | 10/1994 | Peltzer et al. | 358/452 |
| 5,379,373 | 1/1995 | Hayashi et al. . | |
| 5,381,523 * | 1/1995 | Hayashi | 707/513 |
| 5,384,886 | 1/1995 | Rourke . | |
| 5,396,321 | 3/1995 | McFarland et al. | 399/81 |
| 5,398,289 | 3/1995 | Rourke et al. . | |
| 5,412,566 | 5/1995 | Sawa . | |
| 5,414,809 | 5/1995 | Hogan et al. . | |
| 5,442,737 | 8/1995 | Smith . | |
| 5,459,819 | 10/1995 | Watkins et al. . | |
| 5,459,826 | 10/1995 | Archibald . | |
| 5,461,708 * | 10/1995 | Kahn | 345/440 |
| 5,465,213 | 11/1995 | Ross | 364/468 |
| 5,493,490 | 2/1996 | Johnson . | |
| 5,502,804 | 3/1996 | Butterfield et al. . | |
| 5,517,605 | 5/1996 | Wolf . | |
| 5,546,517 | 8/1996 | Marks et al. . | |
| 5,553,212 | 9/1996 | Etoh et al. . | |
| 5,557,722 | 9/1996 | DeRose et al. . | |
| 5,594,860 | 1/1997 | Gauthier | 345/501 |
| 5,594,910 * | 1/1997 | Filepp et al. | 712/28 |
| 5,630,028 | 5/1997 | DeMeo | 395/110 |
| 5,669,005 | 9/1997 | Curbow et al. | 707/523 |
| 5,729,665 | 3/1998 | Gauthier | 358/1.58 |
| 5,937,153 * | 8/1999 | Gauthier | 358/1.17 |
| B1 4,968,993 | 7/1993 | Wolfberg et al. | 346/160 |

OTHER PUBLICATIONS

"Agfa Expo: the medium is the message," *The Seybold Report on Publishing Systems*, p. 17 (Nov. 30, 1994).
"The Latest Word: Chromapress varies data," *The Seybold Report on Publishing Systems*, p. 28 (Mar. 13, 1995).
"The Latest Word," *The Seybold Report on Publishing Systems*, vol. 24, No. 13, pp. 26–28 (Mar. 13, 1995).
"Digital Color Printing in Japan: A Report from Early Users," *The Seybold Report on Publishing Systems*, vol. 24, No. 13, pp. 13–19 (Mar. 13, 1995).
"Indigo Expands Digital Press Line to Packaging; Enhances E–Print 1000," *The Seybold Report on Publishing Systems*, vol. 24, No. 13, pp. 3–12 (Mar. 13, 1995).
"Variable–data and custom printing," *Seybold Special Report*, vol. 3, No. 8, pp. 63 and 64 (Apr. 21, 1995).
"Moore announces new digital printing strategy," *Seybold Special Report*, vol. 3, No. 8, p. 65 (Apr. 21, 1995).
"Agfa Let RIP with Gemini," *M2 Presswire* (Apr. 27, 1995).
"Company–by–Company Guide to the Show: Agfa–Gevaert," *The Seybold Report on Publishing Systems*, vol. 24, No. 17, p. 6 (May 1, 1995).
"Digital printers push customization," *The Seybold Report on Publishing Systems*, vol. 24, No. 19, pp. 10 and 11 (Jun. 12, 1995).
"Agfa 'distributes and prints,' adds new RIP," *The Seybold Report on Publishing Systems*, vol. 24, No. 20, pp. 8–10 (Jun. 26, 1995).
"Indigo System Developments: Indigo varies data, shows Mobius, Omnius," *The Seybold Report on Publishing Systems*, vol. 24, No. 20, pp. 12–15 (Jun. 26, 1995).
"Barco features PrintStreamer, TonerSaver," *Seybold Special Report*, vol. 24, No. 20, p. 11 (Jun. 26, 1995).
"Short–Run Digital Color Printing," *Seybold Special Report*, vol. 4, No. 2, pp. 33 and 34 (Oct. 23, 1995).
"T/R Systems set new price point for digital presses," *The Seybold Report on Publishing Systems*, p. 35 (Oct. 23, 1995).
"Color, Here and Now," *Printing Impressions*, p. 28 (Nov. 11, 1995).
"Digital presses eye the market of one," *Graphic Arts Monthly*, p. 42 (Apr. 1, 1996).
"The 'On Demand' Show: Exciting Technology–But Is the Market Ready?," *The Seybold Report on Publishing Systems*, vol. 25, No. 16, pp. 3, 5 and 6 (May 17, 1996).
"Indigo," *The Seybold Report on Publishing Systems*, vol. 25, No. 16, pp. 5 and 6 (May 17, 1996).
"Personalization for Indigo Engines," *The Seybold Report on Publishing Systems*, vol. 25, No. 22, pp. 9–13 (Aug. 26, 1996).
"Variable Data on Digital Presses: Making Progress," *The Seybold Report on Publishing Systems*, vol. 25, No. 22, pp. 3–8 (Aug. 26, 1996).
Ultimate Technographics, Inc. Manual, "Poststrip," 1989.

Dieckmann, Glenn, "Press Imposition for IBM 4250, General Information," R.R. Donnelley & Sons Company, Crawfordsville Manufacturing Division, Department CHT, Feb. 21, 1989.

*Alpha Four, New Version 3,* "True Relational Database Power Without Programming, Reference Manual," Alpha Software Corporation, Lesson 20: Using Sets and Lesson 22: Advanced Sets: One–to–Many Links, 1993.

"Design Your Forms, Power With Room To Grow: Xbasic™," advertisement, DBMS Magazine, Sep. 1994.

Xeikon announcement, "Xeikon annnounces new RIP for the DCP–1 digital color press," Sep. 13, 1994.

"Finding the Right Niches for Electronic Printing," *The Seybold Report on Desktop Publishing,* Mar. 7, 1994, pp. 12–18.

Xeikon brochure,"Beta Specifications, Xeikon DCP–1 Digital Color Press," date unknown.

Barco Graphics brochure, "RIP and Electronic Collation System for Xeikon DCP–1 Digital Printing Press," Feb. 2, 1994, with Addendum 1.

*Seybold Report on Publishing Systems,* vol. 25, No. 22, ISSN: 0736–7260, Aug. 26, 1996.

"Variable Postscript and the Coming of Age of Electronic Print–for–Profit," *Print on Demand Business,* May/Jun. 1996, pp. 64, 66–67.

"Variable–Data Printing Comes of Age: Capabilities & Market Demand Converge," *Seybold Report on Publishing Systems,* vol. 27, no. 2, Sep. 15, 1997, pp. 3–24.

"Indigo Variable Data Solution Evaluation," Interoffice Memorandum from R.R. Donnelley & Sons Company dated Jul. 26, 1995 (portions redacted).

H. Sharples, "Software Automates Impositions; Prepress Imaging," vol. 65, No. 9, p. 67, Graphic Arts Monthly (Sep., 1993).

"Linotype–Hell's Herkules: Fast, Versatile Drum Imager to Head IPEX lineup; Product Announcement," vol. 23, No. 1, p. 3, The Seybold Report on Publishing Systems (Sep. 1, 1993).

"Aldus to Offer Presswise 2.0 Imposition Software for Large–Format Presses," PR Newswire (Sep. 7, 1993).

P. Dyson, "Computer to Plate: Now There's a Market; Direct–to–Plate Production Now Feasible; includes related article on the Eskofot Escosan 2540 for boards and films," vol. 23, No. 4, p. 3, The Seybold Report on Publishing Systems, (Oct. 11, 1993).

"Imposition Cuts Stripping Time; Electronic Imposing System; Prepress Imaging," vol. 65, No. 11, p. 84, Graphic Arts Monthly (Nov., 1993).

S. Edwards et al., "IFRA '93 Review: An Industry Riding the Crest of a Slump; IFRA European Newspaper Equipment Exhibition; includes related article on trade show rumors," vol. 23, No. 6, p. 3, The Seybold Report on Publishing Systems, (Nov. 8, 1993).

H. Sharples, "Electronic Imposition: Moving Forward," vol. 66, No. 2, p. 53, Graphic Arts Monthly (Feb., 1994).

"Aldus Prepress Division Ships Presswise 2.0 for the Apple MacIntosh," PR Newswire (Mar. 22, 1994).

"Press Imposition Software; Seybold Special Report: Seybold Seminars Boston '94, Part I; Product Announcement," vol. 23, No. 15, p. S74, The Seybold Report on Publishing Systems, (Apr. 22, 1994).

"High–Resolution Output; includes related articles on how to obtain a Hyphen print sample and naming a new screening technology; Seybold Special Report: Seybold Seminars Boston '94, part I," vol. 23, No. 15, p. S47, The Seybold Report on Publishing Systems (Apr. 22, 1994).

P. Hilts, "Donnelley's Digital Production Vision; R.R. Donnelley and Sons invited book publishers to come to Crawfordsville to see the future of printing," vol. 241, No. 34, p. 24, Publishers Weekly (Aug. 22, 1994).

A. Karsh, "Scitex's SGAUA Review: Savanna, GTO–DI Interface, Whisper Upgrade; Scitex Graphic Arts User Assocation, Scitex Savanna Typesetting System, Press Interface for GTO–DI, Autoflat Image Processing Software, MacCSS Connection Peripheral Server," vol. 24, No. 2, p. 11, The Seybold Report on Publishing Systems, (Sep. 19, 1994).

"Color Shop Goes Electronic; Color Tech Corp.," vol. 66, No. 10, p. 90, Graphic Arts Monthly (Oct., 1994).

"Xerox and Scenicsoft Bring New Flexibility to Prepress Work With Postscript Files," vol. 7, No. 10, Worldwide Videotex (Oct., 1994).

"High–Resolution Output Devices; Seybold Special Report: Seybold San Francisco '94, Part 1; Product Announcement," vol. 24, No. 3, p. S32, The Seybold Report on Publishing Systems (Oct. 26, 1994).

"Output Servers; Seybold Special Report: Seybold San Francisco '94, part 2, Product Announcement," vol. 24, No. 3, p. T13, The Seybold Report on Publishing Systems (Oct. 26, 1994).

"CTP Field Gets a New Entry; Linotype–Hell's Computer–to–Plate System, Gutenborg," vol. 66, No. 11, p. 102, Graphic Arts Monthly (Nov., 1994).

Alexander, George A., "Custom Book Publishing and Book Printing on Demand," *The Seybold Report on Publishing Systems,* vol. 21, No. 16 (May 11, 1992).

Appelt, Wolfgang, "Existing Systems For Integrating Text and Graphics," *Computer & Graphics,* vol. 11, No. 4, pp. 369–375 (1987).

International Search Report dated Apr. 13, 1999.

European Search Report dated Jul. 22, 1999.

* cited by examiner

FIG. 12A

PAGINATE iT Project:

Signature Filler Pages

| | QuarkXPress File | Pg# |
|---|---|---|
| Right | | |
| Left | | |

Edit Signature Filler Pages

Pagination Rules

| Force | Filler QXP File | Pg# | Var | Mas |
|---|---|---|---|---|
| 1 | | | A | N |
| 2 | | | A | N |
| 3 | | | A | N |
| 4 | | | A | N |
| 5 | | | A | N |
| 6 | | | A | N |
| 7 | | | A | N |
| 8 | | | A | N |
| 9 | | | A | N |
| 10 | | | A | N |
| 11 | | | A | N |
| 12 | | | A | N |

Edit Pagiation Rules

About the Rules Table...   Cancel   Save

Enter the page height and width of the imposed or "flat".
These will be as the setpagedevice parameters to the RIP.

Page Width (Inches): 17   Page Height (Inches): 11

Imposition Style: Get Tiff Style ▼

Finishing Style: In-Line Finishing ▼   Four Pagers: Stitch ▼

Report Field: NO SELECTION ▼

Bar Code: Bottom of Sheet ▼   Page Numbers: Page Numbers Off ▼

Select:

[ PostScript File... ]   Bar Code PS File

[ Contents File... ]   Bar Code Content File

[ Variable File (.vars)... ]   VDF MAC:Desktop Folder: VDF Jobs:Longs Drugs:aloha.mm.vars

[ Pagination File (.pag)... ]   Pag PS File

[ Book Ticket Directory... ]   BT Directory:

Device Name:

Master and Variable Storage Directory: Docuprint   Queue Name: HBA

/var/spool/XRXnps/netqreq ( Cancel )   ( OK )

FIG. 16

PORTRAIT --> LANDSCAPE

LANDSCAPE --> PORTRAIT

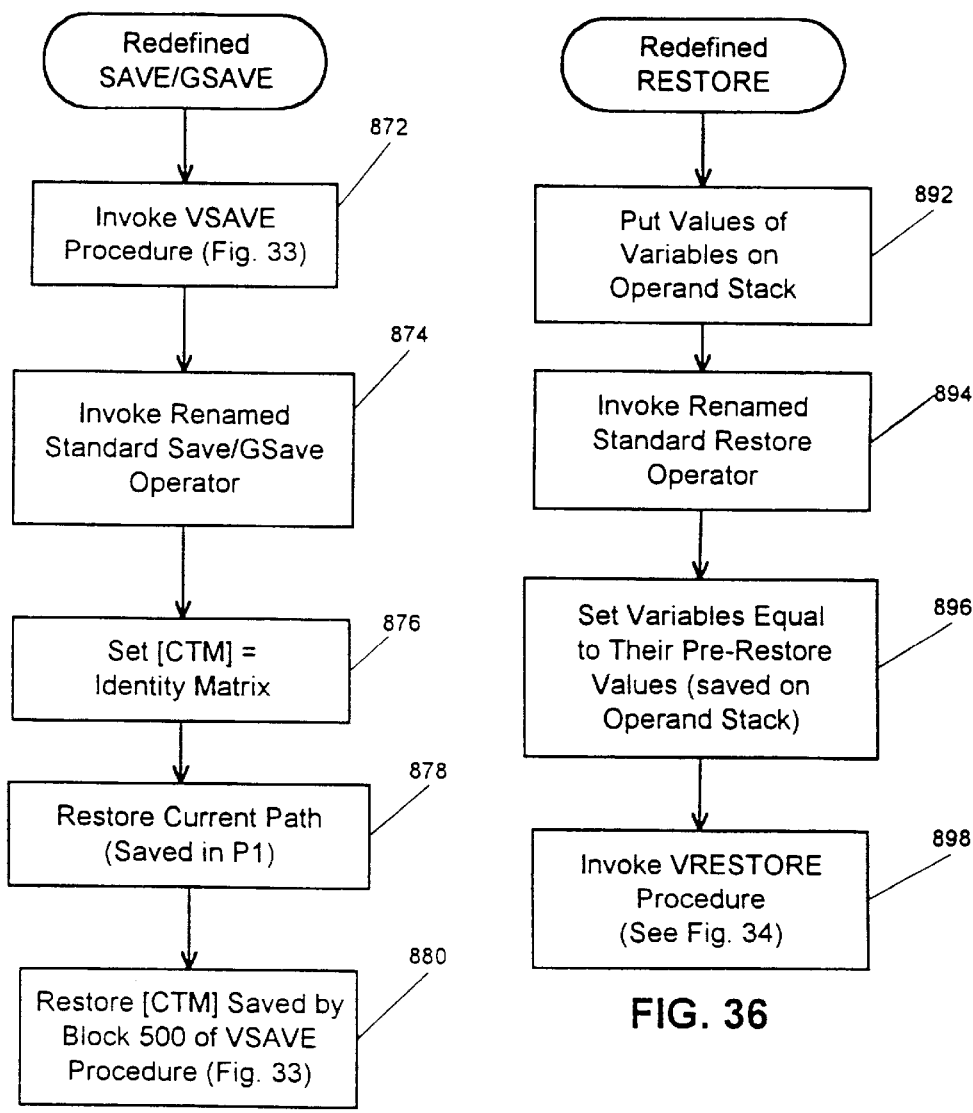
FIG. 35
FIG. 36
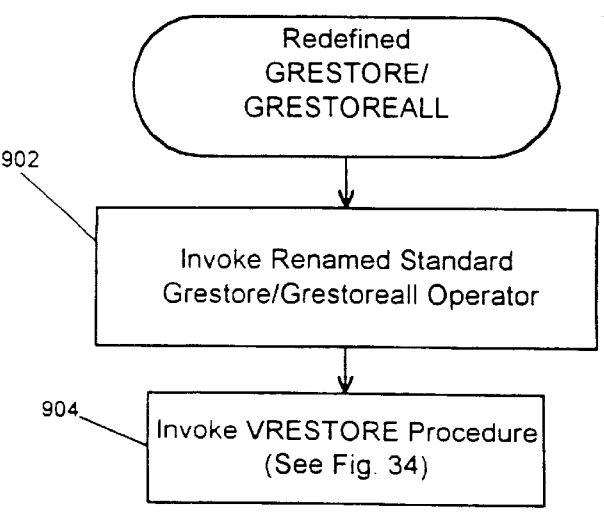
FIG. 37

METHOD OF REPRODUCING VARIABLE GRAPHICS IN A VARIABLE IMAGING SYSTEM

RELATED APPLICATIONS

This application is related to the subject matter described in co-pending U.S. application Ser. No. 08/802,337 entitled "Imposition Process and Apparatus for Variable Imaging System," filed Feb. 2, 1997, which is a continuation-in-part of U.S. application Ser. No. 08/478,397, filed Jun. 7, 1995 and a continuation-in-part of U.S. application Ser. No. 08/627,724, filed Apr. 2, 1996.

TECHNICAL FIELD

The present invention relates generally to reproduction methods and systems, and more particularly to a method of and system for selectively reproducing variable graphics information.

BACKGROUND ART

Most printing systems in use today utilize printing plates or cylinders which are engraved or photochemically processed to create an image thereon. Ink is then deposited on the plate or cylinder and the ink is thereafter transferred to a substrate, such as paper. In a conventional printing press, a number of pages are printed on a sheet of paper to form a signature which is then folded and assembled with other signatures. The assembled signatures are then bound, trimmed and finished by finishing apparatus to produce finished books, such as magazines, catalogs or any other printed and bound matter.

Often, there is a need to produce different versions of books and/or customized books within a single press run. For example, it may be desirable to produce a number of standard books together with a number of books having additional and/or different signatures or pages therein. Also, it may be necessary or desirable to provide customized information in the form of an address label, personalized information or the like on the inside or outside of finished books. In either case, conventional printing systems are not easily adaptable to produce books of these types.

A printing system which has the ability to produce differing book versions and/or books with customized information is disclosed in Riley U.S. Pat. No. 4,121,818, assigned to the assignee of the instant application. The printing system includes a number of packer boxes disposed adjacent a binding chain wherein each packer box stores a plurality of signatures. A control is included for controlling the packer boxes to selectively feed signatures onto chain spaces of the binding chain so that books of varying content can be produced. Customized information can be printed on the signatures by means of an ink jet printer which is selectively operated by the control. Other types of customization can be effectuated, such as by inserting or onserting cards or the like.

Other systems for producing customized books are disclosed in Abrams et al. U.S. Pat. No. 3,899,165, Wong et al. U.S. Pat. Nos. 4,500,083 and 4,674,052, Wong U.S. Pat. No. Re 32,690 and Berger et al. U.S. Pat. Nos. 4,768,766 and 4,789,147.

Image manipulating systems have been developed which permit gathering of images in an office or home environment. For example, conventional word processing programs, such as Microsoft® Word®, WordPerfect® and the like, permit a user to import images into a page and also allow a user to command which pages of a document to print. In addition, macros (i.e., a sequence of commands) can be assembled and executed within these programs which can allow printing of particular document pages in a certain order. Still further, most word processing programs have merge capability wherein a customized image is merged with other standardized information and printed or displayed. As one example, customized information in the form of addressee and address information may be merged with standardized return address information and printed on a series of envelopes.

A different image gathering capability provided by CAD (computer aided design) software, sometimes referred to as "layering," involves the creation and storage of a base page and one or more layer pages. A user can issue commands to display or print the base page and one or more of the layer pages simultaneously atop one another to achieve an effect similar to the overlay of transparencies so that a composite page appearance results.

While the foregoing image manipulating systems allow some image gathering capability, none is effective to assist in the rapid production of different book versions. Of course, CAD systems are primarily designed for line art and not text or graphic images, and hence are of only limited use. Further, if one were to use word processing software to produce book versions, it would be necessary to issue commands to separately print the pages of each book version just before such version is to be produced. That is, a user would have to create and store pages to be included in a first book version and then command the software to print as many copies of the first version as are needed. Thereafter, the user would have to recall the pages of the first version from memory, edit and store the pages to create pages to be included in a second book version and then command the system to print the required number of books of the second version. Similar steps would have to be undertaken for each other book version to be produced. Alternatively, the pages of the different book versions could be created and stored and thereafter printed together. In either event, where many book versions are to be produced, such a process would be quite time-consuming. In addition, image importation and merge routines provided as a part of word processing software are adapted for use on a sub-page basis only and hence are of only limited usefulness in the book production environment. Still further, data manipulated by word processing software are largely (if not entirely) in symbolic format. As a result, data to be displayed or printed must be first rasterized by a raster image processor (RIP), which utilizes complex and time-consuming computational routines which further increase production time to an economically impractical level.

Recently, new printing systems have been developed, called "demand printers," which are capable of high speed printing of images from electronic representations thereof. The demand printer produces high quality color (or black and white) images using a set of fusible toners in an electrophotographic process. More particularly, a web of paper is passed adjacent a series of drums, each of which has been electrostatically charged according to an image pattern for a particular color to be applied to the web. The charge is transferred to the paper and an oppositely charged toner of the proper color is brought into contact with the paper. The oppositely charged web and toner attract so that the toner is held on the paper as other colors are applied thereto. The toners and paper are thereafter heated to fuse the toners to the paper to produce the final image. The web is then cut into sheets (or "forms") and the forms are further processed as needed to produce a final product.

Unlike conventional presses which utilize engraved or photochemically prepared plates or cylinders, demand printers are capable of rapidly printing high quality images of differing content owing to the fact that the images are produced by an electrophotographic process. That is, instead of the need to replate and re-engrave a gravure cylinder when a different image is to be printed therewith, it is only necessary to change the charge applied to the drums of the printer in order to make such change. Thus, different images can be printed by the same printer without significant delays. This advantage makes the demand printer desirable for use in certain production environments.

Warmus, et al., U.S. patent application Ser. No. 08/802,337, entitled "Imposition Process and Apparatus for Variable Imaging System," discloses an apparatus and method for controlling a display device so that fixed and variable information may be reproduced in a simple and effective manner. More particularly, first and second sets of template data representing associated first and second template pages, respectively, are developed. Each set of template data includes master data representing fixed information and area data representing an area of a page for variable information. A database is also developed having a number of entries each of which represents variable information. The Warmus et al. apparatus and method generates page definition language representations of each master and variable page in accordance with the sets of template data and the entries in the database and automatically imposes or positions the pages to be reproduced on a display device, such as a printer or computer monitor.

Some users of variable demand printing systems may wish to produce books containing variable graphics information, such as pie charts or bar graphs, which are customized for each book. For example, a financial institution may want to produce individual booklets relating to investment information and illustrate, using a bar graph or pie chart, the amount or percentage of money invested in a variety of funds. In prior systems, such as the Warmus et al. system described above, customized graphics information had to be preprocessed by generating each graph off-line and then incorporating the customized graphs into the appropriate pages and books. Vinberg, et al., U.S. Pat. No. 4,800,510, is an example of a prior art system for preprocessing user-input parameters into graphic format.

These prior methods, which required preprocessing of graphics information, were time-consuming and expensive. Thus, there remains a need for a system for generating variable graphics information "on-the-fly," i.e., generating graphics as booklets are being imposed and/or printed, without the need for preprocessing the information.

SUMMARY OF THE INVENTION

The present invention is an enhancement of the Warmus et al. system (described in co-pending patent application Ser. No. 08/802,337) which allows variable graphics information to be generated "on-the-fly" along with other master and variable image and text information. In general, a database of the information to be represented in graphic format, along with other variable information, is created and a user is prompted to select various graph parameters (size, type, colors, etc.). Instructions are downloaded to the interpreter (or RIP) such that the page description language files for each page retrieve information from the database and generate a graph according to the user-specified parameters.

According to one aspect of the present invention, a method of controlling a display device to display variable graphics information, comprises the steps of:

(a) creating a database having a number of entries, each of which represents variable information and wherein selected entries represent variable graphics information;
(b) developing template page files, each page file having master data representing fixed information and area data representing an area of a page for variable information;
(c) selecting areas of the page for the variable graphics information; (d) specifying graph parameters; and (e) causing the display device to display the pages with the fixed information, selected variable information from the database, and selected variable graph information from the database, wherein the selected variable graphics information is displayed according to the specified graph parameters.

According to a preferred embodiment of the invention, the step of selecting the areas of the page for variable graphics information further comprises: (i) creating an image box at a selected area of the page; (ii) selecting the entries in the database corresponding to the variable graphics information; (iii) layering a text box over the image box; (iv) inserting the specified graph parameters and the selected database entries into the text box; and (v) tagging the text box as containing variable graphics information. The text box may be tagged by assigning the text box an unusual attribute (i.e. color or font) or by inserting a text delimiter in the text box. The graph parameters (i.e. graph type, size, labels, scaling, etc.) may be specified by prompting a user to select parameters, by setting the parameters to a default value or by a combination of both.

Also according to a preferred embodiment, the step of causing the display device to display the pages comprises determining if a page file contains an area selected for variable graphics information and, if a page file contains an area selected for variable graphics information, saving the specified graph parameters and selected entries from the database representing variable graphics information, and executing a graph file to generate a graph using the specified graph parameters and selected database entries.

According to an alternative embodiment of the invention, the display device displays the variable graphics information as a bar chart by: (i) generating a bar chart at the selected area on the page, wherein the chart includes a bar for each database entry representing variable graphics information and each bar corresponds to a maximum value of the database entries representing variable graphics information; and (ii) analyzing each database entry representing variable graphics information and covering a portion of the bar corresponding to that entry based on a comparison of the value of that entry with the maximum value. The portions of the bars are covered using named image boxes, wherein each named image box corresponds to a name of a database entry.

According to another alternative embodiment, the variable graphics information is displayed as a bar chart and the display device displays the pages with selected variable graphics information by: (i) generating a bar chart at the selected area on the page, wherein the chart includes an image box for each database entry representing variable graphics information and each image box corresponds to a maximum value of the database entries representing variable graphics information; (ii) retrieving the value of each database entry representing variable graphics information; and (iii) anamorphically scaling each image box to correspond to the value of the database entry. This embodiment is particularly suited for graphs using graphic objects.

According to yet another alternative embodiment, the display device displays the pages with selected variable graphics information by: (i) retrieving the values of the database entries representing variable graphics information; (ii) transferring the database values to a spreadsheet program (such as Excel®); (iii) generating a graph using the spreadsheet program based on the transferred database values and the specified graph parameters; and (iv) linking the graph back to the selected area on the pages.

According to another aspect of the present invention, a method of reproducing pages including variable data, wherein the variable data is stored in a database, the method comprises the steps of (a) creating template page files, each page file having fixed information and a placeholder at the location on the page where the variable data will be reproduced; (b) specifying graph parameters; (c) selecting entries from the database that contain variable graph data; (d) tagging the placeholders that correspond to variable graph data; (e) layering the specified graph parameters and the selected variable graph data entries from the database over the placeholder corresponding to the variable graph data; (f) interpreting the page files, including executing a graph file to generate a graph using the specified graph parameters and variable graph data entries; and (g) transmitting the pages to a display device.

Other features and advantages are inherent in the apparatus claimed and disclosed or will become apparent to those skilled in the art from the following detailed description in conjunction with the accompanying drawings.

BRIEF DESCRIPTION OF THE DRAWINGS

FIGS. 9A-1 through 9A-4 are flowcharts illustrating programming of the EPS graph file to generate the variable graphs of the present invention;

FIGS. 11A-1 & 11A-2 illustrate an alternative ("named image box") method for generating variable graphs;

FIG. 12A is a sample window to prompt a user for the information needed to create a pagination file;

FIG. 16 is a sample window to prompt a user to provide various information to select imposition and printing styles;

FIG. 35 is a flowchart illustrating the program steps implemented by the redefined Postscript® save operators according to the imposition-on-the-fly procedures;

FIG. 36 is a flowchart illustrating the program steps implemented by the redefined PostScript® restore operator according to the imposition-on-the-fly procedures; and FIG. 37 is a flowchart illustrating the program steps implemented by the redefined PostScript® restore and grestoreall operators according to the imposition-on-the-fly procedures.

DETAILED DESCRIPTION OF THE PREFERRED EMBODIMENTS

Figure 1:
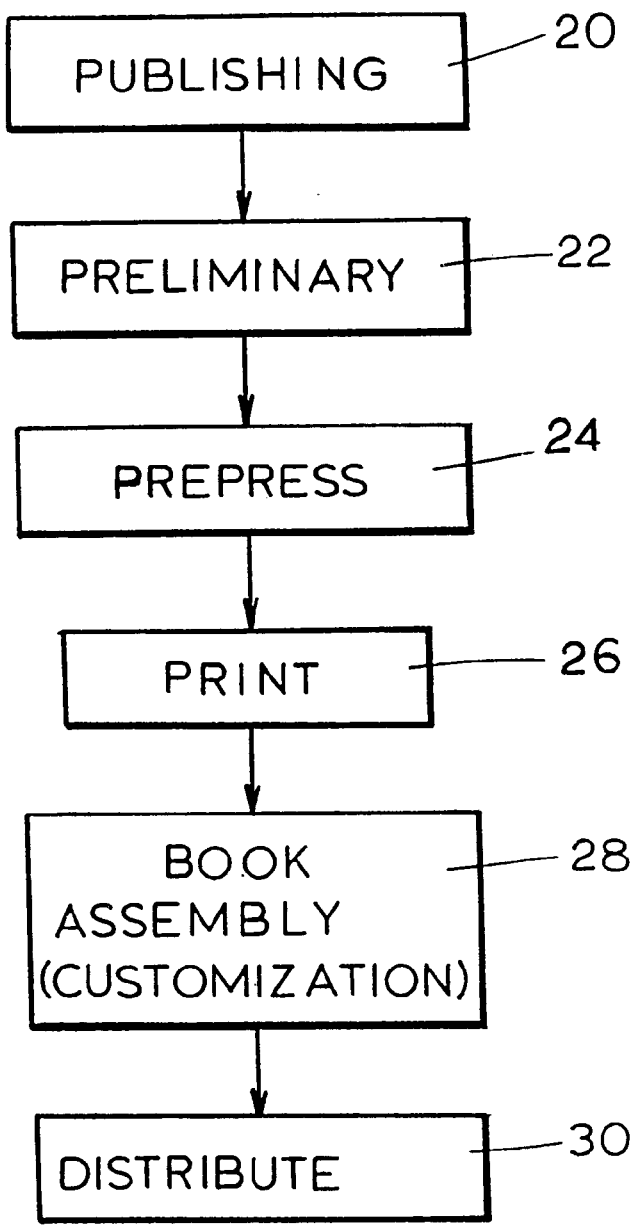
FIG. 1 is a block diagram illustrating a prior art method of producing books.

FIG. 1 illustrates a prior art method of producing books, for example, as shown in the above-identified Riley et al. '818 patent. During a publishing step 20, the contents of one or more book versions are determined. Each version may comprise, for example, a set of standard or common pages. In addition, some of the versions may include one or more additional pages or other customized information. Thereafter, during a preliminary step 22, color correction of color images is undertaken together with undercolor removal and screening for halftone images. During a prepress step 24, page imposition is effected and printing cylinders or plates are prepared. The plates or cylinders are then used during a printing step 26 to prepare signatures which are loaded into packer boxes (not shown). As noted in the Riley et al. '818 patent identified above, the signatures are then selectively collected on a gathering chain (not shown) during a book assembly step 28 and the gathered signatures are bound and trimmed to create the books. The books are thereafter distributed during a step 30 to users via one or more distribution systems, for example, the U.S. Postal Service.

As should be evident from the foregoing, customization occurs during the book assembly step 28, inasmuch as the choice of particular signatures to be included in a book is made at that time. In addition, customized information can be printed onto selected signatures using an ink jet printer disposed adjacent the gathering chain. Thus, for example, addressee information can be printed by the ink jet printer on assembled books so that preprinted addressee labels need not be used. Other types of customization can be effected at this time, for example, by inserting or onserting cards into or onto a stack of collected signatures, affixing a specialized or customized cover on a gathered stack of signatures, or the like. Customization at this point in the production process is simpler and less expensive than, for example, separately printing each book version with customized information.

Figure 2:
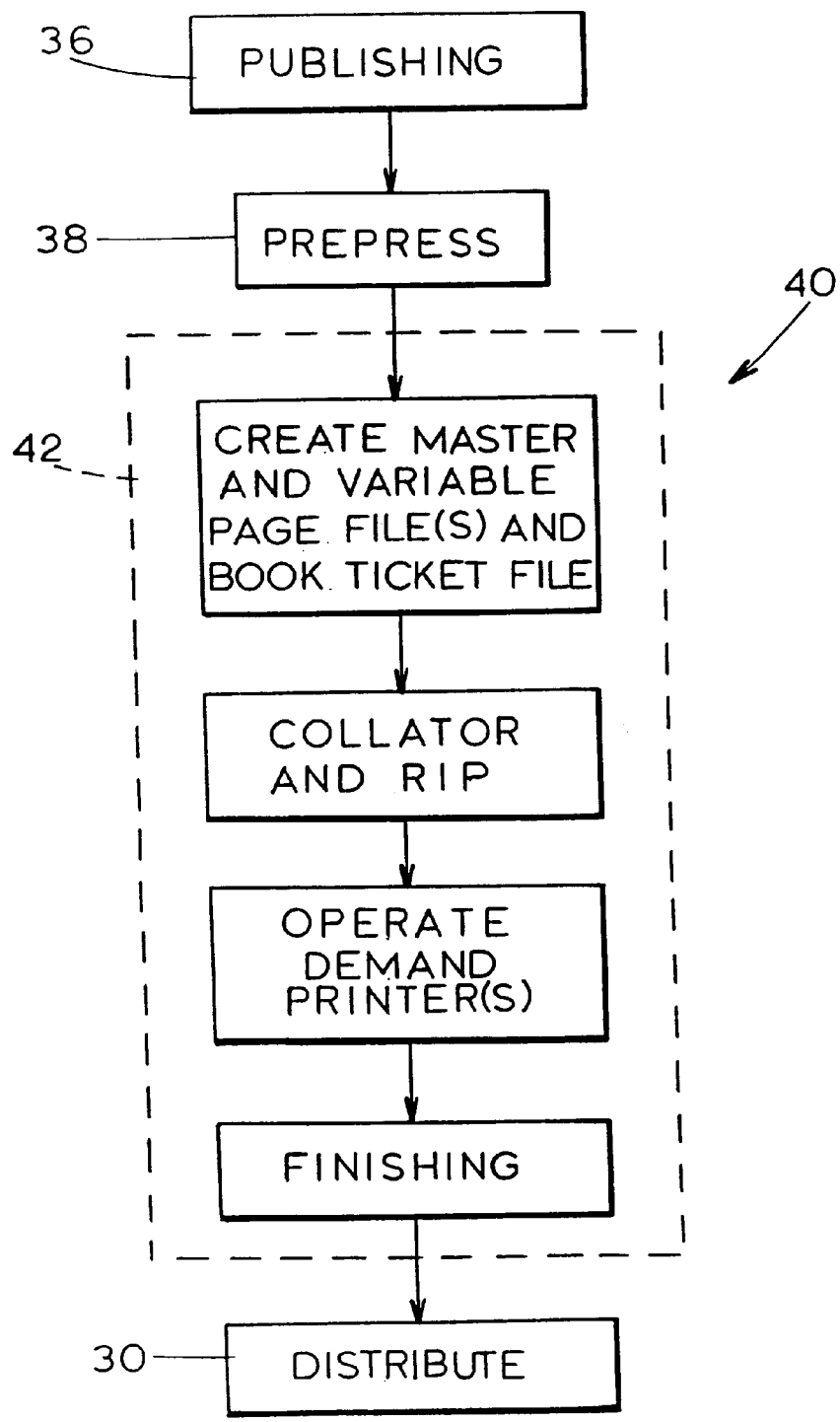
FIG. 2 is a block diagram of a method of producing books implementing the present invention.

FIG. 2 illustrates a block diagram of a method 40 according to the present invention which may be used in place of the method of FIG. 1 to produce books. The method 40 includes a step 42 which utilizes the output of publishing and preliminary steps 36, 38 and produces books for distribution according to the step 30 of FIG. 1. The step 42 creates one or more master and variable page files in, for example, a page description language (PDL) such as Postscript® (PostScript® is a trademark of Adobe Systems, Inc. for its page description language) representing pages to be produced. In addition, as noted in greater detail hereinafter, a press command file (also referred to as a "book ticket" file) is developed which specifies the manner in which data contained within the master and variable page files are to be merged to produce printed pages. The format of the press command file may be, for example, of the form specified by Barco Graphics of Gent, Belgium, which is particularly suited for control of a DCP-1 digital color press manufactured by Xeikon of Mortsel, Belgium. Alternatively, the format of the press command file may be of the form specified for control of a DocuPrint printer, manufactured by Xerox Corporation. Other demand printers include the IBM 3900 or Siemens 2090 Twin or 2140 Twin. It should be noted that the apparatus and method of the present invention are not limited to use with a particular type of demand printer or a particular system for controlling such a printer, inasmuch as the invention can be adapted for use with any type of printer or control whether located locally or remotely.

The master and variable page files and the press command file are converted by a collator and raster image processor (RIP) into bitmaps which may be stored in a memory. The stored bitmaps are used to control one or more demand printers and/or any other type of display device, such as a laser printer, a CRT, an LCD display or the like so that the device displays pages having fixed and variable information thereon. Alternatively, the master and variable page files may be premerged to create a plurality of combined files each representing a page to be reproduced with master and variable information. The combined files can be then sent to any type of printer or other display device, whether local or remote. Also, the combined files can be converted to a suitable format (e.g., Acrobat® PDF format) and transmitted to a remote location using a facsimile machine, e-mail, the Internet/World Wide Web or other transmission medium, if desired. Advantageously, the combined files may be transmitted over the Internet or any other networked or linked computers, such as a company intranet. In this case, an electronic page containing customized data can be sent over the Internet/intranet to a user based upon user demographic (s), a user search and/or any other identifiable user interest (s). For example, a customized Internet page could be sent with links to other web pages of interest to a user or a customized page may be sent in response to a user search for information on a particular subject. Alternatively, or in addition, ads could be generated and sent as a web page to one or more users based upon user demographics. As a further example, personnel information concerning a particular employee may be sent to the employee in response to a request for information.

If the pages are to be displayed by rendering the pages on the demand printer, the assembled books may be bound and trimmed and, if desired, further customized, during a finishing step.

Figure 3:
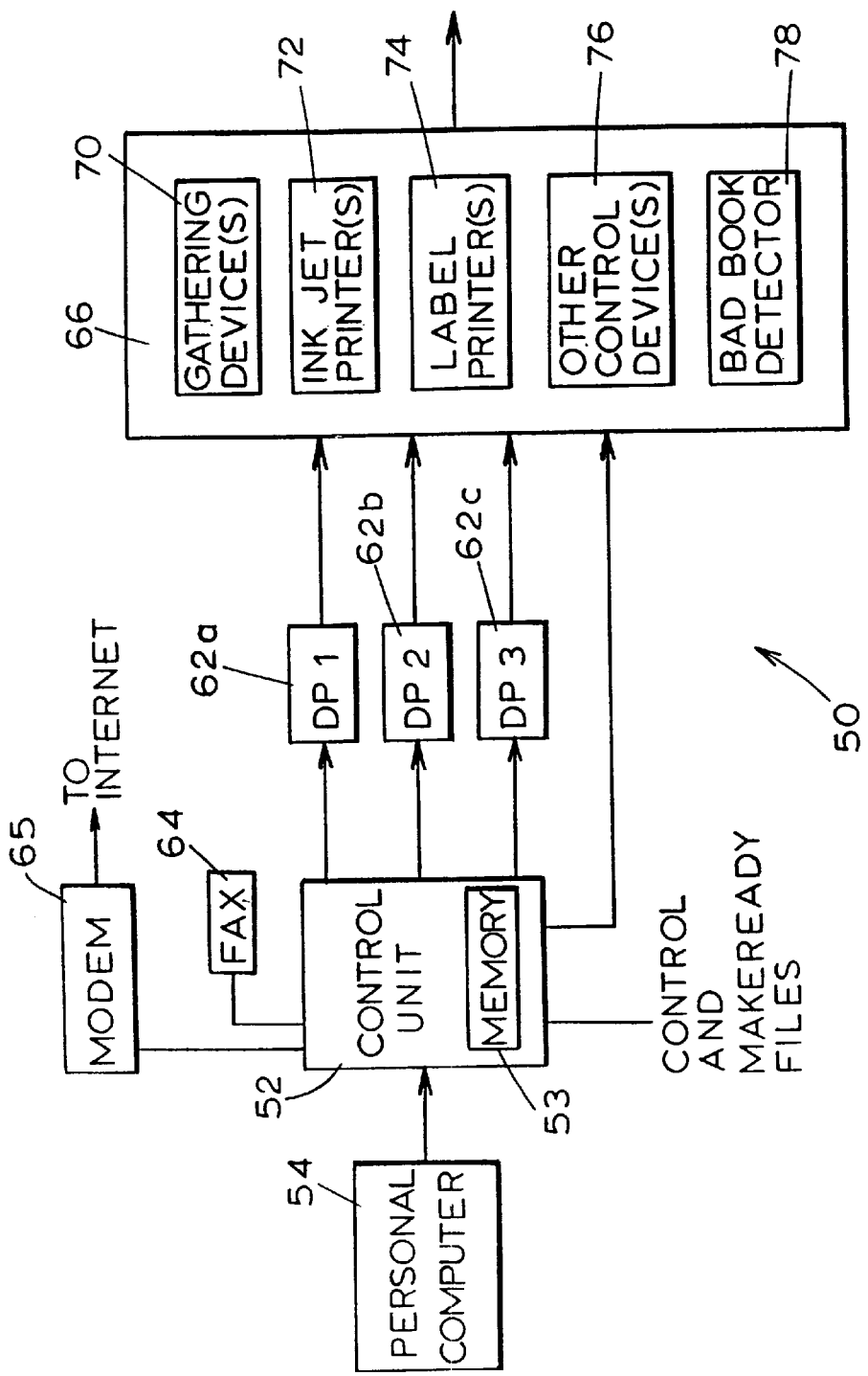
FIG. 3 is a block diagram illustrating an exemplary system for implementing the method of the present invention illustrated in FIG. 2.

FIG. 3 illustrates a system 50 which implements the steps 36, 38 and 42 in the method 40 of FIG. 2. A control unit 52, which may be implemented by a personal computer or another type of computer, includes a memory 53 and stores therein data representing images to be printed. As noted in greater detail hereinafter, the data may be specified by a publisher using a personal computer 54 or any other type of computer and may comprise one or more template files specifying pages to be produced with master or fixed printed information (i.e., printed information which does not vary from book to book of the same version) and variable printed information (which typically varies from book to book). The variable information may be stored in a database created by the publisher and the template file(s) specify the locations on particular pages for variable information stored in the database, as noted in greater detail hereinafter.

If desired, image data may be obtained from any other type of device or devices, such as a scanner which scans input copy, data supplied over a network or any other source. The control unit 52 is further responsive to control and makeready files and causes one or more demand printing systems 62 to print desired pages. While three demand printing systems 62a–62c are illustrated in FIG. 3, it should be understood that the control unit 52 may operate a different number of demand printing systems, as desired. Also, the control unit 52 may operate a fax machine 64 and/or may communicate with other remote devices to send properly converted combined files, as desired and as noted above. In the case of other remote devices, a modem 65 may be operated by the control unit 52 to transmit data representing one or more pages to be displaced by a display device at a remote location over phone lines (land lines and/or cellular) or a combination of phone lines and the Internet. Alternatively or in addition, the data may be sent to a local or remote location at least in part over an intranet or another computer network through a direct connection therewith. The combined files may be printed or may alternatively be reproducible in a different medium and/or may comprise a non-static image or other information, e.g., movies or audio.

The pages printed by the demand printing system 62 may be supplied to a finishing apparatus 66 which includes various auxiliary production devices and device interfaces for assembling the pages to produce finished books which are ready for distribution. The finishing apparatus 66 may include one or more gathering devices 70 for gathering printed pages into books, one or more ink jet printers 72 for printing additional customized information, such as addressee information, on each book, one or more label printers 74 for printing address labels and/or other control devices 76. In addition, one or more detectors 78 may be provided to sense when a defective book is produced. The control unit 52 may be responsive to the output of the detector 78 to reorder a defective book at an appropriate point in the production sequence thereof so that advantage can be taken of postal discounts, if possible.

One or more components of the finishing apparatus 66 may be physically located on the demand printer (i.e. "online finishing"). Alternatively, the finishing apparatus 66 may be physically separate from the demand printer (i.e. "offline finishing").

Figure 4:
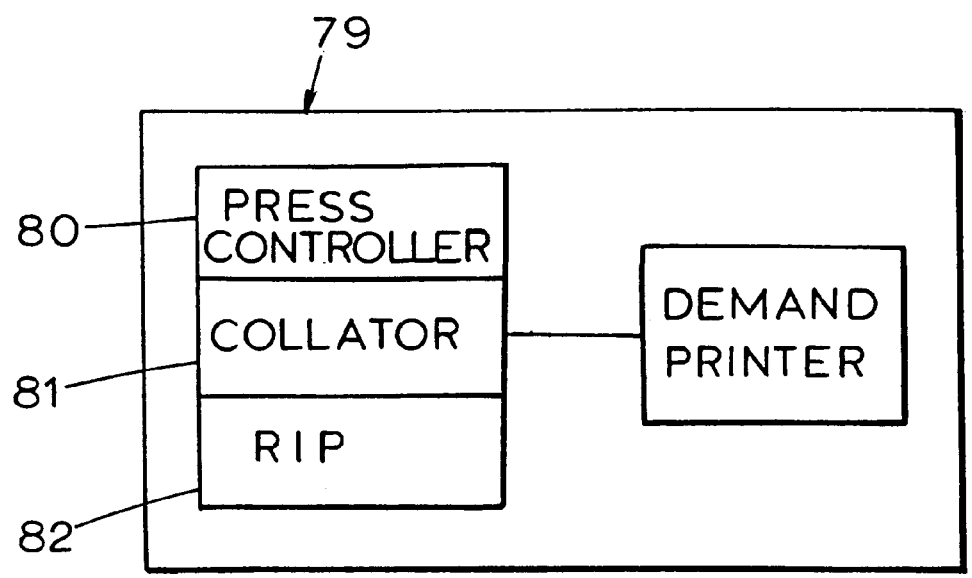
FIG. 4 is a block diagram illustrating one of the demand printing systems of FIG. 3 in greater detail.

FIG. 4 illustrates the demand print system 62a of FIG. 3 in greater detail, it being understood that the systems 62b and 62c are functionally similar. The system 62a includes a print system 79 having a press controller 80, a collator 81 and a raster image processor (RIP) 82 which are operable in response to press commands generated by the control unit 52. A collator is an electronic device for storing raster image processor files (i.e., bitmap files) and delivering selected files to a digital press in real time, such that the digital press can run at full speed while processing and printing unique page data for each book produced on the press. The RIP 82 converts the page files to bitmap format or any other format, such as a symbolic printer control language. The collator 81 includes memory in the form of mass storage drives and physical memory and collates the bitmap page files. If desired, the collator 81 and/or RIP 82 may comprise a part of the press controller 80. The controller 80 instructs the collator 81 to send page files to a demand printer 84. The print system 79 may comprise the PrintStreamer system, manufactured and marketed by Barco Graphics of Belgium, while the demand printer 84 may comprise the Xeikon DCP-1 digital color press noted above. Alternatively, the demand printer 84 may be a DocuPrint printer manufactured by Xerox Corporation and the RIP 82 may be a Xerox DocuPrint RIP. It should be noted that a different print system and/or demand printer may alternatively be used, such as the Indigo printer manufactured by Indigo Nev., of Maastricht, Netherlands, if desired.

Figure 5:
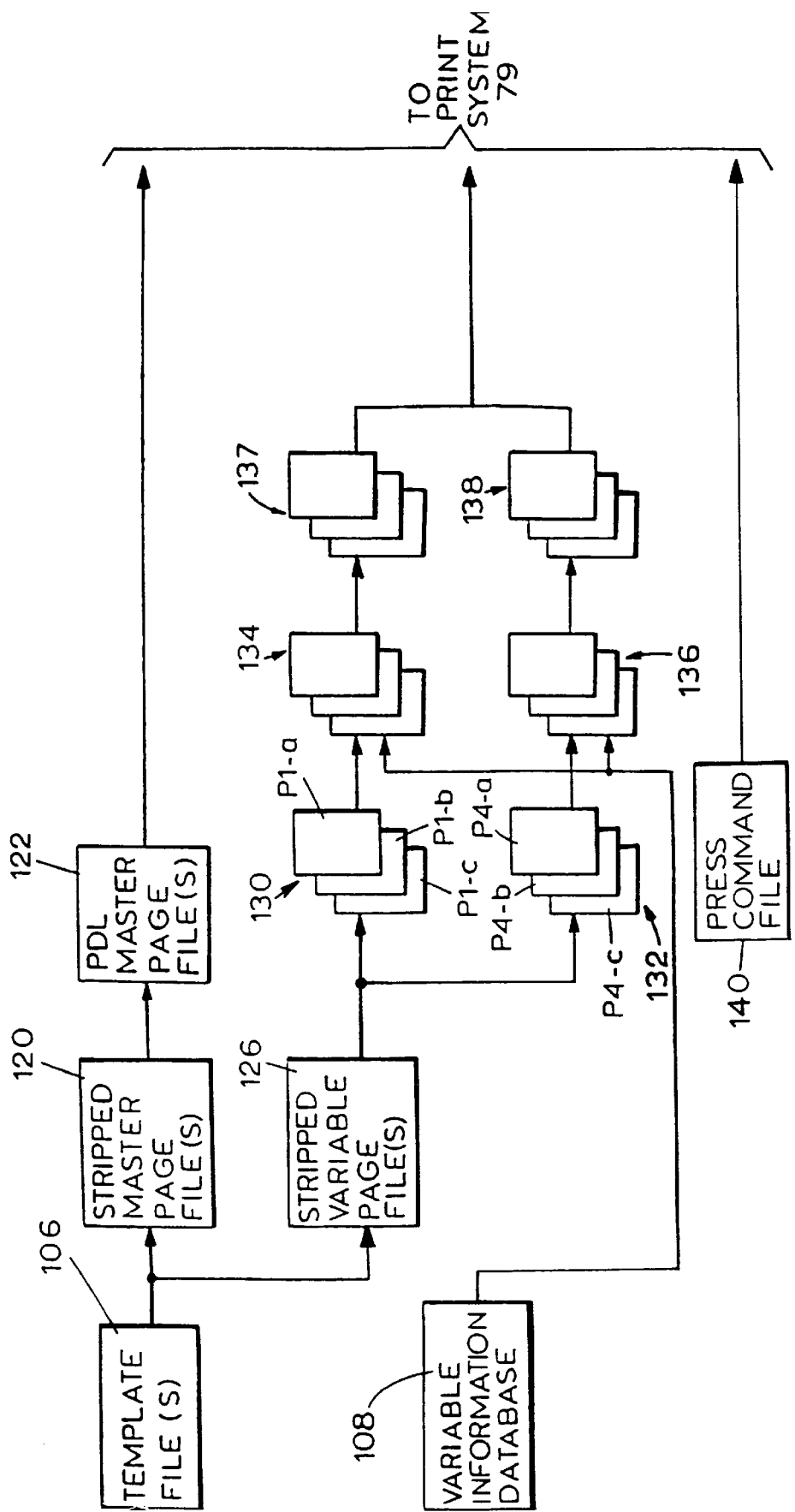
FIG. 5 is a generalized diagram of the steps implemented by the method of the present invention.
Figure 6A:
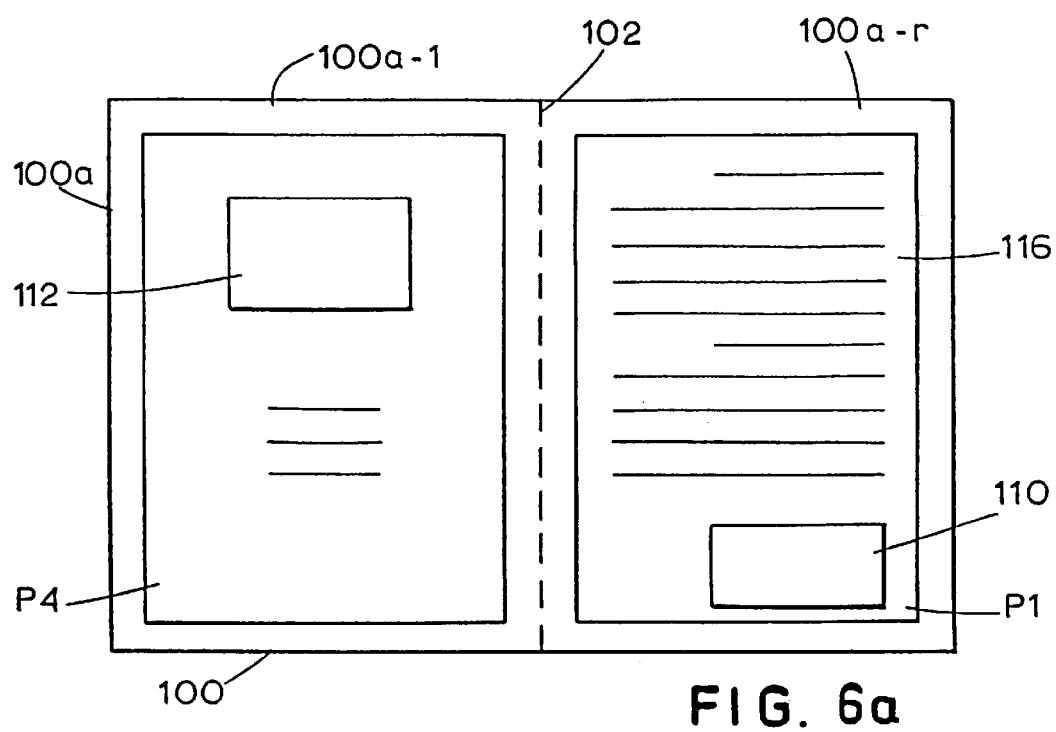
FIGS. 6a and 6b are elevational views of portions of a sample book that may be produced by the present invention.
Figure 6B:
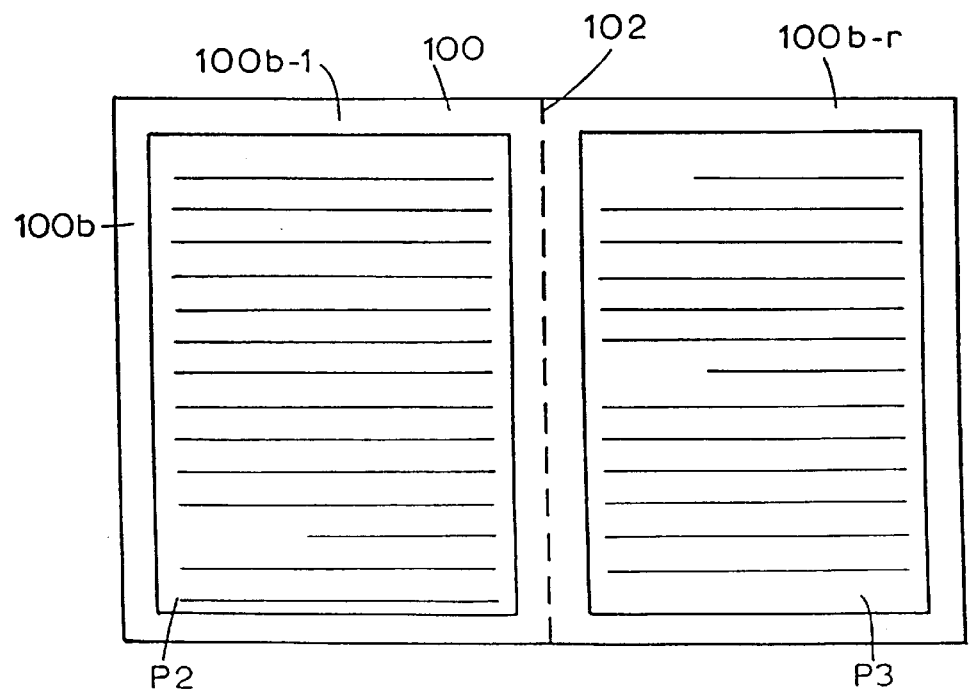

FIG. 5 illustrates in diagrammatic generalized form the method of the present invention. For the purpose of explaining the present invention, as an example, it will be assumed that the demand print system 62a will be operated to produce a number of multiple-page books in the form of a brochure in duplex (or "saddle-stich") format. FIGS. 6a and 6b illustrate four pages P1–P4 printed on a single sheet of paper 100 and to be included in a brochure. The sheet of paper 100 includes a first side 100a with printed pages P1, P4 thereon and a second side 100b with pages P2, P3 printed thereon. (As will become evident hereinafter, the use of designations P1–P4 is not meant to imply that such pages will necessarily become pages 1, 2, 3 and 4 of the finished book.) In addition, pages P1–P4 are imposed such that the page P1 is placed on a right-hand portion 100a–r of the side 100a while the page P4 is placed on a left-hand portion 100a–l of the side 100a. Further, the page P2 is placed on a left-hand portion 100b–l of the side 100b while the page P3 is placed on a right-hand portion 100b–r of the side 100b. In this fashion, when the sheet of paper 100 is folded along a fold line 102 with the pages P1 and P4 on the outside, the pages P1–P4 appear in sequence. (The format shown in FIGS. 6A and 6B is often referred to as "saddle stitch" imposition and is commonly used in magazines.) Because each book to be produced in this example includes multiple sheets of paper (or "forms"), each folded once along a fold line, the imposition process takes into account shingling effects but not bottling effects. It should be noted both of that such effects will generally have to be taken into account when more than two pages are to be printed on a single side of a sheet of paper and thereafter folded multiple times and assembled with other multiple-folded printed sheets of paper to create a book.

In addition to the foregoing, in the first example, assume that the pages P1 and P4 will become the outside front and back covers, respectively, of a finished book and include variable and fixed information thereon. Further, assume that the pages P2 and P3 will become the inside front and back covers, respectively, (as must be the case if P1 and P4 are the outside front covers) and include fixed information only thereon. For example, the page P1 may include variable information in the form of a personalized message, a variable image, or the like in an area 110 whereas the page P4 may include other variable information in an area 112, for example, postal information for mailing the brochure to an addressee. Corresponding front and back pages of the remaining books may include different variable information. The remaining printed information on pages P1–P4 may be identical to the printed information on corresponding pages of remaining books.

The books to be produced may include the same or differing number of forms and may have the same or differing numbers of pages. For example, the pages P1–P4 may be assembled with a number of other printed forms comprising twelve additional pages to produce a first book having sixteen pages. Another book to be produced in the same run may include some or all of pages P1–P4 and a second number of forms printed with twenty other pages, some of which may or may not be identical to the twelve additional pages of the first book. Filler pages may be placed in some or all books to cause such book(s) to have a certain number of pages. This may be necessary or desirable to result in a book length which is evenly divisible by four (in the event pages are imposed as two-page spreads) and/or to insure that particular page(s) appear on the left-hand or right-hand side in the finished book.

Figure 7A:
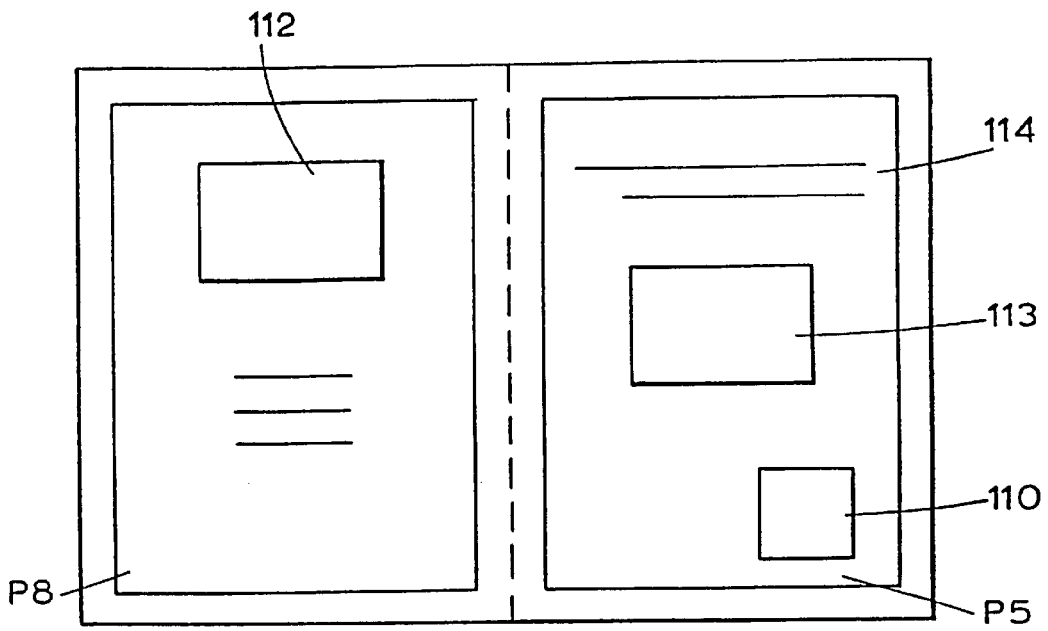
FIGS. 7a, 7b and 8a, 8b are elevational views of portions of other sample books that may be produced by the present invention.
Figure 7B:
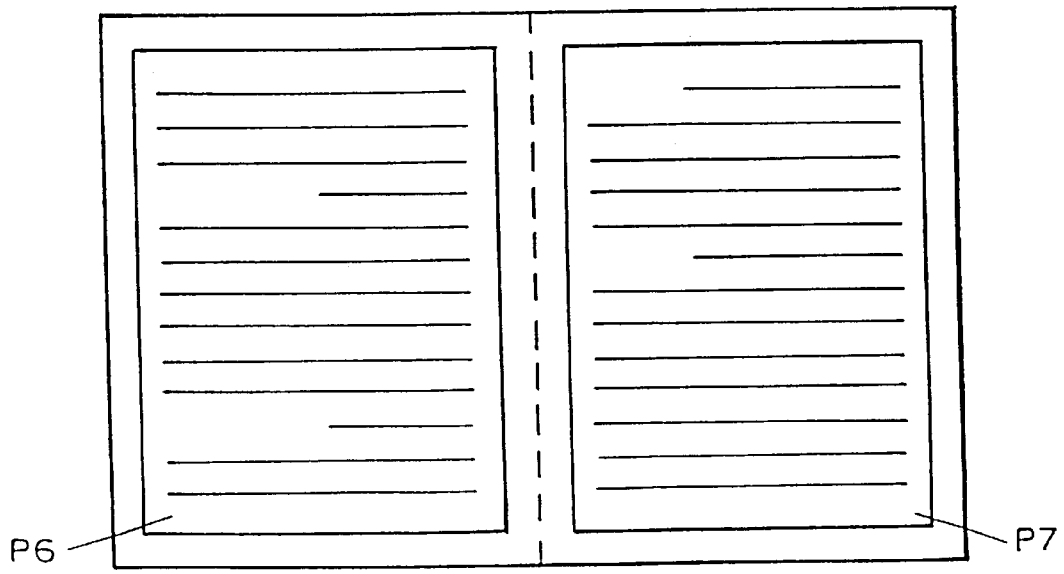

In fact, the books to be produced in the same press run may be different in terms of page content and/or appearance, book length, book size (by changing page imposition parameters), book version, etc. . . . Specifically, for example, the pages of FIGS. 7a, 7b and 8a, 8b may be produced and assembled in different book versions together with the book version incorporating the pages of FIGS. 6a and 6b in the same production run or job. Pages P5–P8 of FIGS. 7a and 7b are identical to the pages P1–P4, respectively, of FIGS. 6a and 6b except that an additional area 113 is provided on the page P5 for placement of variable information, in addition to the areas 110 and 112. Because of the addition of the area 113, the remaining master information appearing in an area 114 differs from master information appearing in an area 116 of the page P1 of FIG. 6a.

Figure 8A:
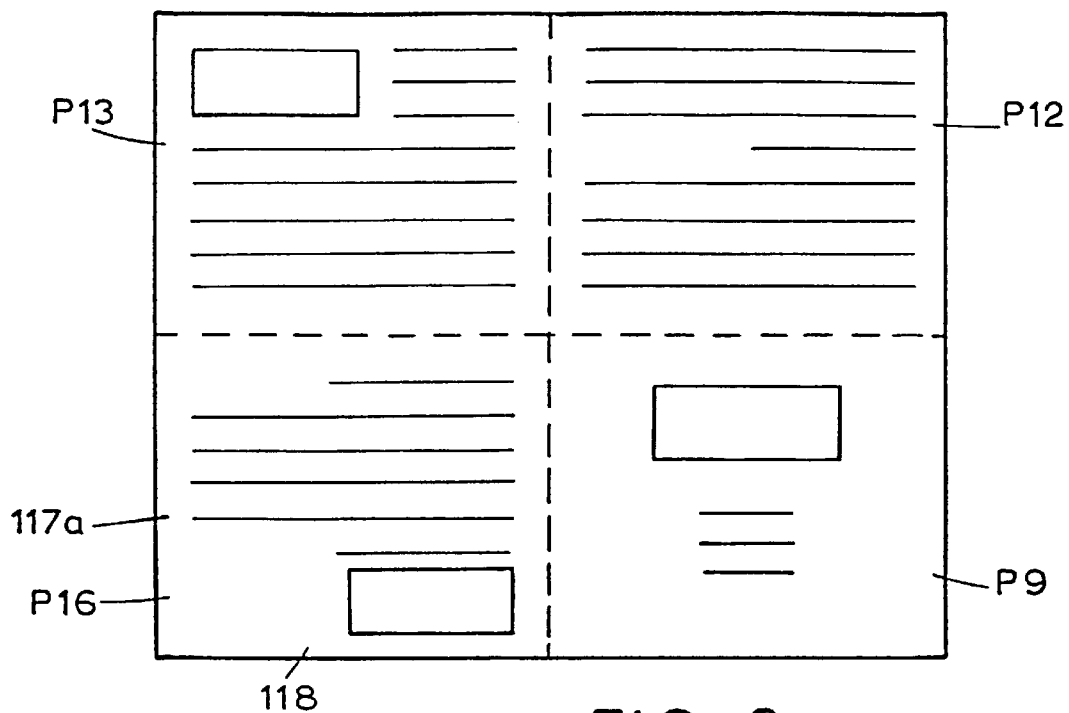
Figure 8B:
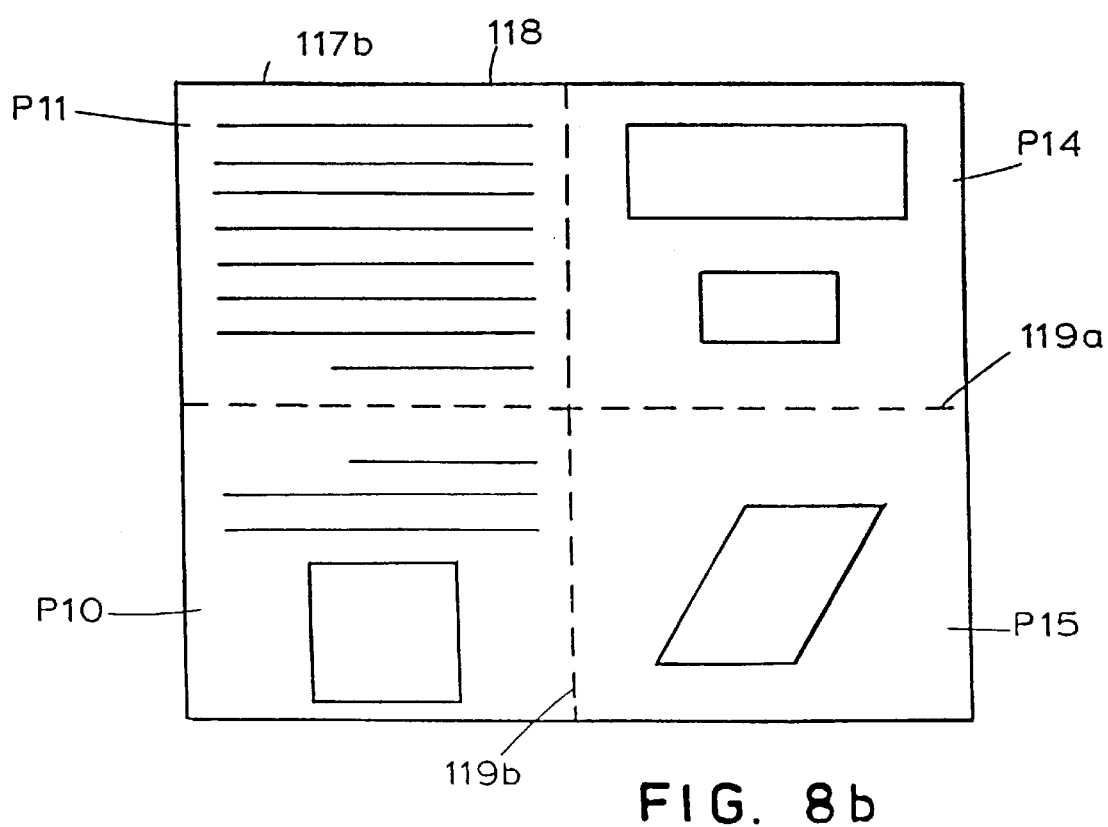

The book version incorporating eight pages P9–P16 of FIGS. 8a and 8b differs from the book versions incorporating the pages of FIGS. 6a, 6b and 7a, 7b not only in terms of content of master and variable information, but also number of pages and page size. Specifically, the pages P9, P12, P13 and P16 are to be printed on a first side 117a of a sheet of paper 118 and the remaining pages P10, P11, P14 and P15 are to be printed on a second side 117b of the sheet 118. In addition, the pages P11–P14 are printed upside down relative to the remaining pages so that, when the sheet 118 is folded first along a fold line 119a and then along a fold line 119b, the resulting pages P9–P16 appear in order. Thereafter, the folded sheet 118 is trimmed to separate the pages P9–P16. As should be evident, the pages P9–P16 are one-half the size of the pages P1–P8, and further include different master and variable information thereon. The demand printer may also have multi paper trays to select different paper sizes, stocks, colors etc. or preprinted sheets to be included in the finished book.

Referring again to FIG. 5, one or more template files 106 are developed by a publisher specifying the content (including appearance) of fixed information and the positioning of all information (i.e., fixed and variable) on the different books or book versions. A database 108 is also developed by the publisher using the personal computer 54 specifying the content of variable information to be placed in variable information areas, for example, the areas 110, 112 on the pages P1, P4, respectively, of FIGS. 6a and 6b. The database 108 includes variable text and graphic information and further includes control information, as noted in greater detail hereinafter.

The template files 106 include data specifying the position and content of fixed information on the pages to be printed. Specifically, the template files 106 define template pages wherein each template page includes data representing any fixed information to be reproduced on corresponding pages of the books or book versions and area data representing any area(s) on the corresponding pages where variable information is to be reproduced. The template files are duplicated to create working files. One set of working files is stripped of all area data relating to placement of variable information to create stripped master page files 120 defining template pages having only fixed information thereon. The stripped master page files are then converted into PDL master page files 122 expressed in a page description language, such as PostScript®.

Optionally, the PDL master page files 122 may be converted into two-page spreads by a page make-up program such as QuarkXPress®. Preferably, however, the PDL master page files 122 are provided to the print system 79 and imposed according to either the "GetTiff" or the "imposition-on-the-fly" imposition processes, as explained in detail below.

A further set of working files is stripped of all fixed information to create stripped variable page files 126 defining template pages having fixed information removed therefrom and further having the area data defining the areas 110, 112. The data representing template pages having variable information thereon are expanded into a set of intermediate page files. In the example of FIGS. 6a and 6b and under the assumption that three books are to be printed, two intermediate page files 130, 132 are thus produced. The file 130 includes a file portion P1-a defining the position of variable information to be produced on the page P1 for the first book. Two other file portions P1-b and P1-c define the position of variable information to be produced on the front outside covers of the remaining two books. In like fashion, file portions P4-a, P4-b and P4-c represent the position of variable information to be reproduced on the back outside covers of the three books. At this point, data is also contained in each of the files 130, 132 identifying the entries in the database 108 to be placed in the areas 110, 112 during printing.

The files 130, 132 are then converted into variable page files 134, 136. The files 134, 136 are identical to the files 130, 132, respectively, except that the data in each file identifying entries in the database are replaced by the actual data stored at such entries. The files 134, 136 are then converted into files 137, 138 in a PDL format, for example, PostScript®.

Like the master PDL files 122, the variable PDL files 137, 138 may be converted into two-page spreads by a page make-up program such as QuarkXPress®. Preferably, however, the variable PDL files 137, 138 are provided to the print system 79 and imposed according to the imposition procedures of the present invention, as explained in detail below.

The print system 79 operates in response to the press commands in a press command file 140 and merges the PDL master page files 122 with the PDL variable files 137, 138 to create the finished books or book versions. Alternatively, the master page files 122 may be premerged with the PDL variable files 137, 138 before the files are provided to the print system 79.

The database 108 is assembled by creating an ASCII file having a plurality of records wherein each record includes one or more fields entered into the database in tab-delimited format (i.e, the fields are separated from one another in each record by tab keystrokes and the records are separated from one another by line returns) and wherein the fields are arranged under field names of a header. Each field may include text to be reproduced on a page or a name of an image file stored in the memory 53 and defining an image to be reproduced on a page.

In addition to the foregoing data, the database 108 may include an optional field designating the number of copies of each book to be produced, an optional townsort image field, a version identification field indicating book version number if multiple book versions are to be produced, an optional distribution list field, control data and the like. A sample database is set out below having a header consisting of fourteen fields (i.e., "version," "address1," "address2," etc.) and a number of records, nine of which are shown. The variable graph information is contained in the fields called "1996 Sales," "1997 Sales," and "1998 Proj."

| Version | Address1 | Address2 | Address3 | Address4 | Address5 | Price1 | Image1 | Price2 | Barcode | 1996 Sales | 1997 Sales | 1998 Proj | Town sort |
|---|---|---|---|---|---|---|---|---|---|---|---|---|---|
| 01 | William Doe | 123 Elm | Chicago | Illinois | 606248923 | $22.95 | Shoes | $21.95 | !606248923! | | 50 | 75 | |
| 03 | Hugh Jorgensen | 56 Maple | Chicago | Illinois | 606248923 | $21.95 | Shirt | $20.95 | !606248923! | 35 | 95 | 100 | |
| 02 | Jay P. Morgan | 1313 Park | Chicago | Illinois | 606248924 | $24.95 | Pants | $22.95 | !606248924! | 45 | 45 | 50 | ■ |
| 02 | Joe Louis | 819 Elm | LaGrange | Illinois | 605251093 | $19.95 | Pants | $18.95 | !605251093! | 75 | 100 | 100 | |
| 03 | John Smith | 926 Cossit | LaGrange | Illinois | 605251093 | $19.95 | Shoes | $15.25 | !605251093! | 25 | 35 | 45 | |
| 01 | Len Johnson | 882 Monroe | LaGrange | Illinois | 605251093 | $19.95 | Shoes | $17.25 | !605251093! | 65 | 75 | 100 | |
| 02 | Janet Cizmar | 916 Monroe | LaGrange | Illinois | 605251094 | $24.95 | Pants | $21.95 | !605251094! | 95 | 75 | 85 | ■ |
| 03 | Jay Schroeder | 88 W. 77th | Brookfield | Illinois | 605241391 | $21.95 | Shirt | $19.95 | !605241391! | 15 | 25 | 35 | |
| 03 | Danielle Johnston | 129 Madison | Brookfield | Illinois | 605241391 | $22.95 | Shirt | $19.95 | !605241391! | 35 | 65 | 75 | ■ |

In the example of FIGS. 6a and 6b, the field names ADDRESS1 through ADDRESS5, BARCODE and TOWNSORT may appear in the area 112 and one or more of the field names PRICE1, IMAGE1 AND PRICE2 may appear in the area 110. The database may also contain a "COPIES" field (not shown) which may be used as a control code to select the number of book copies to be produced.

Figure 9:
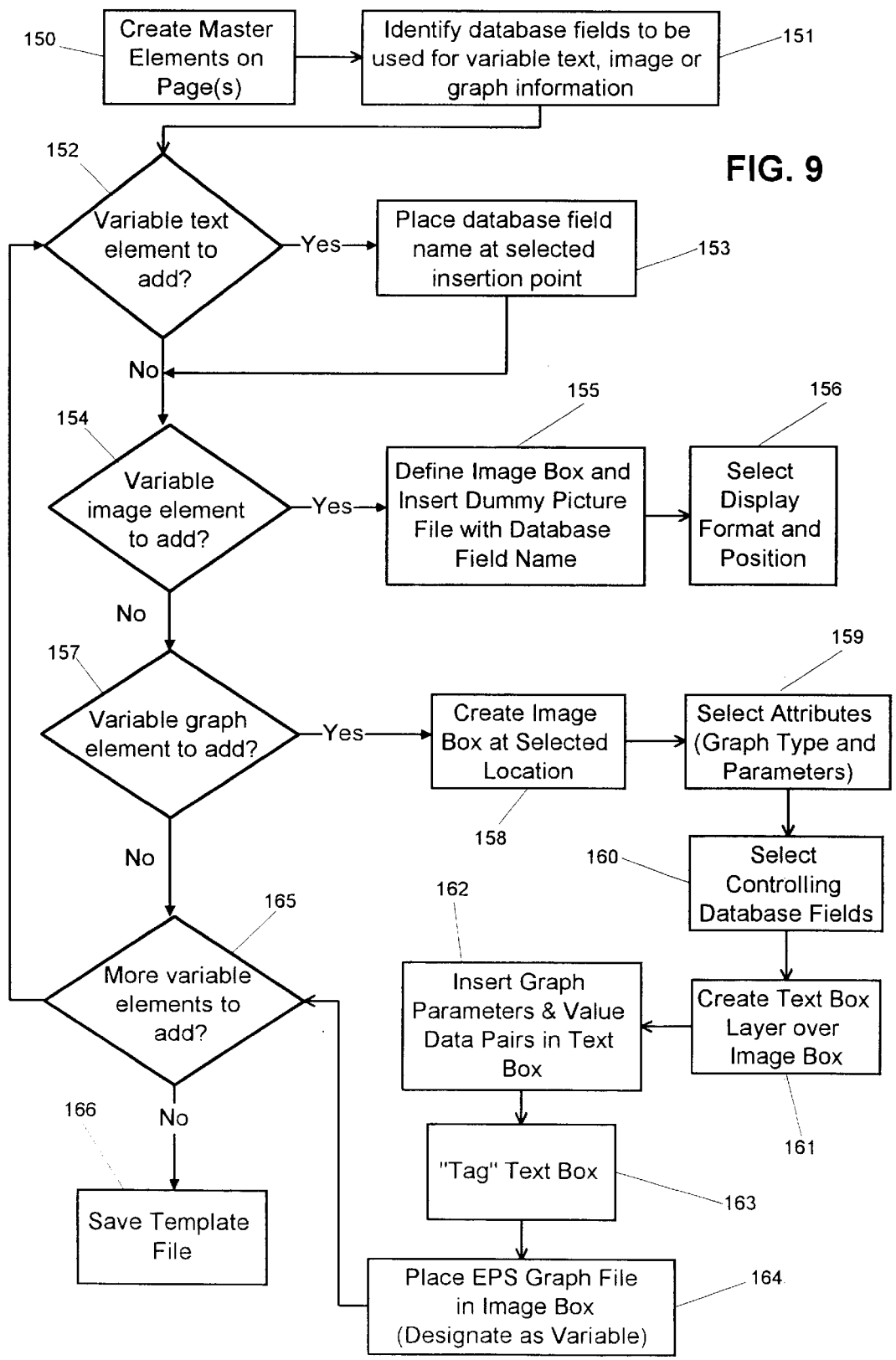
FIG. 9 is a flowchart illustrating programming that may be executed by a user on a personal computer to create the template files 106 of FIG. 5.

FIG. 9 illustrates a flow chart of programming executed by the personal computer 54 for creating the template file(s) 106 of FIG. 5. The programming may be written as an extension of QuarkXPress®, a page make-up program distributed by Quark, Inc. of Denver, Colo. The QuarkXPress® program may be adapted for operation on the Apple® Macintosh® operating system or any other operating system, such as the Microsoft Windows® operating system. Alternatively, a different page make-up program may be used, if desired.

During the make-up process for a document consisting of one or more pages, a template file is created for each book version to be produced, or, where a book is to include two or more parts (referred to as "sections" hereinafter) a template file may be created for each section. At a block 150, a user creates pages containing all the static or master elements to be included. A block 151 then prompts a user to identify the database fields in the variable database 108 which will be used for variable text, image and graph information.

A block 152 then determines whether the user wishes to include a variable text element in a page. If yes, a block 153 places the name or an indication of the appropriate field in the database 108 into the template file at the insertion point defined by the current cursor position. Thus, the variable text contained in the database field will be inserted on the page at the designated insertion point.

After the block 153 inserts the database field name for the variable text element or, alternatively, if the block 152 determined that no variable text element was to be added, a block 154 then determines whether a variable image element should be added to the page. If yes, a block 155 prompts a user to define a box to contain an image at a desired location on a selected page. The block 155 then inserts a dummy picture file and an indication of the proper database field name in the template file for the page at the location indicated by the current cursor position. The user will thereafter see the dummy picture file at the insertion point on the display of the computer 54 when the page is viewed. The dummy picture file will display an indication of which database field will be used for insertion on the respective pages.

Following the block 155, a block 156 prompts the user to enter an indication of whether the image object is to be displayed in one of several display formats. If the image is to be displayed in other than the original size thereof, a subname is defined for the image to "fit," indicating that the image is to be scaled to fit the box. If the image is to be displayed in the original size thereof, the user is prompted to select a position for the image at a particular location in the box defined therefor, such as the upper left-hand corner, the lower right-hand corner, or the like. If the user does not select a position, the image is placed in the upper left corner of the image box.

Following the block 156 or, alternatively, if the block 154 determines that no variable image element is to be added, a block 157 then determines whether any variable graph elements are to be included. If yes, a block 158 creates an image box at the position on the page where the graph will be inserted. A block 159 then prompts a user to select any attributes, such as the graph type and parameters (i.e. bar graph or pie chart, size, labels, colors, etc.), as described in greater detail below.

Next, a block 160 identifies the controlling database field names (in the database 108) for the variable information to be included on the graph. The database fields may contain both variable graph values as well as variable graph parameters. Thus, a first version may include a small bar graph while a second version may include a larger pie chart. A block 161 then creates a text box one layer above the image box generated by block 158 and a block 162 saves the graph parameters (which were input by the user at the block 159 or obtained from the database 108) as data pairs in the text box. The layering of the text box above the image box assures that the graph parameters will be read before the EPS graph file. The block 162 also saves the graph values as data pairs in the text box. The graph values are obtained from the database fields specified by the block 160.

As described in detail below, the graph parameter and value data pairs in the text box will be converted into PostScript® variables and used to generate the desired graph during interpretation of the page files.

A block 163 then "marks" or "tags" the text box so that the interpreter will recognize that the text box will be used to generate a graph. The text box may be tagged in a number a ways, such as assigning the text box an unusual attribute, such as an unusual color or font. The text box could also be tagged by placing text delimiters in the text box. For example, a unique text string (such as "%#?!BeginVariableGraphData") could be placed at the beginning of the text box and another unique string (such as "%#?!EndVariableGraphData") could be placed at the end of the text box. A sample text box tagged using text delimiters and including graph parameters data pairs to create a pie chart with labels is set forth below:

%#?!BeginVariableGraphData
sChartType Pie
bShowLabels True
bShowPercents True
nXExtent 400
nYExtent 200
aXD1 xRBIpc XRunspc XOutspc xLeftpc
aXLbls RBIs Runs Scored Out Hits Without Score
%#?!EndVariableGraphData Next, a block 164 places an Encapsulated PostScript® (EPS) graph file into the image box created by the block 158. As described in detail below, the EPS graph file will be executed by the interpreter to generate the graph. The block 164 also designates the EPS graph file as variable data. Although the EPS graph file is actually static (it does not change), it must be designated as variable because it will be used with the variable graph parameters and values.

Control then passes to a block 165 which determines whether any additional variable elements should be added to the template file. If yes, control returns to the block 152 and the loop of blocks 152–165 is repeated until all variable elements (text, image and graphs) have been added. Control then passes to a block 166 which saves the template file 106 (FIG. 5). The programming of FIG. 9 is repeated until all template files have been created.

The resulting page template files(s) are stored on a storage medium, such as an optical disc or other storage device, and/or the files(s) are downloaded together with the database to the control unit 52.

At any point during the page make-up process, other functional aspects of the QuarkXPress® program may be invoked to both master and variable aspects as necessary to produce finished pages.

The Graph Parameters

As set forth above, the block 159 prompts a user to select the graph type and parameters and the block 162 inserts this information into the text box (in the template file) as data pairs, along with the graph value data pairs. First, the user must select the type of graph, such as a bar chart, pie chart, line graph, scatter diagram, or any other type of graph. If a user does not specify an option for any parameter, a default option will be used. Also, the graph type and parameters may be included as fields in the variable database 108 such that the graph parameters, as well as graph values, may vary.

If the user selects a bar chart, for example, the block 159 will then prompt a user to select the parameters listed below.

1) Two-dimensional or Three-dimensional—If the user chooses a 3D bar chart, the user may also specify the amount of increase or decrease of shading applied to the side of the bar as compared to the face of the bar.

2) Orientation—Horizontal or vertical.

3) Size—The size (i.e length) of the x- and y-axes. Size may be specified in either inches or points, but preferably the size provided to the EPS graph file will be converted to inches. The user may also select "autosize," wherein the axes sizes will be determined by the EPS graph file based on the total size of the graph.

4) Bar Width—May be fixed or variable. The user may specify the bar width or it may be automatically determined by the EPS graph file.

5) Number of Bars Per Group per x-value—The number of bars at each point on the x-axis. The default value is 1 but a user may select to have 2 or more bars adjacent to each other (for example, as a comparison between two years).

6) Color—The user may choose color or black and white (grayscale). If color, the user may choose one unique color per category from a list of any number (for example, 10) default colors (such as red, blue, green, yellow, orange, black, etc.). Preferably, the colors are converted to CMYK equivalents but other color schemes may be implemented. Alternatively, the user may specify any number of customized colors (also converted to CMYK equivalents). If the user chooses black and white for the bar graph, the user may also select one unique grayscale for each category from a list of any number of default alternating grayscales or the user may custom specify grayscales.

7) Vignette Shading—The default setting is for no vignette shading such that the bars will be printed in a solid color. The user may specify vignette shading by choosing a starting and ending color and the EPS graph file will automatically shade the bar accordingly.

8) Y-Axis Bar Scaling—The y-axis may to scaled to automatically fit the maximum data point (both positive and negative) specified in the database or by the user. The user may also specify that the y-axis be scaled with a broken axis (such as when there is a wide numerical range of data) and may further specify where the axis should be broken and/or how far up on the axis the break should occur.

9) Y-Axis Divisions—The user may specify the number of divisions on the y-axis or may choose for automatic divisions (with intelligent rounding applied) based on the size and scaling of the y-axis.

10) X-Axis Bar Scaling—As a default, the space between bars in separate groups is equal to the width of the bars and the space between bars in the same group is none (i.e. the bars are adjacent). The user may also specify the spacing between bars, preferably as a percentage of bar width. The user may also select a leading space (before the first bar) and/or a trailing space (after the last bar).

11) Line Color—The user may specify the color for the axes and other lines, such as division markers. Generally, the default is black but the user may select any CMYK equivalent color or specify no color.

12) Numeric Callouts—Numeric callouts are labels that may be placed at the top or inside of each bar which specify the value that the bar represents. The default setting is for no numeric callouts but, if desired, the user may specify where they should be placed and the format (i.e., numeric or percent of maximum value).

13) Field Name Callouts—Field name callouts are labels that are placed along the x-axis at the base of each bar. The default setting is for no field name callouts but the user may specify that field names be placed inline (parallel) with the base of each bar or perpendicular to the base of each bar.

14) X-Axis and Y-Axis Labels—The user may specify text labels for the x- and y-axes, as well as the font, size, color, position and orientation of such text.

15) Legend—The user may also specify that a legend be placed at the lower right corner of the chart (or other location) with a key to the color-coding on the chart. For example, the legend may print a small blue bar followed by "1996" and a small red bar followed by "1997" to indicate that different colored bars represent different years.

16) Graphics Object—In the default setting, the bars on the graph will be drawn as standard rectangles. The user, however, may wish to use graphics in place of the rectangular bar. For example, a transportation company may wish to use bars in the shape of trucks or a soft drink manufacturer may wish to use bars in the shape of bottles. If so, the user must specify the desired graphics object (for each category, if more than one) and the name of the file (such as an EPS file) containing the graphics object at 100% of its size. The user may then select either a scale mode, wherein the graphics object will be scaled (i.e. stretched or shrunk) according to the numeric value it represents or a clip mode, wherein the graphics object will be cut-off or clipped in accordance with a numeric value.

If the user selects a graph type different than a bar chart, similar parameters must be selected, depending on the graph type. For example, if the user selects a pie chart, the following parameters will be selected:

1) Two-dimensional or Three-dimensional—With desired shading modification if 3D, as described above.

2) Color—Select CMYK or grayscale color for each category (i.e. pie segment), as described above.

3) Line Color—May select default (black), CMYK color or no color for lines surrounding pie chart and separating pie segments. The user may also select the line width (default=1 point).

4) Radius—Size of pie chart (specified in inches or points but preferably provided to EPS graph file in inches).

5) Numeric Callouts—Labels placed inside or next to a pie segment indicating its numeric value. The default setting is for no numeric callouts but the user may specify that numeric callouts be centered (at radius/2) within the pie segment or next to the pie segment with a line (from radius/2 to 3*radius/2) between the number and the pie segment. Alternatively, numeric callouts may be placed within the pie segment if the segment is large (i.e. >30°) or next to the segment if the segment is small (i.e. <30°).

6) Field Name Callouts—Labels that may be placed inside or next to pie segments indicating what the segment represents. The default setting is for no field name callouts but the user may specify that they be positioned like the numeric callouts above.

7) Text—The user may specify the font, size, color, etc. of any text used in the pie chart.

8) Exploding Option—As a default, all pie segments will be enclosed within a circle. The user may specify, however, that selected segments be "exploded" or set off radially from the rest of the circle.

9) Legend—The user may specify a legend (such as a color code index) positioned, for example, in the lower right corner of the chart or other location.

10) "Other" Category Creation—When using pie charts, sometimes the data for the chart does not add up to exactly 100%. If this is the case, the user may specify an "other" category to be automatically included for the remaining percentage of the pie chart. For the default setting, an "other" category would not be automatically created.

The above-described parameters for bar charts or pie charts exemplify the type of parameters that the user may be prompted to enter by the block 159 (FIG. 9) or that may be included as fields in the variable database 108. All parameters should have default settings such that graphs can be generated without the user specifying each parameter. As will be evident to those skilled in the art, other types of graphs (line graphs, scatter diagrams, etc.) that may be generated in accordance with the present invention may include slightly different parameters (i.e. dot size, line width, etc.). Also, the present invention provides unlimited flexibility to use other parameters to specify any type of graph.

The block 162 (FIG. 9) saves the graph parameters specified by the user (or in the database) as data pairs in the text box, with the parameter data preceding the parameter name. These data pairs will be converted into Postscript® variables and used by the EPS graph file which generates the desired graphs.

The EPS Graph File

Referring back to FIG. 9, the block 164 places the Encapsulated Postscript® (EPS) Graph file into the image box created in the template file. The EPS graph file contains Postscript® code that is executed as the pages are interpreted to generate the graph. (Alternatively, the graph file could be written in a different page description language than PostScript®).

Figures 1, 9A:
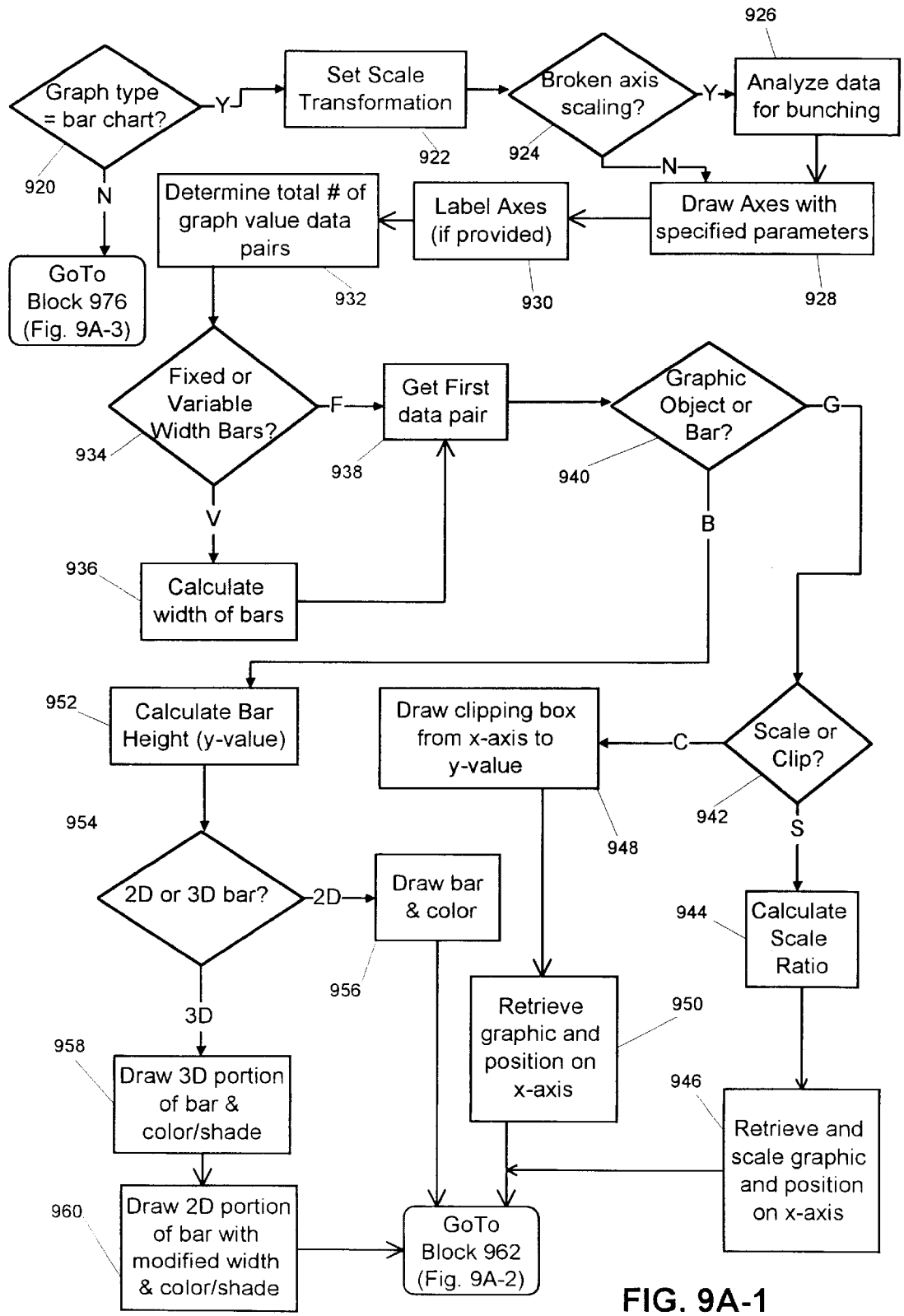
Figures 2, 9A:
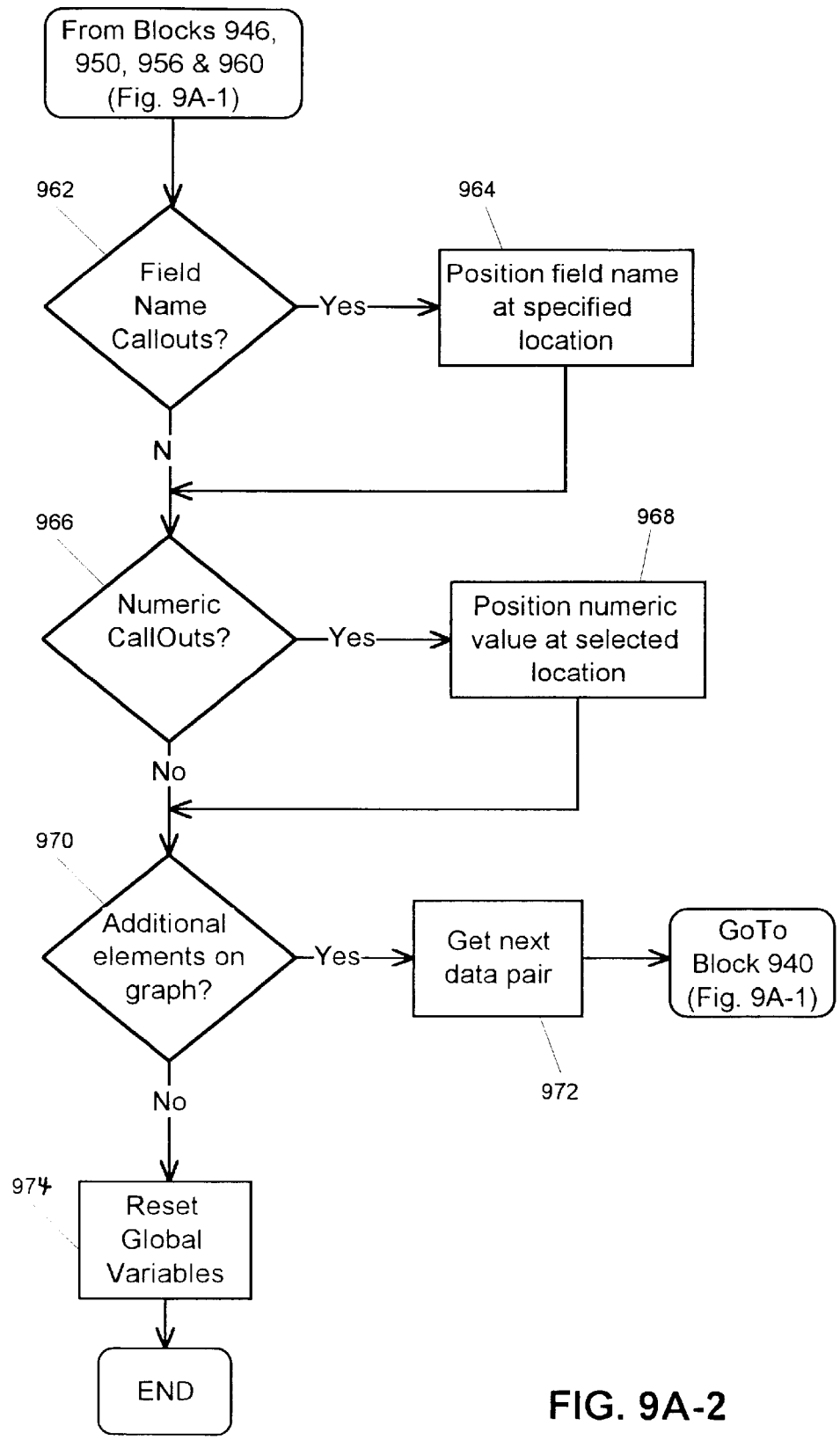
Figures 3, 9A:
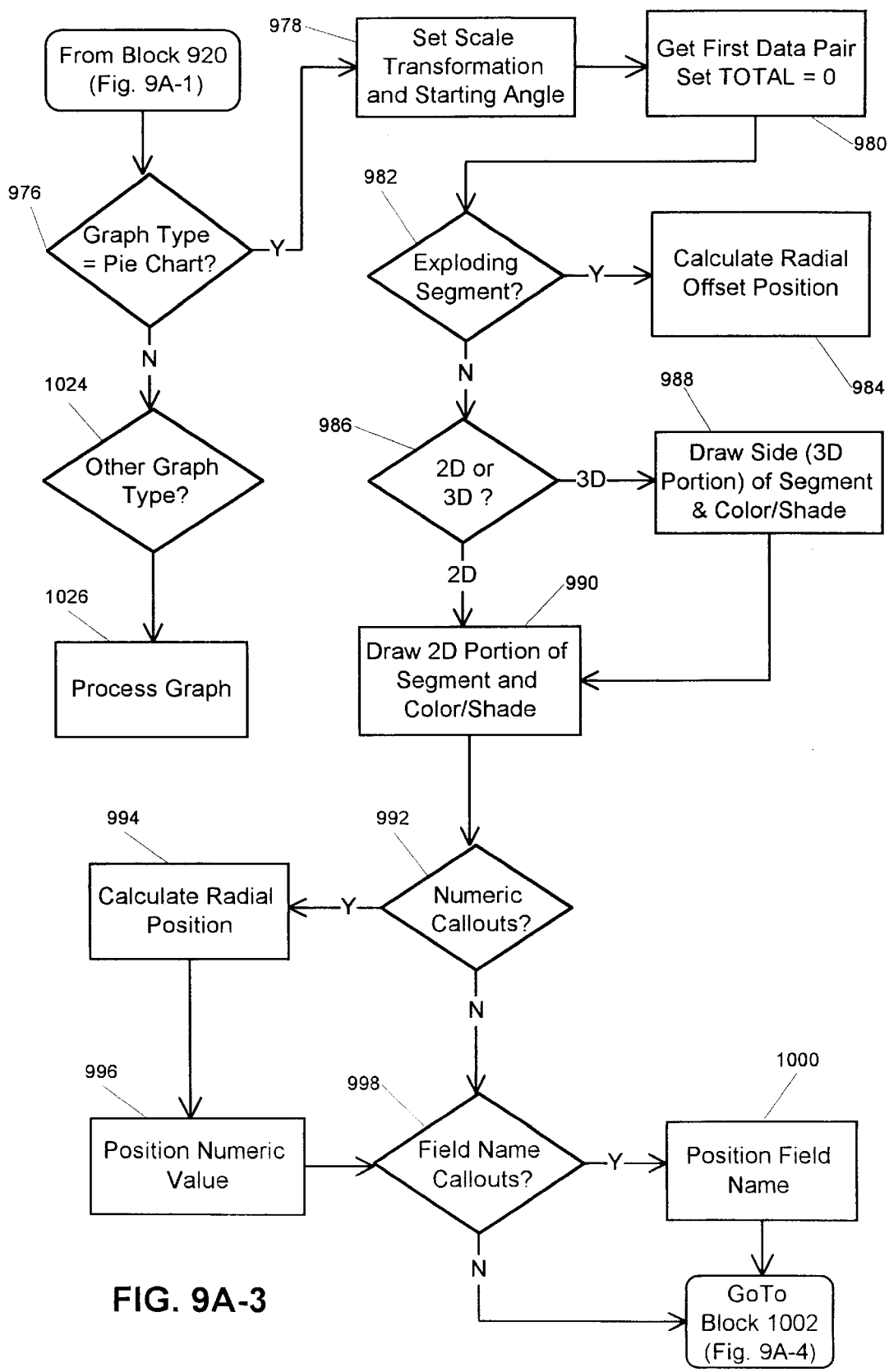
Figures 4, 9A:
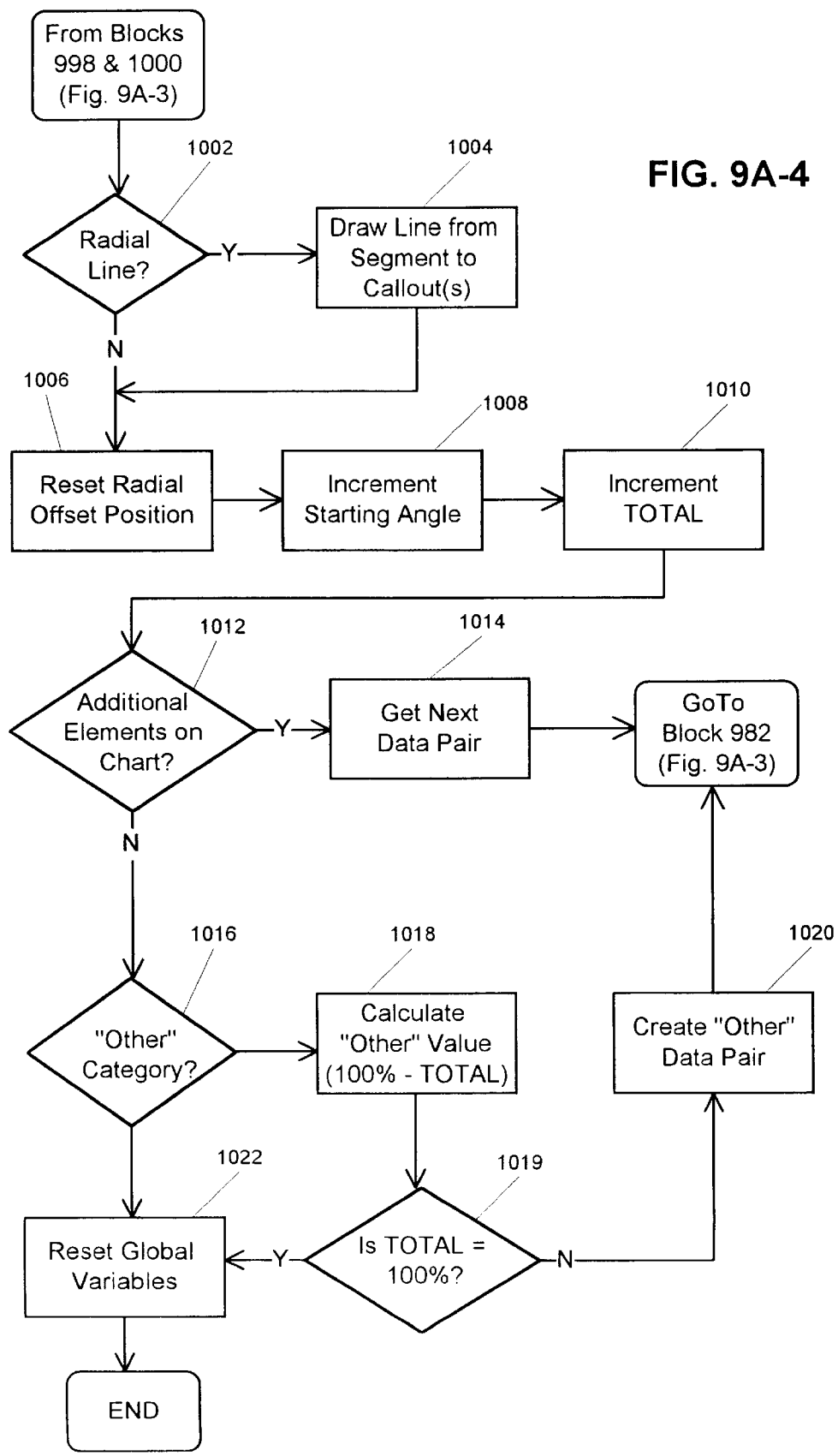

FIGS. 9A-1, 9A-2, 9A-3 and 9A-4 are flowcharts illustrating the programming of the EPS graph file which is executed by the interpreter. Referring first to FIG. 9A-1, the program begins at a block 920 which determines whether the graph type is a bar chart. (The graph parameters were either specified by the user at block 159 of FIG. 9 or contained in the database 108). If no, control passes to a block 976 (FIG. 9A-3) which determines whether the graph type is a pie chart. Alternatively, if the block 920 determines that the graph is a bar chart, a block 922 sets a scale transformation based on the size of the x- and y-axes.

Next, a block 924 determines whether the user specified that the x-axis or y-axis should incorporate a broken scale. If yes, and the user did not specify where the axis should be broken, a block 926 then analyzes the data for "bunching" to determine where to break the axis. For example, if the graph values are all between 100 and 105, the block 926 will take the maximum and minimun values (105 and 100) and spread them over 80% of the axis. The remaining 20% of the axis will include a broken line to indicate the values between 0 and 100.

If the block 924 determines that there is no broken axis, the programming skips block 926 and control passes to a block 928 which draws the x- and y-axes according to the specified parameters, such as color, width, orientation and (if specified) breaks. Next, a block 930 places the appropriate labels on the axes in accordance with the specified text style. (If no axes labels were specified, the block 930 is skipped).

A block 932 then determines the number of graph value data pairs that were saved in the text box by the block 162 (FIG. 9) from the specified fields in the variable database 108. These data pairs from the text box will later be converted to Postscript® global variables. (See block 1114, FIG. 11).

Next, a block 934 determines whether the width of the bars are fixed or variable. If variable, a block 936 calculates the width of the bars based on the amount of space that the user specified should be between the bars. If no space was specified, the block 936 calculates the width of the bars based on the default that the space between the bars should be equal to the width of the bars.

After the block 936 calculates the bar width or, alternatively, if the block 934 determines that the bar width is fixed, a block 938 retrieves the first graph value data pair. A block 940 then determines whether the bars will be drawn as standard rectangles or whether a graphic object (i.e. truck, bottle, etc.) has been specified.

If a graphic object has been specified, a block 942 determines whether the graphic object should be scaled or clipped. If the graphic object should be scaled (i.e. stretched or shrunk to correspond to the numeric value), a block 944 calculates the correct scale ratio. The block 944 assumes that the graphic object supplied by the user is at 100% size corresponding to the middle value on the y-axis. Thus, if the y-axis is scaled from 0 to 10 (middle value=5) and the data pair has a y-value of 8, the block 944 calculates the scale ratio as 8/5 or 1600%. A block 946 then retrieves the graphic object (from the file specified by the user), scales the graphic object by the calculated scale ratio and positions the scaled graphic object at the appropriate position on the x-axis.

Alternatively, if the block 942 determines that the graphic object should be clipped, a block 948 draws a clipping box corresponding to the y-value from the data pair. The block 948 assumes that the user supplied graphic object is at 100% size corresponding to the maximum value on the y-axis. Thus, if the y-axis is scaled from 0 to 10 and the data pair has a y-value of 8, the block 948 draws a clipping box that extends from 0 to 8. A block 950 then retrieves the graphic object and positions it on the x-axis inside of the clipping box. Any portion of the graphic object outside of the clipping box will be deleted. Thus, the portion of the graphic object that would fall between 8 and 10 on the y-axis will be cut-off or clipped.

If the user has specified that the y-axis is broken, the program determines where the break on the axis occurs and assumes that the minimum value on the graph corresponds to zero in order to determine how the bar (or image) should be scaled or clipped.

If the block 940 determines that the chart will include only standard rectangular bars, a block 952 calculates the bar height based on the y-value from the data pair. A block 954 then determines whether the user specified two-dimensional (2D) or three-dimensional (3D) bars. If 2D, a block 956 draws the bar according to the previously determined height and width. The block 956 may also fill the bar with the specified or default color (including vignette shading, if specified). If 3D, a block 958 draws the "shadow" of 3D portion of the bar, including coloring or shading, if specified. A block 960 then draws the 2D (or front) portion of bar, with a modified (narrowed) bar width in order to accomodate for the 3D. The block 960 also colors and shades the portion as necessary.

After the appropriate graphics object or bar has been drawn by the blocks 946, 950, 956 or 960, control passes to a block 962 (FIG. 9A-2) which determines whether any field name callouts have been specified. The field name callouts are the labels which may be placed at the base of the bars along the x-axis. If yes, a block 964 positions the field name at the specified location (inline or perpendicular with the bar). Otherwise, control skips to a block 966 which determines whether any numeric callouts have been specified. Numeric callouts are numeric values placed inside or on top of the bars to indicate their value. If yes, a block 968 positions the numeric callout at the specified location.

After the block 968 or, alternatively, if the block 966 determines that no numeric callouts were specified, a block 970 determines whether any additional elements should be included on the graph. The block 970 may determine this by subtracting the number of data pairs processed from the total number of graph value data pairs (determined by block 932). If more data pairs should be included, a block 972 gets the next data pair and control returns to the block 940 (FIG. 9A-1). The loop of blocks 940–972 is repeated until all data pairs have been incorporated in the graph.

After the block 970 determines that all data pairs have been processed, a block 974 then resets all of the Postscripts global variables in preparation for the next graph.

If the block 920 (FIG. 9A-1) determines that the graph is not a bar graph, control skips to a block 976 (FIG. 9A-3) which determines whether the graph type is a pie chart. If yes, a block 978 sets a scale transformation and starting angle (based on user specified size or defaults) to begin drawing the pie chart. A block 980 then retrieves the first graph value data pair and sets a variable (called, for example, "TOTAL") equal to zero. The TOTAL variable will be used to keep track of the total combined values of the pie segments.

A block 982 then determines whether the pie segment will be an "exploding" segment, which is set off from the circle. If yes, a block 984 calculates a radial offset position to determine where to place the segment. Alternatively, if the block 982 determines that the segment is not "exploding," control skips to a block 986 which determines whether the pie segment is two-dimensional (2D) or three-dimensional (3D).

If the block 986 determines the segment if 3D, a block 988 draws/strokes the side (or 3D portion) of the pie segment and also colors/shades it appropriately. If the segment is 2D, or after the block 988 draws the 3D portion of the segment, a block 990 draws/strokes the 2D portion of the pie segment corresponding to the value retrieved by the block 980. The block 990 also fills the pie segment with the specified color, pattern and/or shading. The program then skips to a block a block 992 which determines whether numeric callouts are specified.

Numeric callouts are the numeric labels placed inside or next to the pie segments which indicate their value. If the block 992 determines that numeric callouts were specified, a block 994 calculates the radial position of the numeric callout and a block 996 places the numeric value in the appropriate font, color, etc. at the radial position calculated by block 994.

Alternatively, if the block 992 determines that no numeric callouts were specified, control skips to a block 998, which determines whether any field name callouts were specified. Field name callouts are labels placed inside or next to the pie segments that indicate what the segment represents. If field name callouts are specified, a block 1000 places the field name above the numeric callout, if a numeric callout was generated by the block 996. If no numeric callout was generated, the block 1000 calculates a radial position for the field name and places that field name in the appropriate font, color, etc. at the calculated position.

Control then passes to a block 1002 which determines whether a radial line should be placed between the numeric/field name callout(s) and the pie segment. If yes, a block 1004 draws a line from inside the segment (radius/2) to the numeric/field name callout radial position.

If the block 1002 determines that no radial line should be drawn, control skips to a block 1006 which resets that radial offset position (which was set by the block 984 in accordance with the graph value from the first data pair) and a block 1008 increments the starting angle.

A block 1010 then adds the data value (from the data pair) to the variable "TOTAL," which keeps track of the cumulative value of the segments and a block 1012 determines whether any additional elements (i.e. graph values from data pairs) should be included in the pie chart. If yes, a block 1014 gets the next data pair and control returns to the block 982.

The loop of blocks 982–1014 is repeated until all data pairs have been processed. After the block 1012 determines that all data pairs have been processed, a block 1016 determines whether an "other" category should be included in the pie chart. (The "other" category is the remainder if the pie segments do not add up to 100%). If yes, a block 1018 calculates the value of the "other" category by subtracting the value of the variable TOTAL from 100%. A block 1019 then determines whether the value of TOTAL is equal to 100%. If no, a block 1020 creates an additional data pair with the value of the "other" category and control returns to the block 982 to draw the "other" segment.

Alternatively, if TOTAL is equal to 100% (indicating the "other" data pair has already been created) or if no "other" category is needed in the pie chart, a block 1022 resets all of the Postscript® variables (which specified the graph parameters and values) in preparation for generating the next graph.

Figure 10A:
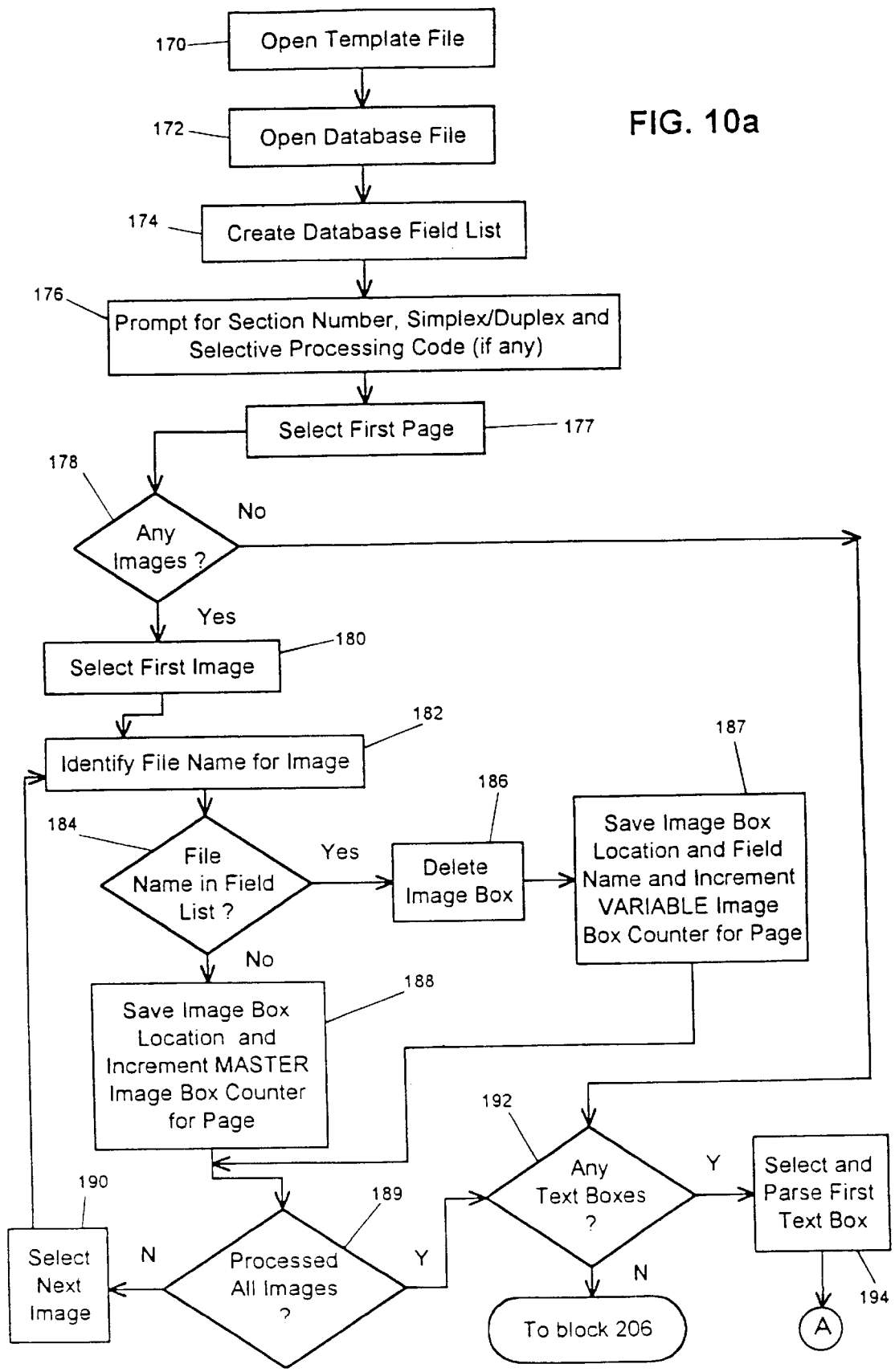
FIGS. 10a–10f, when joined along similarly-lettered lines, together represent programming executed by the control unit 52 of FIG. 3 to create the PDL master and variable files.

If the block 976 determines that the graph is not a pie chart, the program may skip to a block 1024 (FIG. 9A-3), which determines that the graph is of another type (such as a line graph, scatter diagram etc.) and the program may continue with processing to generate that graph, as indicated by block 1026. Based on the programming illustrated for generating bar graphs and pie charts set forth above, one skilled in the art would be able to generate programming to implement another type of graph. Once the template file(s) 106 and the database 108 are assembled, the programming of FIGS. 10*a*–10*f* may be executed by the control unit 52 to create the master page file 122, the final variable page files 137 and 138, and the press command file 140. Referring first to FIG. 10*a*, a block 170 prompts a user to select a template file 106 and a block 172 opens the database 108. A block 174 then reads and stores in a list the database field names for later reference and a block 176 prompts a user to enter information indicating a section number and whether pages are to be printed in simplex (i.e., single-sided) or duplex (i.e., double-sided) format. The section number identifies the order in which multiple sections are to be processed for a particular book. The user may also be prompted to enter a selective processing code identifying a particular book version to process if multiple versions are to be produced during a single press run.

Following the block 176, a block 177 begins the process of stripping variable information from the template file opened by the block 170 to obtain the stripped master file 120 of FIG. 5. The block 177 selects a first page for processing and a block 178 checks to determine whether there are any images in the template file and, if images are located, a block 180 selects a first image.

A block 182 identifies the file name for the image and a block 184 checks the field list to determine whether the file name is included therein. If the file name for the image is included in the field list, then the image comprises variable information and a block 186 deletes the image box. A block 187 then identifies and saves the image box location on the page, the characteristics of the image box, such as the size, skew, background color and subname and the like and further saves the field name of the image from the database 108. Also, a counter in the memory 53 which tracks the number of variable image boxes on the page is incremented.

Otherwise, if the block 184 determines that the file name is not in the field list, then the image contains only master information. A block 188 then also saves the image box location on the page and the characteristics of the image box. Also, a counter in the memory 53 which tracks the number of master image boxes on the page is incremented.

A block 189 then checks to determine whether all images have been processed. If not, a block 190 selects a next image and control returns to the blocks 182–189. Control remains with such blocks until the block 189 determines that all images have been processed and control then passes to a block 192. Control also passes to the block 192 from the block 178 should the latter determine that there are no images in the template file.

The block 192 determines whether any text boxes are present in the open template file. If at least one text box is present, a block 194 selects and parses a first text box and a block 196 (FIG. 10*b*) checks to determine whether the text box includes at least one of the field names of the database 108. If so, then it has been determined that the text box includes variable information and a block 198 deletes the text box. A block 199 then stores the text box location, the insertion points in the text box at which variable information is to be printed and the characteristics of the text box and the field names of the database 108 identified in such text box in the memory 53. In addition, a variable text box counter is incremented representing the number of variable text boxes appearing on each page.

Otherwise, if the block 196 determines that the text box does not include any field names from the database, then the text box contains only master information. A block 200 stores the text box location in the memory 53. In addition, a master text box counter is incremented representing the number of master text boxes appearing on each page.

Control then passes to a block 202, which checks to determine whether all text boxes in the template file have been processed. If not, a block 204 selects and parses the next text box in the template file and control returns to the blocks 196–202. Control remains with such blocks until all text boxes have been processed, whereupon a block 206 determines whether all pages have been processed. If not, a block 208 selects a next page and control returns to the block 178 (FIG. 10*a*). Otherwise, a block 210 saves the resulting file as the stripped master file.

Alternatively, if a page contains a lot of formatting information (i.e. tabs, fonts, etc.), a rich text file (which includes such formatting information) may be created offline from the database. The text box may then open the rich text file and read the information from the file. The use of the rich text file speeds up the processing time.

Also, once a placeholder on a page has been "filled in" with information from the database field, the program may mark the corresponding text or image box as "touched." Thus, if the text or image box is "untouched," the program can skip processing of that text or image box, also speeding up the total processing time.

Control also bypasses the blocks 194–202 and proceeds directly from the block 192 to the block 206 if the block 192 determines that there are no text boxes in the open template file.

Following the block 210, a block 212 converts the stripped master file into the PDL master page file 122 of FIG. 5. At the same time, an initialization (or INI) file may be created. The format and existence of the INI file depends on the type of demand printer utilized. For example, the DocuPrint demand printer does not require the use of an INI file. However, the Barco RIP requires the use of an INI file.

The INI file (in ASCII code) for the Barco RIP is created according to the following format:

name: [file path\name]
psx: [dimension]
psy: [dimension]
ssx: [dimension]
ssy: [dimension]
posx: [dimension]
posy: [dimension]

duplex: [zero or one]
orientation: [zero or one]
output: [filename]
copies: [number]

Where "psx" and "psy" refer to finished page sizes in x and y directions, "ssx" and "ssy" refer to cut sheet size in x and y directions, "posx" and "posy" refer to offsets in x and y directions specifying placement of each page on a cut sheet, "duplex" refers to single or two-sided printing, "orientation" refers to portrait or landscape printing, "output" refers to the name of the output file and "copies" refers to the number of copies to be printed. A sample INI file which specifies parameters for printing of a file called MYJOB.PS is as follows:

Name: C: \jobs\myjob.ps
psx: 8000
psy: 11000
ssx: 11500
ssy: 9000
posx: 150
posy: 150
duplex: 1
orientation: 1
output: myjob.ps
copies: 1

In the foregoing example, one copy of the file MYJOB.PS is to be printed in duplex and portrait formats at an offset of 0.15×0.15 inches from a corner of a finished sheet of paper 8×11 inches cut from a sheet originally having dimensions of 9×11.5 inches.

For the DocuPrint (or any other demand printer which does not use an INI file), a queue is created which contains the same parameters (and potentially additional parameters which may invoke the functionality of an in-line finisher, or other apparatus) as the INI file.

Following the block 212, a block 214 then reopens the same template file originally opened by the block 170 and deletes all the master image and text boxes. A block 216 than saves the resulting file as the stripped variable file 126 of FIG. 5.

A block 218 then creates a temporary file containing a table of the current page number and a number representing the name of the database field placed by the block 154 at the insertion point. The file is called, for example, *.VARS (where * is a user-selected file name). The *.VARS file thus contains pairs of page numbers and database column numbers that indicate where in the database variable information for the page comes from. For example, the *.VARS file may contain the following information:

1 7
8 43
9 44
10 45
11 46
11 47
13 50
14 52
15 50
15 51

In the example above, page 1 contains variable data from column 7 of the database, page 8 contains variable data from column 43 and page 11 contains variable data from column 46 and 47. Further, the *.VARS file may contain separate pairings for images and text.

Control then passes to block 242 (FIG. 10c) which creates a working copy of the stripped variable file 126. A first page having variable data thereon is selected and data representing the remaining pages in the file are deleted by a block 244. In the example of FIGS. 6a and 6b, the block 244 creates a file defining the front cover of a book with all fixed information deleted therefrom and an area reserved for variable information.

Following the block 244, a block 246 selects a first record in the database 108 and a block 248 reads the record. An optional block 250 checks to determine whether a selective processing code has been entered by the user indicating that the page is to undergo selective page processing. As noted above, the apparatus and method of the present invention may be utilized to produce not only books of a single version (i.e., where corresponding pages differ only in terms of the variable information stored in the database) but also books of different versions. In the latter case, the books of different versions have different fixed and variable information. The fixed and/or variable information may vary in terms of content or appearance (i.e., style, location, rotation, position, etc.) or both in different versions.

If the block 250 determines that selective page processing is to be undertaken, then a block 252 checks to determine whether the database record read by the block 248 is to be utilized on the page currently under consideration. The block 252 accomplishes this by checking the version identification field in the database to determine if that version is being used. If this is not the case, a block 253 checks to determine whether the record currently under consideration is the last in the database. If so, control passes to a block 294 of FIG. 10e. Otherwise, a block 254 selects a next record in the database 108 and control returns to the block 248 where the next database record is read.

If the block 250 determines that selective page processing is not to be undertaken, or if the block 252 determines that the record read by the block 248 is to be used in the page currently under consideration, a block 256 duplicates the data representing the page remaining after execution by the block 244 to initiate development of one of the files 130 or 132. In the first pass through the program of FIG. 10c, and in connection with the example of FIGS. 6a and 6b, the block 256 creates the file 130 and develops page data representing a first version of the page P1-a and adds further variable information to such page data during immediately succeeding passes through the program. Thereafter, data representing the remaining pages P1-b, P1-c and P4-a through P4-c are created and variable information is added to such pages serially during subsequent passes.

A block 258 checks to determine whether there are any image boxes on the page and, if so, a block 260 selects a first image box. A block 262 then inserts the image identified by the database field into the image box. A block 264, FIG. 10d, checks the subname to determine whether the block 156 of FIG. 9 has indicated that the image should be sized to fit the image box. If this is true, a block 266 performs the scaling. Otherwise, a block 268 positions the image in the image box at the position specified by the user and a block 270 checks to determine whether all image boxes have been processed. Control also passes from the block 266 directly to the block 270, thereby skipping the block 268. If not all image boxes have been processed, a block 272 selects a next image box on the page and control returns to the blocks 262–270 so that remaining image boxes are serially processed.

Figure 10B:
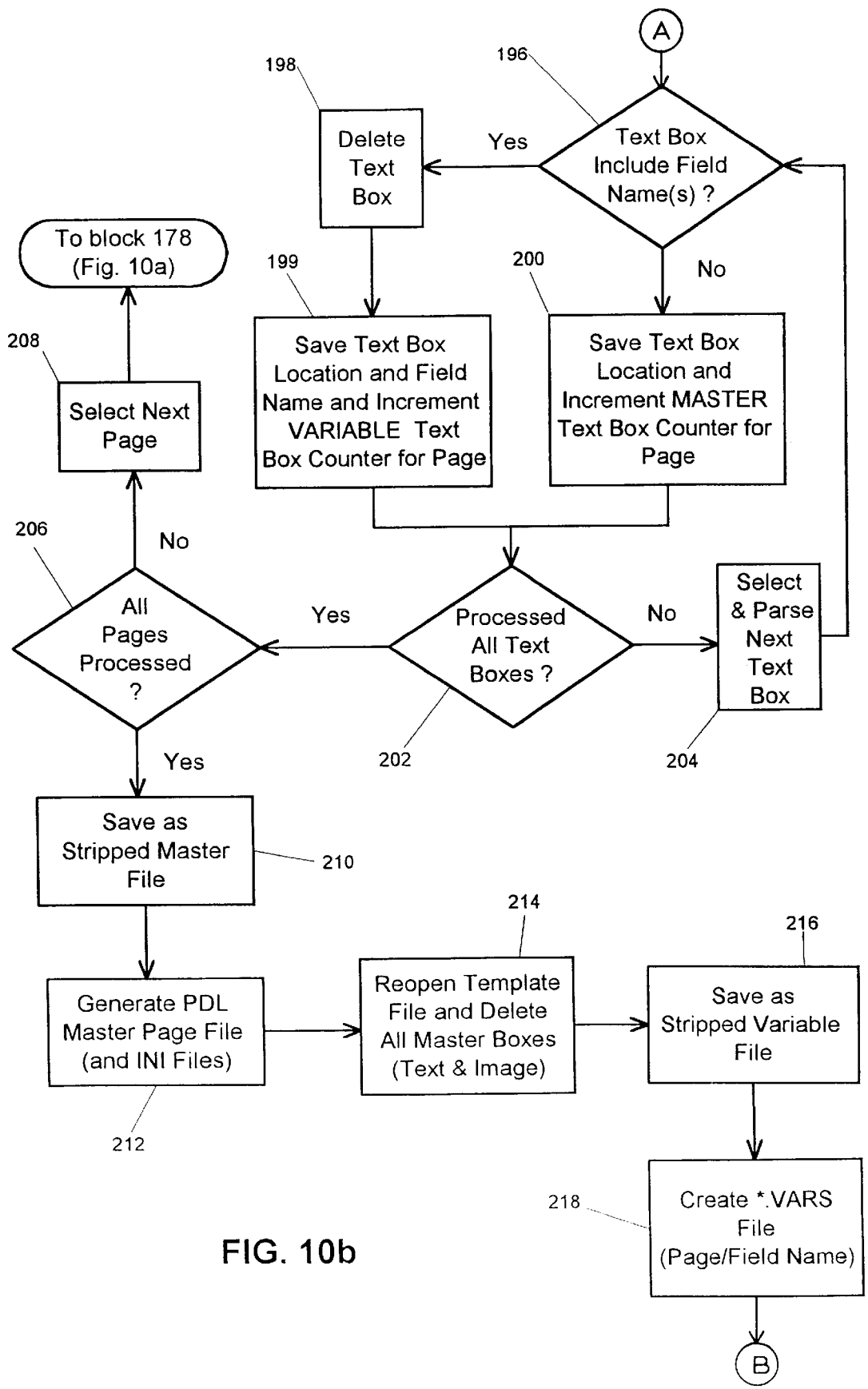
Figure 10C:
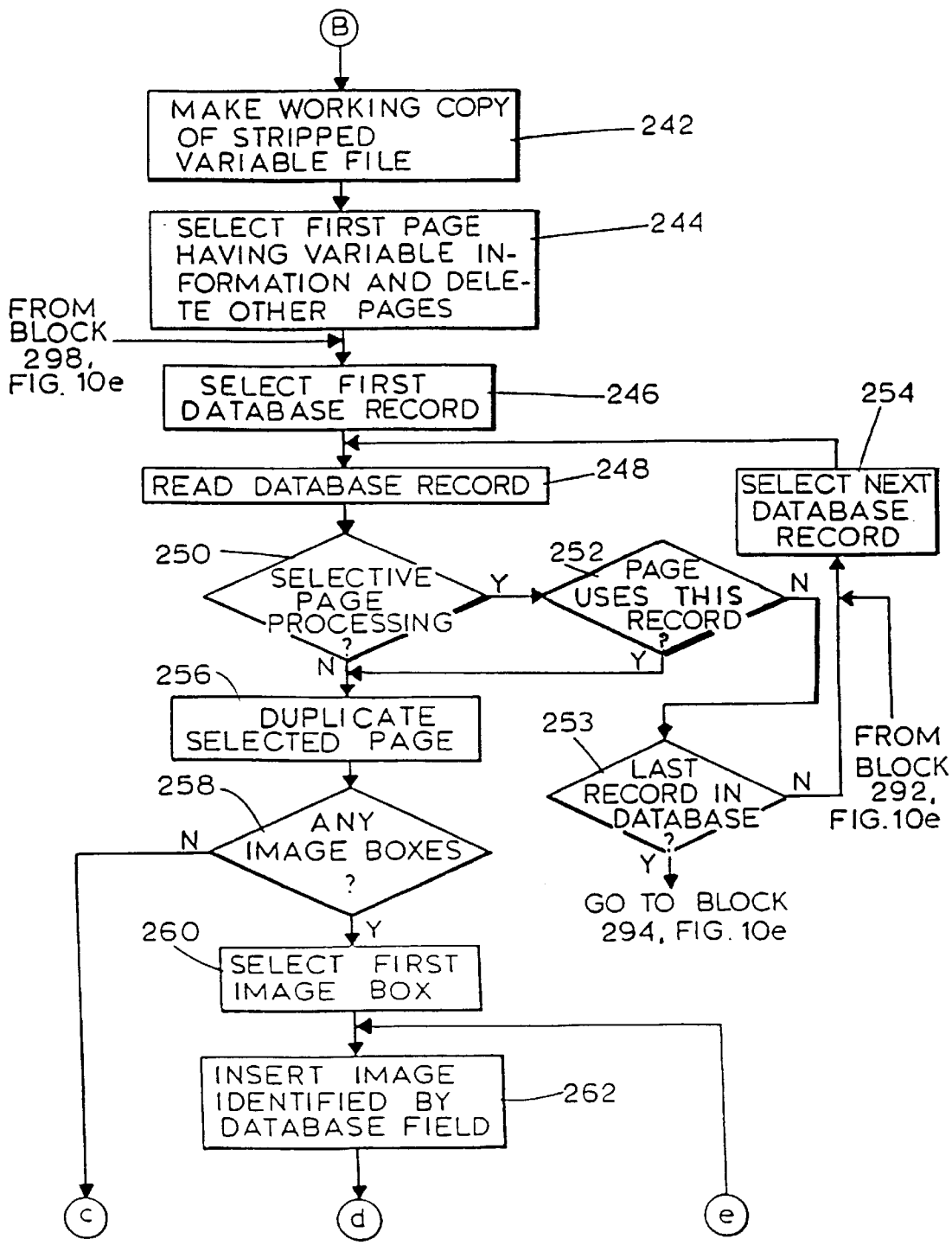
Figure 10D:
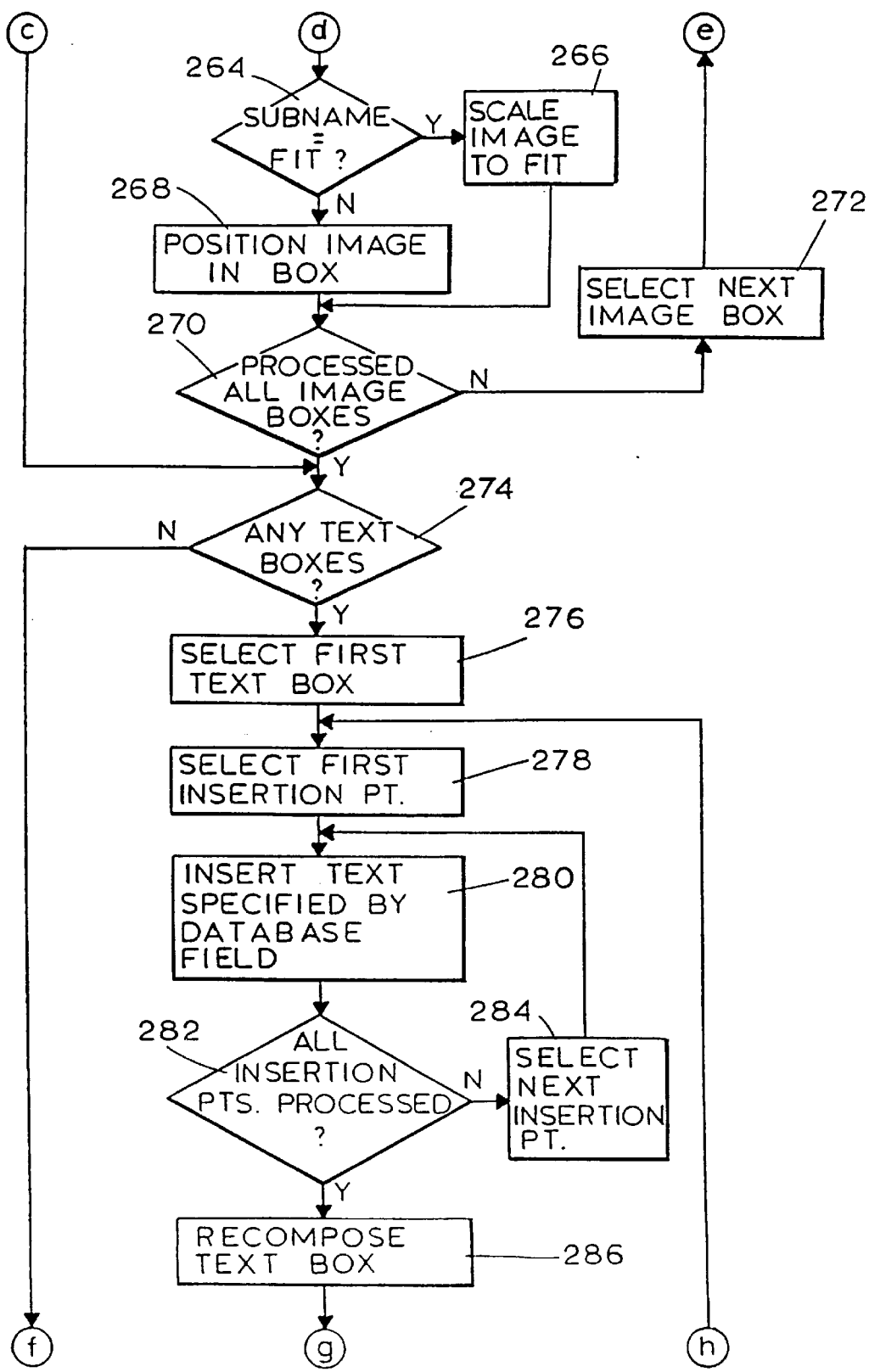
Figure 10E:
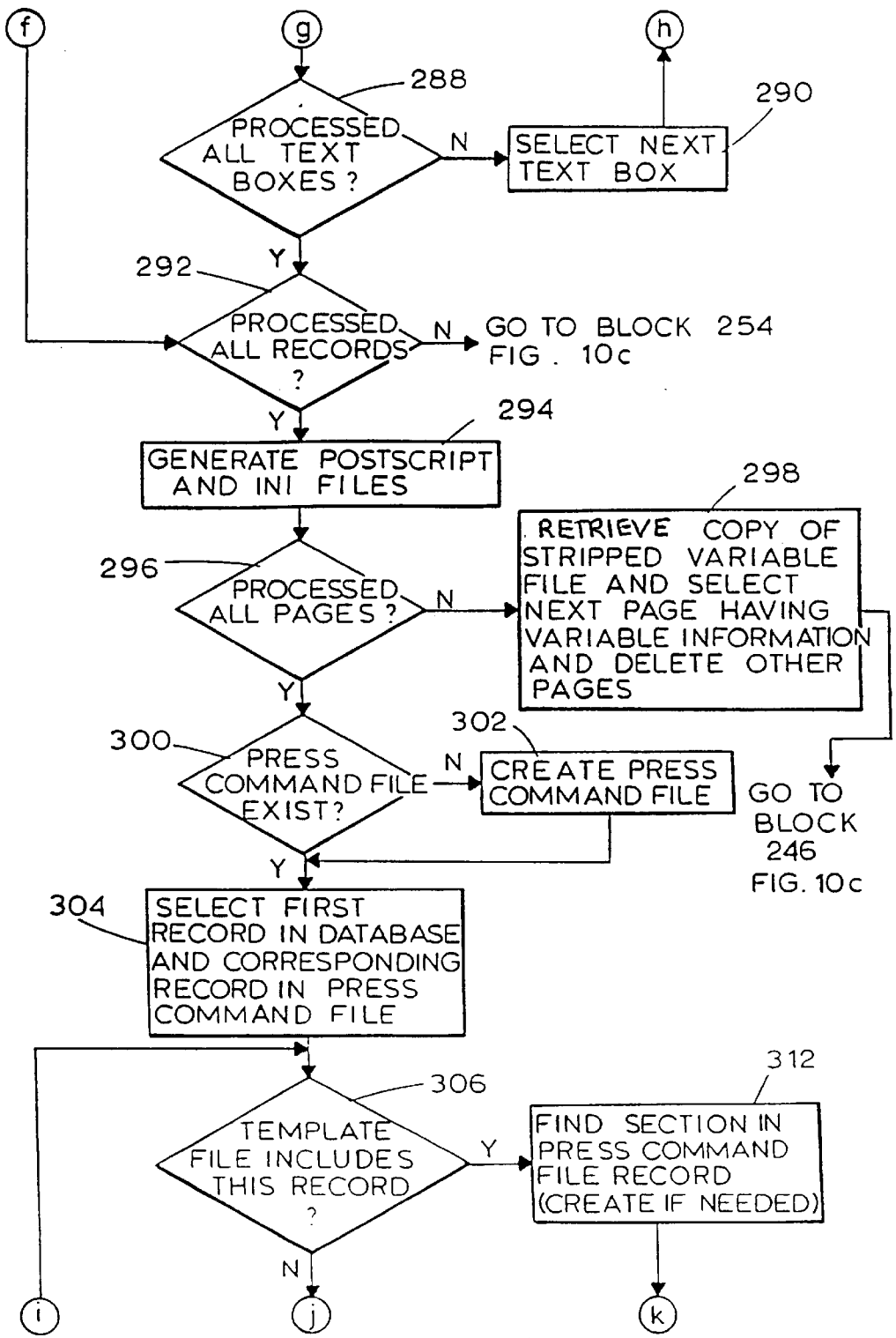
Figure 10:
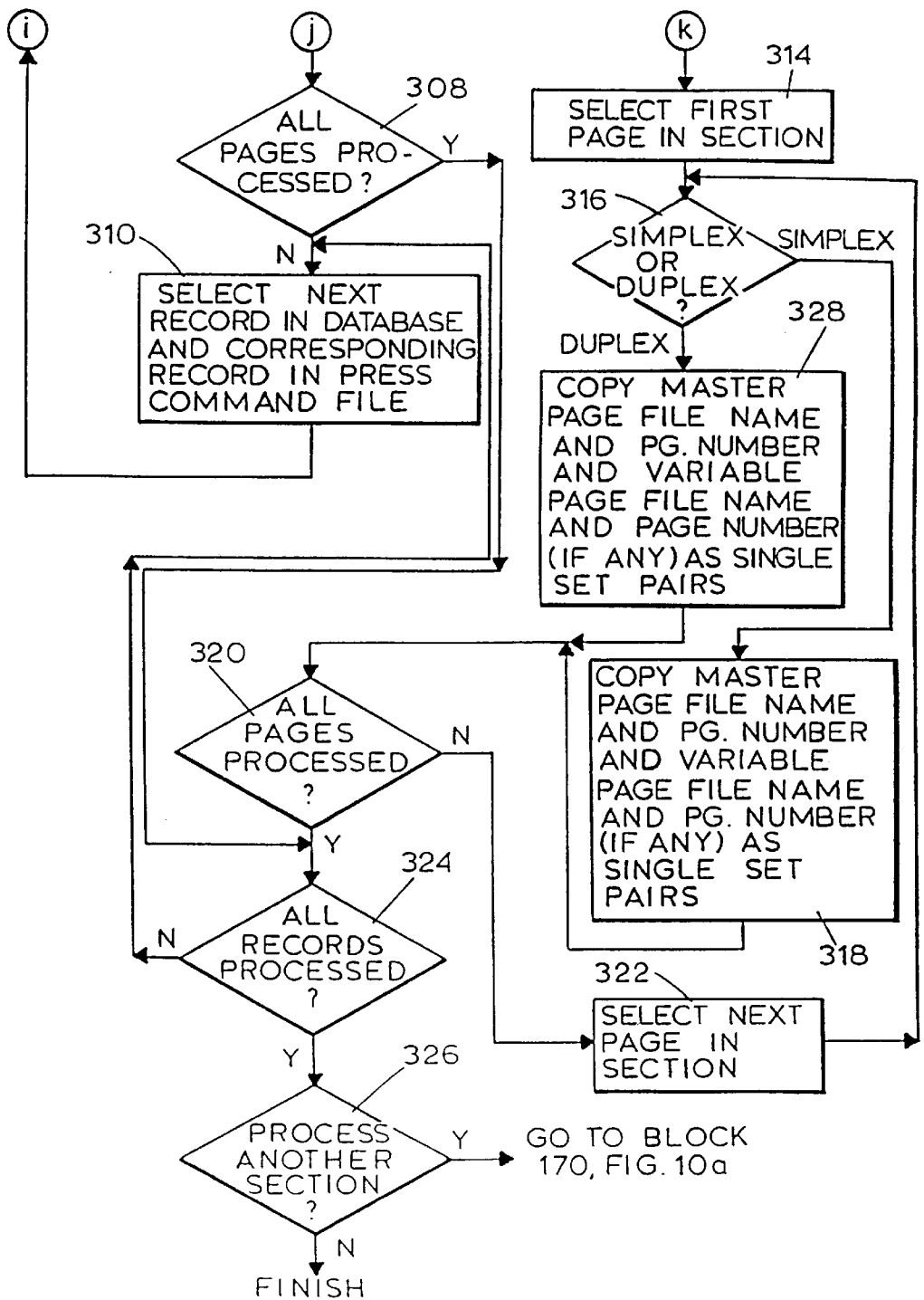

Once the block 270 determines that all image boxes have been processed, or immediately following the block 258 of FIG. 10c if no image boxes are found on the page, a block 274 checks to determine whether there are any text boxes on the page and, if so, a pair of blocks 276, 278 select a first text box and a first insertion point in such box. Blocks 280, 282 and 284 serially insert text data stored in the database 108 at the appropriate insertion points in the text box. Once all of the variable text data have been inserted into the text box, a block 286 recomposes all text in the text box so that the text obtains a neat finished appearance. The recomposition process is automatically undertaken by the QuarkXPress program once the variable information is inserted into each text box. The recomposition process is responsive to the user commands as applied to the template file text box or object, such as left, right, center, or full justification, hyphenation and the like. Following the block 286, a block 288, FIG. 10e, checks to determine whether there are remaining text boxes to be processed on the page and, if so, a block 290 selects the next text box on the page and control returns to the blocks 278–288 to insert text information into such text boxes.

Once the block 288 determines that all text boxes for the page have been processed, the programming required to produce one of the pages of the file 134 of FIG. 5 having variable information only thereon is complete. A block 292 then determines whether all records in the database have been considered for inclusion in additional variable pages of the file 134 to be produced. If not all records have been considered, control returns to the block 254, FIG. 10c, where the next database record is identified and read. On the other hand, if all pages of the file 134 have been produced by considering all records in the database 108, a block 294 converts the file data into PostScript® or another PDL format to create the variable page file 137 of FIG. 5. Also, an INI file is created as before, except that the "duplex" or "twinplex" parameter is set to command simplex printing only. If necessary or desirable, should the press run length exceed a certain limit, the programming may be modified to create more than one variable page file for each variable page of the template file.

Following the block 294, a block 296 checks to determine whether there are other variable pages in the stripped variable page file to be processed. If this is true, a block 298 retrieves a copy of the stripped variable file, selects the next variable page therein and deletes remaining pages therefrom. Control then returns to the block 246 of FIG. 10c. In the example of FIGS. 6a and 6b, the back cover P4 and the corresponding pages of the remaining books are now selected for processing. In the fashion noted above, a file representing the variable portions of such pages is produced by developing the file representing the pages P4-a through P4-c and inserting the database information into such file to obtain the variable page file 136 and the PDL version 138.

Following generation of the variable page files 134, 136, and 137, 138 control passes to a block 300 which checks to determine whether a press command file has already been created. If not, a file is created by a block 302 having placeholder comments indicating where in the press command file individual press commands are to be placed for each book to be produced. The press command file may also include data from one or more fields of the database 108 identifying an intended recipient of each book to be produced to assist in reproducing books found to be defective or to produce sample books. At this point, the press command file for the example of FIGS. 6a and 6b may be as follows (using data from the sample database set out above):

;RECORD1
;:WILLIAM DOE:606248923
;ENDRECORD
;RECORD2
;:HUGH JORGENSEN:606248923
;END RECORD
;RECORD3
;:JAY P. MORGAN:606248924
;END RECORD

Following the block 300 (if the press command file already exists) or the block 302 a block 304 selects the first database record and a corresponding first record in the press command tile. A block 306 then checks to determine whether the template file currently being processed includes the selected database record. If not, a block 308 determines whether all pages have been processed, and if this is not the case, the next record in the database 108 and a corresponding record in the press command file are selected. Control then returns to the block 306. If the block 306 ascertains that the template file includes the selected record, a block 312 inserts an indication of the section number in the press command file at an appropriate point if the section number is not already present. If the section number is present already, the press command identified by the section number entered by the user at the block 176 is identified to be overwritten at a later point. The press command file now appears as follows for the example of FIGS. 6a and 6b:

;RECORD1
;:WILLIAM DOE:606248923
;SECTION 1
;ENDSECTION
;ENDRECORD
;RECORD2
;:HUGH JORGENSEN:6062488923
;SECTION 1
;ENDSECTION
;END RECORD
;RECORD3
;:JAY P. MORGAN:606248924
;SECTION 1
;END SECTION
;END RECORD

Following the block 312, a block 314, FIG. 10f, selects a first page of the section and a block 316 checks the state of a flag stored in the memory 53 to determine whether a simplex or duplex job has been requested. If a simplex job has been requested, the file name and page number of the master page file and, if variable information is to appear on the page, the file name and page number of the variable page file for the selected page are stored as a single set pair in the memory 53 by a block 318. The determination of whether variable information is to appear on the selected page is accomplished by summing the contents of the variable image box counter and the variable text box counter as incremented by the blocks 220 and 234 of FIG. 10b.

A block 320 checks to determine whether all pages have been processed and, if not, the next page is selected by a block 322 and control returns to the block 316 for processing of such page. If all pages have been processed, control passes to a block 324 which determines whether all database and press command records have been processed. Control also passes to the block 324 if the block 308 determines that all pages have been processed. If not all records have been processed at this point, control returns to the block 310 where the next records in the database and press command file are selected.

If the block 324 determines that all records for the current section have been processed, a block 326 determines whether another section is to be processed and, if so, control returns to the block 170 of FIG. 10a. If there is not another section to be processed, the press command file has been fully assembled, and hence the process terminates.

If the block 316 determines that a duplex job is to be effected, control passes to a block 328 which stores in the memory 53 a command identifying the file names and page numbers of the master page file (as well as corresponding information relative to variable page files, if variable information is to appear) as two-set pairs. Control from the block 328 then passes to the block 320 described above.

The result of the programming of FIGS. 10a–10f is a press command file having a sequence of press commands which cause printing of pages in a desired order. In order to print the sample pages of FIGS. 6a and 6b, the press command file would read as follows:

BOOK A
;RECORD1
;:WILLIAM DOE:606248923
;SECTION 1
"file.m"1@"file.v1"1|"file.m"2
"file.m"3|"file.m"4@"file.v4"1
;ENDSECTION
;ENDRECORD
;RECORD2
;:HUGH JORGENSEN:606248923
;SECTION 1
"file.m"1@"file.v1"2|"file.m"2
"file.m"31|"file.m"4@"file.v4"2
;ENDSECTION
;ENDRECORD
;RECORD3
;:JAY P. MORGAN:606248924
;SECTION 1
"file.m"1@"file.v1"3|"file.m"2
"file.m"3|"file.m"4@"file.v4"3
;ENDSECTION
;ENDRECORD
ENDBOOK
PRINTRUN R
BOOK A
ENDPRINTRUN In the foregoing example, "file.m" is a file name identifying the master page file 122 and "file.v1" and "file.v4" are file names identifying the variable page files 137 and 138, respectively. The number following each file name designates a particular page of the file identified by the file name. Thus, for example, "file.m"1 designates the first page of the master file "file.m" and "file.v1"2 designates the second page of the variable page file "file.v1." The @ sign means to associate the pages of the files linked by such sign (i.e. overlay the variable pages on the master pages). The vertical line in the commands indicates that the page(s) on the left side of the vertical line are to be printed on the front side of a piece of paper whereas the page(s) on the right side of the vertical line are to be printed on the reverse side of the piece of paper. In an example of simplex printing, no file name would appear to the right of the vertical line in each command.

Some book runs may also include pages which contain static information but are only included in certain books. For example, assume you are creating 6 page books wherein the first two pages are master pages and the second two pages are always variable. The last two pages of each book are selected from a group of 100 different static pages. If these pages are treated as variable, they would be RIPped each time they were included in a book. In order to avoid RIPping these same 100 pages repeatedly, the 100 pages are RIPped (one time) as master pages and stored in an EPS (encapsulated PostScript®) file. The press command file then retrieves the desired pages (from the group of 100 pages stored in EPS files) based on the entry in the database. This technique greatly reduces processes time.

Figure 11:
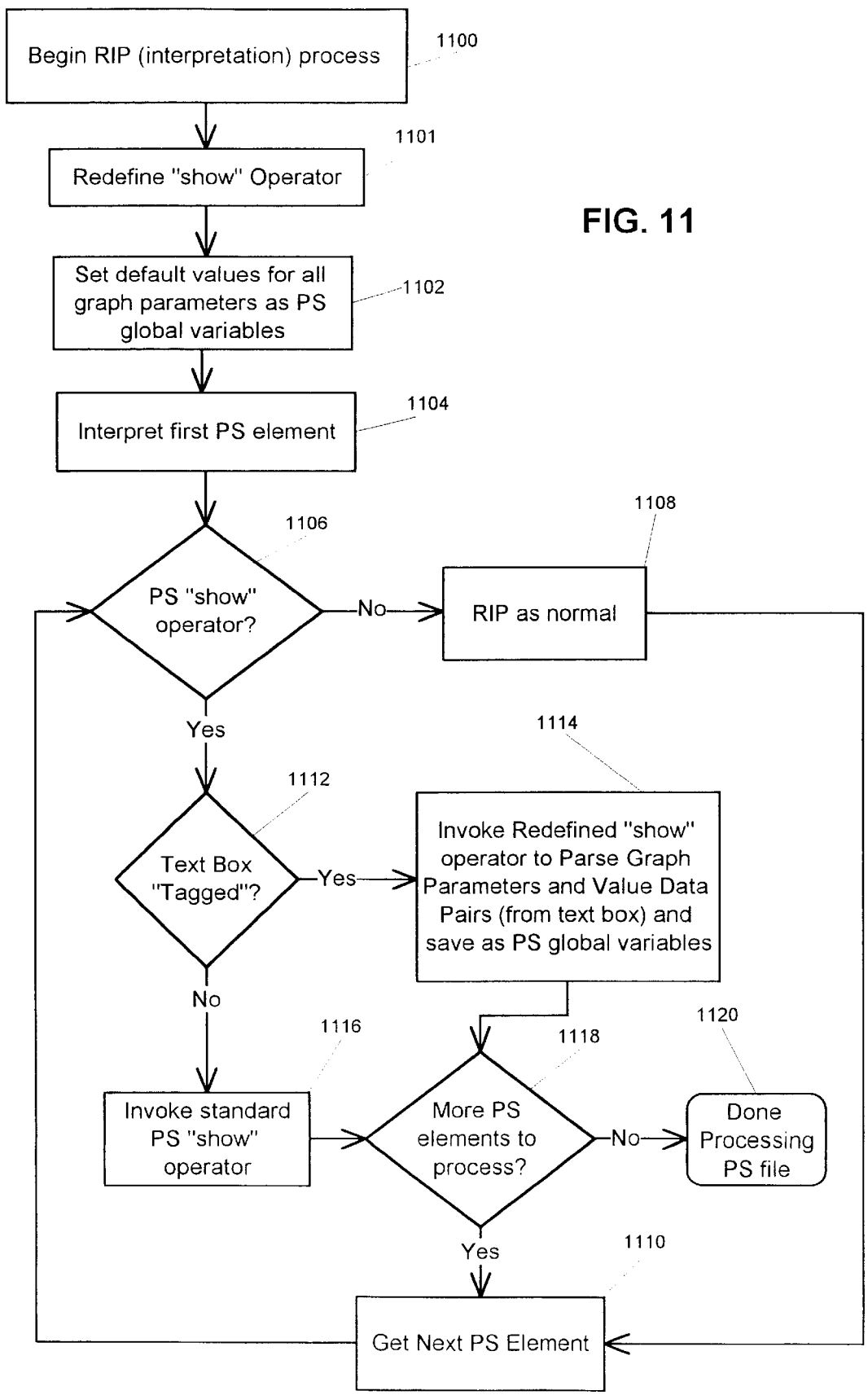
FIG. 11 is a flowchart illustrating programming implemented by the RIP 82 of FIG. 4 to generate the variable graphics information of the present invention.

FIG. 11 is a flowchart illustrating the programming implemented by the RIP 82 (FIG. 4) to process the variable graphics information. As described above in connection with FIG. 9, the EPS graph file (FIGS. 9A-1 through 9A-4) was placed in an image box and a text box including the graph parameters and values was layered over the image box. The text box was then "tagged" to indicate that it contained variable graph information. Referring again to FIG. 11, a block 1100 begins the RIP (or interpretation) process of the PDL master page files 122 and PDL variable page files 137, 138 (FIG. 5). Preferably the PDL files are PostScript® and the RIP 82 is a PostScript® RIP. However, the invention may be implemented with other page description languages.

A block 1101 then redefines the PostScript® "show" operator or command. The standard PostScript® show operator "paints" characters identified in a string onto the current page. The Postscript® page files will include a "show" command after each text box on the page.

A block 1102 sets all the graph parameters (size, colors, labels, etc.) to their default values and saves the parameters as Postscript® (PS) global variables. This step allows graphs to be generated even if the user did not specify any graph parameters. A block 1104 then interprets the first Postscript® element on the page. As described in detail below, the redefined show operator will be used to process the EPS graph file.

A block 1106 then determines whether the PostScript® element is the "show" operator. If the PS element is not a show command, a block 1108 RIPs the element as normal and a block 1110 retrieve the next PS element and control returns to the block 1106.

If the block 1106 determines that the PS element is a show command, a block 1112 then determines whether the text box immediately preceding the show command was "tagged" as containing graphics information. As described above, the graphics information text box was "tagged," for example, by using text delimiters or by specifying an unusual color or font (FIG. 9, block 163). Thus, the block 1112 checks for the text delimiter or the unusual color or font.

If the block 1112 determines that the text box is "tagged" (contains variable graphics information), a block 1114 invokes the redefined "show" operator (defined by block 1101). The redefined "show" operator does not "paint" the text box as usual. Instead, the redefined "show" operator parses the graph parameters and graph value data pairs in the text box and saves them as PostScript® global variables. If the user specified graph parameters, these would override the default values saved by the block 1102. The PostScript® global variables will be used by the EPS graph file (FIGS. 9A-1 through 9A-4) to generate the graph.

Alternatively, if the block 1112 determines that the text box was not "tagged," a block 1116 invokes the standard Postscript® "show" operator to paint the text box as normal.

After the blocks 1114 and 1116, a block 1118 determines if there are more PostScript® elements to process. If yes, a block 1110 retrieves the next element and control returns to the block 1106.

After the block 1114 invokes the redefined "show" operator to save the graph parameters and values as global variables, one of the next elements retrieved by the block 1110 will be the EPS graph file, which will be executed by the block 1108 to generate a graph.

The loop of blocks 1106–1118 is repeated until all PostScript® elements have been processed. After all elements have been processed, the programming ends at a block 1120 which determines that the processing of the Postscript® file is complete.

The programming of FIG. 11, including the redefinition of the PostScript® "show" operator, may be implemented by the following exemplary code. The exemplary code assumes that text delimiters were used to "tag" the text boxes with variable graph information and, as is conventional with QuarkXPress®, the "show" operator is represented by "d". Also, in the exemplary code, the section beginning with the line "dup doss ss . . . " is the QuarkXPress® for the standard "show" operator.

```
%Variable Graphing Enabled
/zOnPage 0 def
/zBeginVar 0 def
/initializepage {
/zOnPage zOnPage 1 add def
QuarkXpress_3.32 begin
/Param 1 def
/d           % redefine show operator
{dup (%#?!EndVariableGraphData) eq
    {/zBeginVar 0 def pop pop pop pop}
    {dup (%#?!BeginVariableGraphData) eq
        {/zBeginVar 1 def pop pop pop pop}
        {zBeginVar 1 eq
            {
            zOnPage 1 gt{
            Param 9 gt{/Str1 (Param)def}
                {/Str1 (Param)def}ifelse
            /Str2 Param dup 9 gt
                {( )}{( )}ifelse cvs def
            /Str1 5 Str2 putinterval
                Str1 cvn exch def
            Param 1 add /Param exch def
            } if
        pop pop pop pop
        }
        {
%Quark code for standard show operator
            dup doss ss and{sym fmtx makefont/xpfs X
            0 0 3 -1 roll{s1 0 3 -1 roll put
            s1 chkch{g xpfs setfont w G}
            {w}ifelse 3 -1 roll add 3 1 roll add exch}
                forall}
            {w}ifelse pop 3 -1 roll sub 3 -1 roll div
            3 -1 roll exch sub 0 32 3 -1 roll 0 5 -1 roll
            doss ss and{xpash P3}{Q}ifelse
            }ifelse
        }ifelse
    }ifelse
}def
end/pm save store mT concat}bd
```

Alternative Methods for Generating Variable Graphs

Several alternative methods may be used to create graphs containing variable information. The first alternative method is preferable because, as explained in detail below, it results in faster processing time by reducing the size of the EPS file.

Alternative #1—Graph Design EPS File

The first alternative method provides an additional software package (called, for example, "Graphics Designer") to the user/customer who creates the database containing the variable information. The Graphics Designer program allows the user to interactively create graphs, using real or dummy data points. Thus, the user can experiment and preview what the graphs will look like after they are printed. For example, the Graphics Designer program allows the user to change any attributes, such as graph type, size, colors, line widths, etc. Once the user is satisfied with the preview of the graph, those graph attributes are saved. Thus, the Graphics Designer program allows the user to select graph attributes through creating preview graphs, rather than by just specifying attributes, as set forth above.

The Graph Designer program also prompts the user to specify the fields in the database that will be used to generate the variable graphs. The specified database fields may contain graph data points and/or graph attributes.

The output of the Graph Designer program is an EPS file ("the graph design EPS file") that specifies the graph size and attributes selected by the user and also references the fields in the database that will be used to generate the graph. The graph design EPS file also references an external EPS file, that will be used to draw the graph. The external EPS file may be, for example, the EPS Graph file described above in connection with FIGS. 9A-1 through 9A-4, or any other type of graph engine file for generating graphs. Also, the external graph engine file could be a series of separate files, where each file generates a different graph type (e.g. one graph file for bar charts, another graph file for pie charts, etc.)

A sample graph design EPS file is as follows:

```
%!PS-Adobe
%GraphName Identifier
%BoundingBox 0 0 221 410        % graph size
%Data: aD1 aD2 aD3 aD4          % database fields
%XAxisName
% . . .
%end Data
/cD1[0 0 0 1]def                % attributes to
/cD2[0 1 0 0]def                % override default
/sYAxisName (Widgets required) def
. . .
EngineLoaded not {              % call external graph file
(BarGraphEngine.ps) run
/EngineLoaded true def}if
```

Referring to the sample graph design EPS file above, the comment lines (beginning with "%") indicate a graph name selected by the user and the graph size, which is specified by defining the four corner points of a bounding box. The remaining comment lines are the database fields that will be used to generate the graph. For example, D1, D2, D3 and D4 are field names that contain the data points for the graph. "XAxisName" is the name of a database field that controls a variable graph attribute (the x-axis label). It is understood that the graph design EPS file can contain any number of comment lines specifying database fields.

Following the comment lines, the graph design EPS file contains graph attributes that were specified by the user and will be used to override the default values. For example, the y-axis label is specified as "Widgets Required." Again, the graph design EPS file may contain any number of lines to specify the selected graph attributes.

The graph design EPS file ends with a call to the external EPS graph file that will be used to draw the graph. In our example, the file is called "BarGraphEngine." The external EPS graph file is preferably stored in a file system associated with the RIP. The graph design EPS file first loads the external EPS graph file into memory. Once the external EPS graph file is loaded, it can be repeatedly executed, resulting in faster processing time.

When implementing the first alternative embodiment with the EPS graph design file, the process of creating the template files is simplified. Referring back to FIG. 9, the blocks 159–163 are eliminated. Thus, after the block 157 determines that a variable graph element should be added, the block 158 creates an image box at the selected location and then the block 164 places the EPS graph design file (rather than the FIG. 9A-1-4 EPS graph file) into the image box. The blocks 159–163 are eliminated because the graph attributes and database fields are specified in the EPS graph design file. The EPS graph design file is also much shorter and simpler than the EPS graph file, resulting in faster processing time.

Also, because use of the graph design EPS file eliminates the need to "tag" text boxes and the graph parameters are specified in the graph design EPS file, the processing of FIG. 11 is also eliminated. The graph design EPS file method does not need to redefine the "show" operator. As set forth above, the graph design EPS file is placed in an image box. During the normal RIP (interpretation) process, as the image box is processed, the graph design EPS file is executed, which also runs the graph file to generate the graph.

The other alternative methods (alternative #s 2–4) provide less flexibility, particularly in creating complex graphs. However, the alternative method #s 2–4 eliminate the need for the EPS graph file (FIGS. 9A-1 through 9A-4) and the need to redefine the Postscript® "show" operator to process the EPS graph, which reduces complexity, cost and processing time in the system.

Alternative #2—Named Image Boxes

Figures 1, 11A:
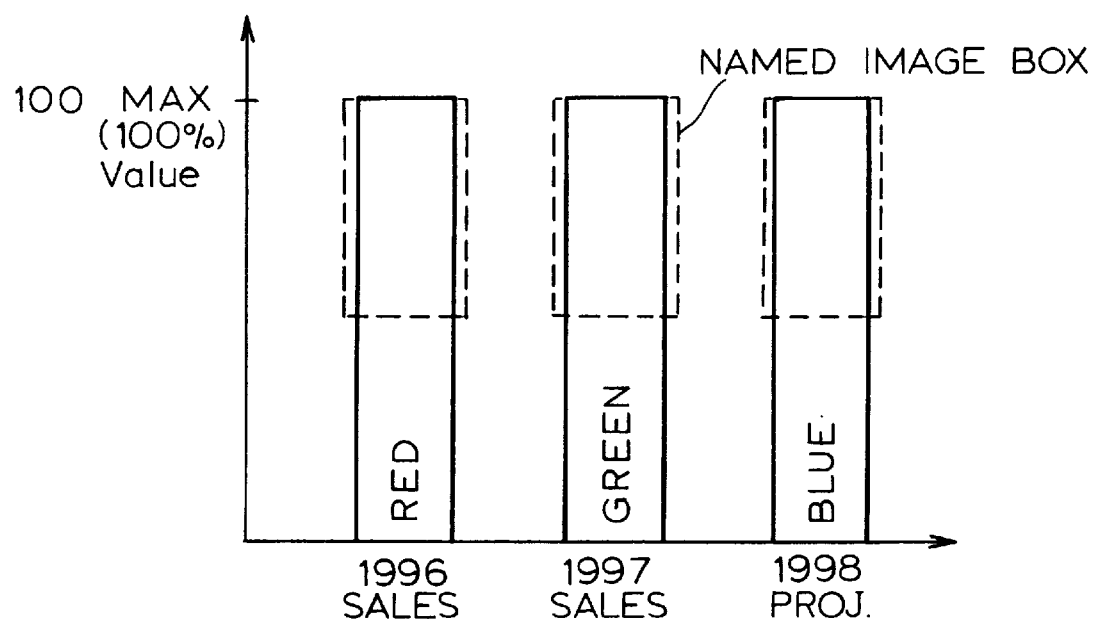
Figures 2, 11A:
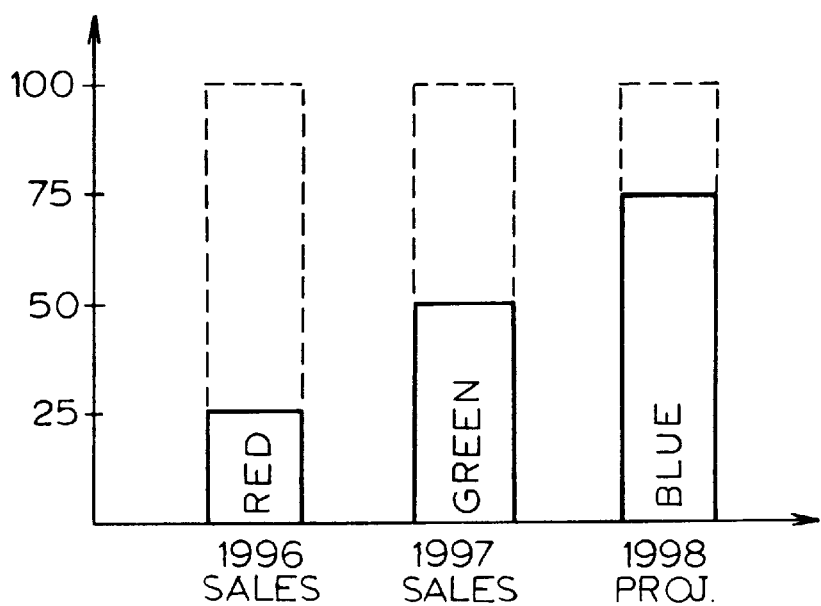

The second alternative method is useful when printing simple bar graphs. Generally, the method creates a bar chart with each bar at 100% of the value. Image boxes filled with the background attributes are sized according to the values in the database, and placed over the 100% bars such that only the correct data value shows. The "Named Image Box" method is illustrated in FIGS. 11A-1 through 11A-2.

For example, assume a document is to contain a bar graph illustrating the 1996 sales, 1997 sales and 1998 projected sales for the entries in the sample database set forth above. The maximum value in the database is 100 and the first entry contains the following values:

1996 Sales: 25

1997 Sales: 50

1998 Proj.: 75

Referring to FIG. 11A-1, the first step is place a bar chart at the desired place in the document which contains three bars (representing 1996 sales, 1997 sales and 1998 projecting sales). Each bar may be a different color (red, green and blue) drawn on a background and each bar is drawn extending up to the maximum or 100% value (100).

The next step is to place a named image box over the bars to cover a certain percentage of the bars (i.e. cover 50% of the bars). Each named image box should have the attributes of the graph background (e.g. colored white) and should be borderless (except if the bars are to be outlined in black, the bottom border of the named image box should also be black). The name on the image boxes should correspond to the field names in the database corresponding to the data value for that bar. Thus, in our example, the image boxes will be named "1996Sales," "1997Sales," and "1998Proj." and are represented by dashed lines on FIG. 11A-1.

The first two steps of creating the 100% graph and placing the named image boxes replaces the blocks 158–164 (FIG. 9) when creating the template files in, for example, QuarkXPress®.

The final step is to use the data contained in the specified database fields to adjust the size of the named image boxes to correctly size the bars. This step would occur during processing of the image boxes on the template files to create the PDL master and variable files (FIG. 10c, blocks 262–268). The program first retrieves the data value for the first entry in the database corresponding to the name of the image box. The program then adjusts the bottom of the box to the correct value. In our example, the correct value for the first bar is 25—therefore, 75% of the bar should be covered by the image box. This is calculated by the following equation:

$$\frac{\text{max value} - \text{data value}}{\text{max value}} \times 100\% = \frac{100 - 25}{100} \times 100\%$$
$$= 75\%$$

The named image box was originally positioned to cover only 50% of the bar—therefore, the bottom of the named image box must be extended to cover an additional 25% of the bar.

The second data value in our example is 50—thus 50% of the bar should be covered. Because the image box was originally positioned to cover 50% of the bar, no adjustment is need. The third data value is 75—only 25% of the bar should be covered. The image box must therefore be reduced. The adjusted named image boxes are represented by dashed lines in FIG. 11A-2.

The same method may be used to place named image boxes to cover the correct percentage of graphic objects (such as bottles or trucks) which are used in place of standard rectangular bars.

Alternative #3—Anamorphic Scaling

This method is similar to the previous image box method and is particularly suited to create bar charts using graphic objects which can be anamorphically scaled to the correct data value.

Like in the previous Named Image Box method, a graph is placed at the desired position on, for example, a QuarkXPress® document in the template file. A named image box containing a maximum (100% scaled) graphic object (such as a bottle or truck) is placed at each bar position such that the top of the graphic object/image box corresponds to the maximum data value. As before, the image boxes are named to correspond to fields in the database containing the data values.

Next, during the processing of the image boxes during creation of the master and variable files, the data value is retrieved from the database field and the box is scaled (i.e. shrunk) corresponding to the data value. The graphic object is thus anamorphically scaled to fit inside the image box.

The same method could also be used with standard rectangular bars.

Alternative #4—Spreadsheet Graphs

The fourth alternative method takes advantage of the graphing capabilities of a standard spreadsheet program (such as Microsoft® Excel®). Thus, it may be used to draw any type of graph that is supported by the spreadsheet program. Excel® graphing capabilities are described in the Microsoft® Excels User's Guide (Version 5.0), published by Microsoft® Corporation (1993–1994), particularly Part 3 (Chapters 15–19, "Creating Charts from Worksheet Data") and Part 9 (Chapters 41–42, "Exchanging Data with Other Applications"), which is incorporated by reference herein.

The first step of the method is to place an image box corresponding to the size and position of the graph on, for example, the QuarkXPress® document in the template file.

Next, graph data from the database 108 is retrieved and supplied into cells in an Excel® worksheet. The data can be supplied to Excel® using AppleScript (for Macintosh) or Object Linking and Embedding (OLE)(for Windows/PC). A counter is used to keep track of the graph data from the database that is supplied to the Excel® worksheet.

Excel® is then instructed to create a graph from the data in the worksheet, according to the user specified graph parameters. The Excel® graph may be saved to an external file, which is then placed in the image box or can be linked back to the QuarkXPress® image box using conventional OLE techniques.

Referring to FIG. 9, the above-described steps replace the blocks 160–164. The Spreadsheet Graphing method is illustrated by the following pseudo-code:
Place image box on Quark document

```
Begin Loop
    Start counter = 1
    For each piece of data to be graphed
        Get data from database
        Put data into cell A[counter] of
            Excel ® worksheet (via OLE or
            Applescript)
        Set counter = counter + 1
    End Loop
Instruct Excel ® to graph data in cells A[1] through
    A[counter] – 1 with user specified attributes
```

Imposition Processes

The RIP/interpretation process of FIG. 11 may be implemented in context of either the "GetTiff" or "Imposition-on-the-fly" imposition processes described below. Before the pages are imposed and RIPped, however, the control unit must determine how the pages should be imposed.

Figure 12:
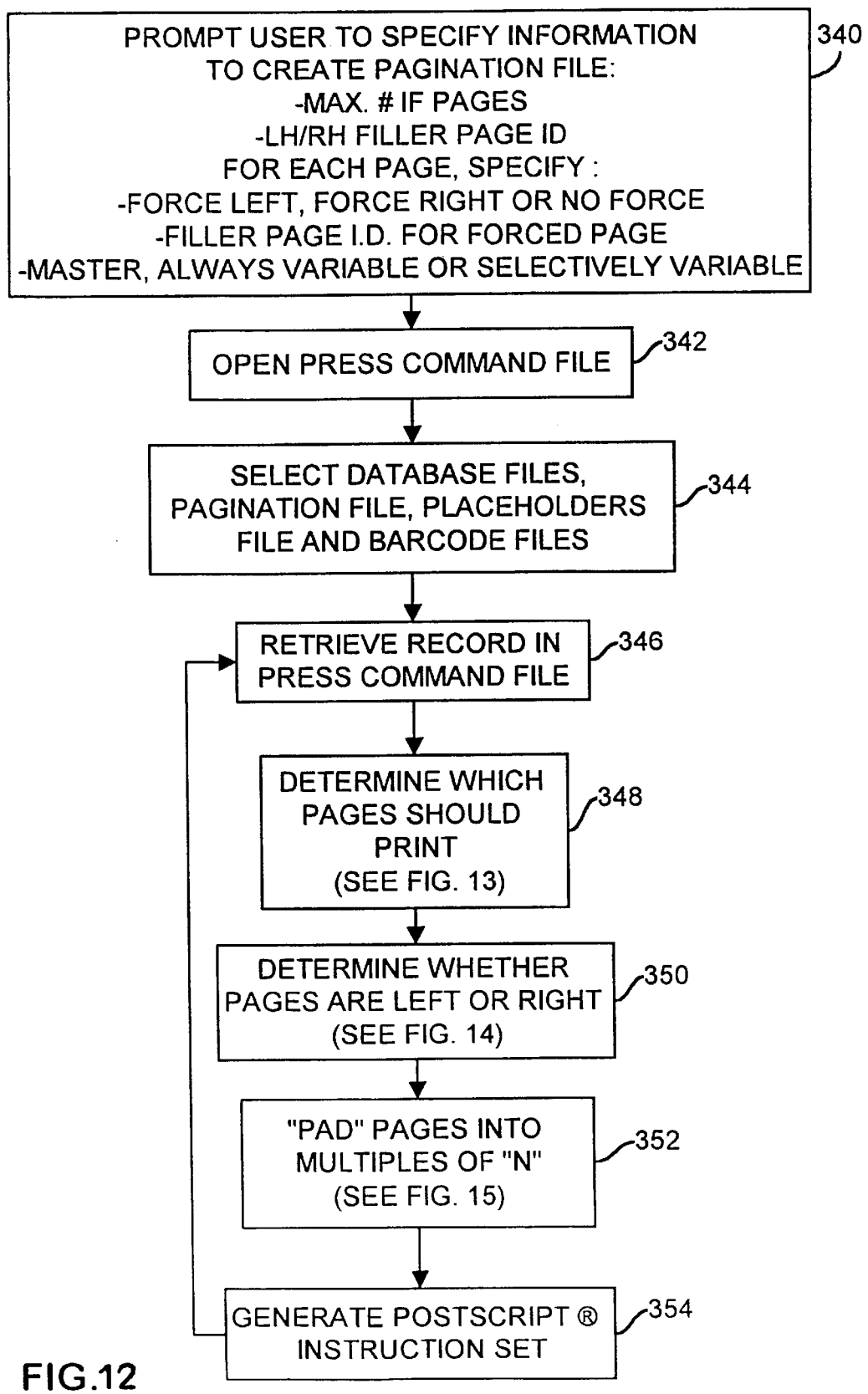
FIG. 12 is a flowchart illustrating the programming implemented by the control unit 52 to generate a page description language instruction set specifying which pages should be printed and how the pages should be positioned (or imposed) for printing.

FIG. 12 illustrates the programming implemented by the control unit 52 to generate a page description language instruction set specifying which pages should be printed and how the pages should be positioned (or imposed) for printing. The page description language instruction set may be incorporated into the press command file 140 or may be provided as a separate file to the print system 79. For purposes of illustration, the page description language instruction set is written in PostScript® in the format dictated by the Xerox DocuPrint printer. Further, the instruction set is directed to books printed in "saddle stitch" imposition format (i.e. 2 pages on each side of sheet) as explained in connection with FIGS. 6–8. It is understood, however, that the invention could easily be modified for use with a different demand printer (i.e. the Xeikon Barco printer) and/or imposition format (i.e. 4 pages on each side of sheet).

Referring to FIG. 12, the programming begins at a block 340 which prompts a user to specify certain information to be used to paginate the book. A variable ("MAXPGS") representing the maximum number of supplied pages that may or may not be assembled into a single book during the job is specified together with the identification of filler page(s) that may or may not be printed and assembled at the end of a book either on a left-hand or a right-hand portion thereof. Also, the user is prompted to specify for each page whether such page will be forced to be on the left side of a book, the right side of a book or will not be forced to a particular book side. In the event a page is to be forced to a side, the user is prompted to specify the page file name and page number for a filler page to precede the forced page. Still further, the user is prompted to specify for each page whether such page is:

1) An Always Master Page—contains the same (i.e. static) information and is included in every book;

2) An Always Variable Page—may contain variable information and is included in every book; or 3) A Selectively Variable Page—contains variable information but is selectively included only in certain books.

In so specifying the foregoing, the user creates a pagination file (called, for example, *.PAG, where * indicates a file name selected by the user). A sample window generated by the block 340 to prompt a user for the information needed to create the pagination file is shown in FIG. 12A.

Referring again to FIG. 12, following the block 340, a block 342 opens the press command file 140 and a block 344 selects the appropriate database files, including the variable information file (*.VARS), the pagination file (*.PAG), and (optionally) a barcode file. As set forth above, the *.VARS file is a temporary file of pairs of page numbers and database column numbers that indicate where in the database variable information for the page comes from.

The barcode file is a page description language file (for example, a Postscript® file) which contains instructions for printing the sequential page numbers and/or a tracking bar code on the pages of the completed book. The barcode file will be explained in detail below.

The programming then proceeds to the loop containing blocks 346, 348, 350, 352 and 354. The block 346 takes each record (or book) in the press command file 140 in sequential order. For each record, the block 348 determines which pages should be printed to generate that particular book. Next, the block 350 determines whether the pages to be printed should be forced to the right hand or left hand side of the book and the block 352 "pads" the pages to be printed to be a multiples of the number of pages to be printed on a sheet (in our example, 4) by adding appropriate filler pages. Next, the block 354 generates the PostScript® instruction set and the programming returns to the block 346 to retrieve the next record in the press command file 140. The loop repeats for each record in the press command file 140.

Figure 13:
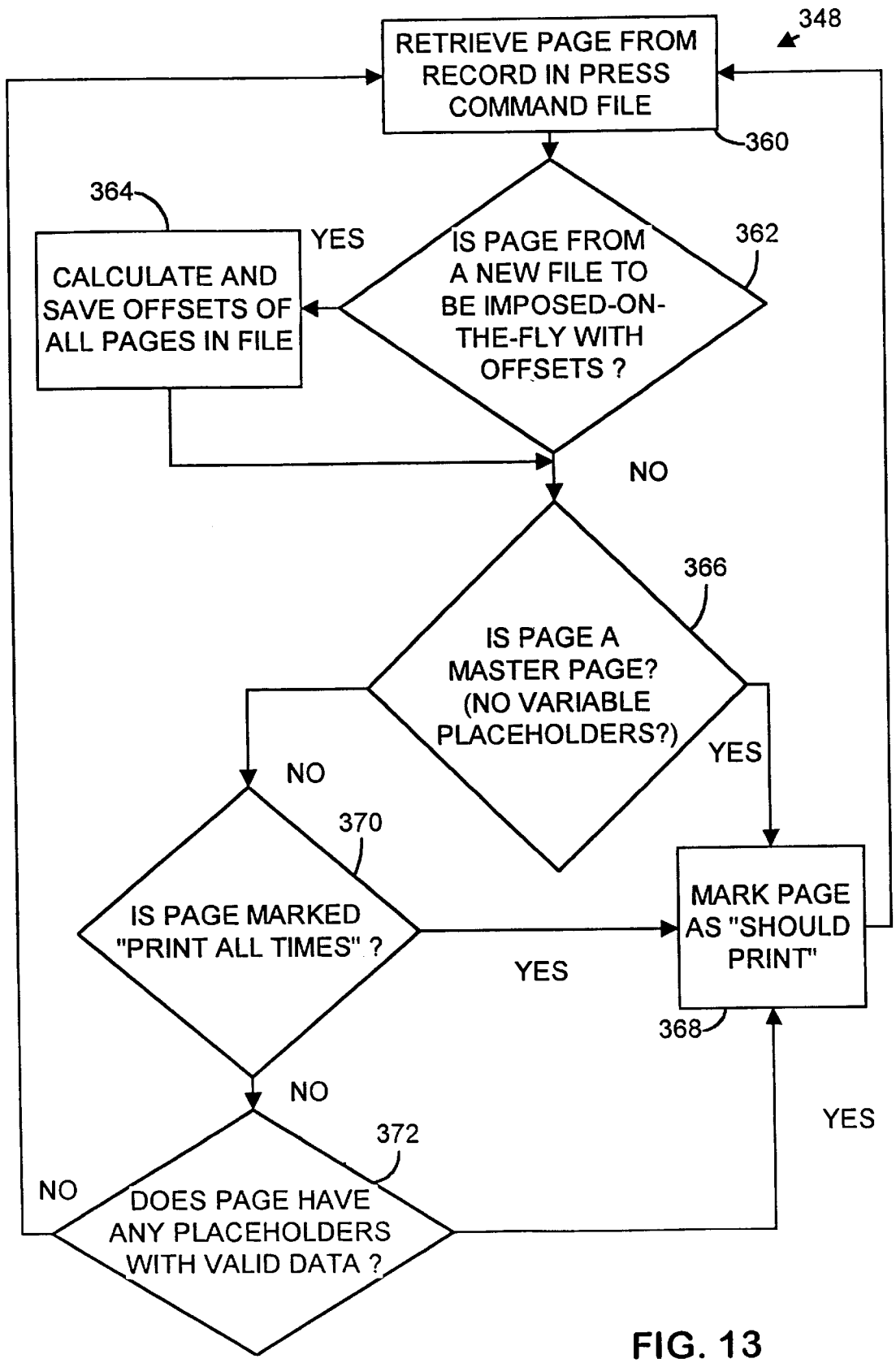
FIG. 13 is a flowchart illustrating in detail the programming implemented by the block 348 of FIG. 12 which determines which pages should be printed for a particular record in the press command file.

FIG. 13 illustrates in detail the programming steps implemented by the block 348 of FIG. 12, which determines which pages should be printed for a particular record in the press command file 140. A block 360 first retrieves the first page in the record. A decision-making block 362 then determines whether the page is from a new file that is to be "imposed-on-the-fly with offsets." (Imposition-on-the-fly with offsets is one of the imposition formats of the present invention, which will be explained in detail below). If yes, a block 364 calculates and saves the offsets for all the pages in the file. After the block 364 calculates and saves the offsets or if the block 362 is false, a decision-making block 366 then determines whether the page is a master page (i.e. does not include any variable information placeholders). If the page is a master page, the page should always be printed and a block 368 "marks" the page to be printed. The block 368 may "mark" the page by adding it to a page print array. The page print array contains the page number and a marker to indicate the disposition of the page. For example, pages that should not be printed are designated with a "0"; master pages (always printed) are designated with a "1"; and variable pages to be printed are designated with a "2".

If the block 366 determines that the page is not a master page (i.e. it's a variable page), a decision-making block 370 determines whether the variable page should be printed at all times. (This was designated by the user at the block 340 in FIG. 1 during creation of the pagination file). If yes, the block 368 marks the page to be printed. If no, a decision-making block 372 determines whether the page has any variable placeholders with valid data. In other words, the block 372 determines whether there is any variable information from the database to be printed on the page. If yes, the block 368 marks the page for printing. The program then returns to the block 360 to retrieve the next page from the record until all the appropriate pages have been marked for printing.

Figure 14:
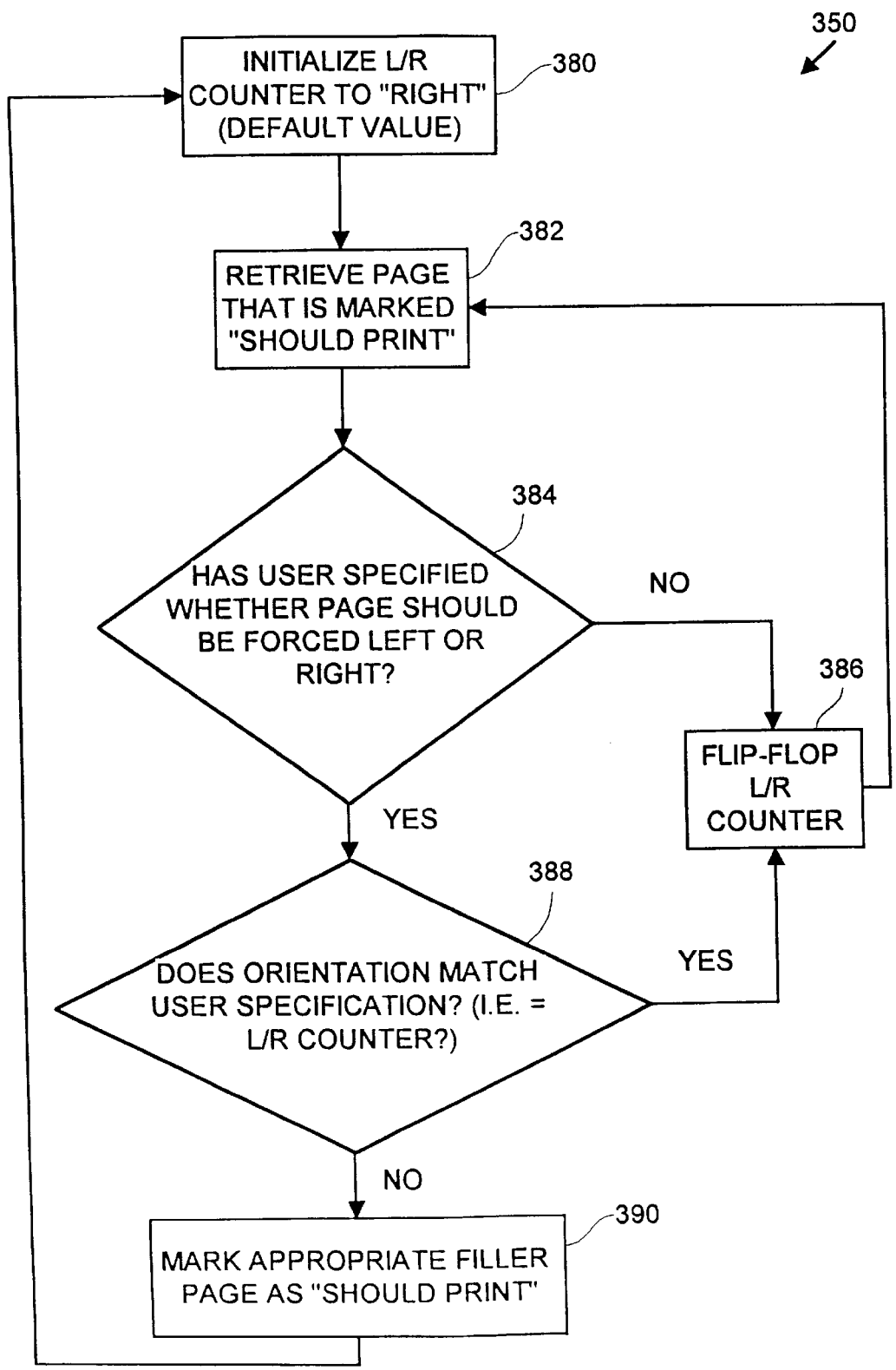
FIG. 14 is a flowchart illustrating in detail the programming implemented by the block 350 of FIG. 12 to determine whether the pages should be forced to the left or right-hand side of the book.

FIG. 14 illustrates in detail the programming steps implemented by the block 350 of FIG. 12 to determine whether the pages should be forced to the left or right hand side of the book. A block 380 first initializes a left/right (L/R) counter variable to its default value of right because it is assumed that the first page of the book will be one the right side. Next, a block 382 retrieves the first page from the record that is marked "should print" and a block 384 determines whether the user has specified whether the page should be forced to the left or right side. (This was designated by the user during creation of the pagination file at block 340 of FIG. 12). If the user has not specified that the page should be forced, a block 386 flip-flops the L/R counter such that if it was set to right it is changed to left and if it was set to left, it is changed to right and the program returns to the block 382 to retrieve the next "should print" page in the record.

Alternatively, if the block 384 determines that the user has specified that the page should be forced left or right, a block 388 determines whether the user specification matches the orientation of the page (i.e. is it the same as the L/R counter). If yes, the block 386 flip-flops the L/R counter and returns to the block 382 to retrieve the next "should print" page in the record. Otherwise, a block 390 marks an appropriate filler page (which was identified by the user during creation of the pagination file) to be printed and the program returns to the block 382 to retrieve the next "should print" page in the record.

Figure 15:
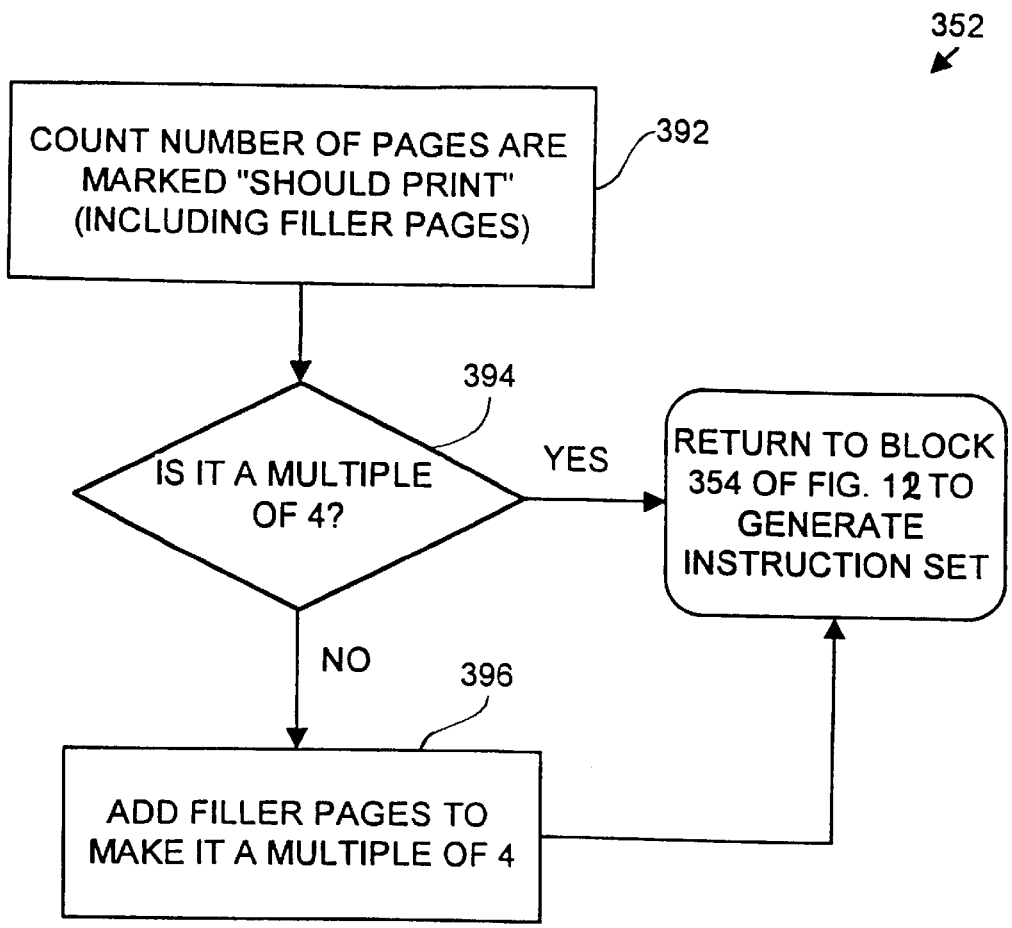
FIG. 15 is a flowchart illustrating in detail the programming implemented by the block 352 of FIG. 12 to pad the pages included in the book into a multiple of the number of pages to be printed on a sheet.

FIG. 15 illustrates in detail the programming steps implemented by the block 352 of FIG. 12 to "pad" the pages into a multiple of the number of pages to be printed on a sheet. In our example, using "saddle stitch" imposition, four pages are printed on a sheet (2 pages per side). Therefore, filler pages may need to be added to ensure that the total number of pages in the book is a multiple of 4. A block 392 first counts the number of pages in the record that have been marked to print. This includes all the master and variable pages that were marked by the block 368 of FIG. 13 as well as any filler pages that were marked by the block 390 of FIG. 14. Next, a block 394 determines whether the total number of pages is a multiple of 4. If not, a block 396 adds the appropriate number of filler pages to make the total number of pages a multiple of 4. For example, if the block 392 determines that 18 pages are marked to print, the block 396 will add 2 filler pages to make the total number of pages in the book equal to 20 (a multiple of four). The program then returns to the block 354 of FIG. 12 which generates the Postscripts instruction set.

The PostScript® instruction set specifies how the pages marked to print should be positioned (or imposed) for printing. In our example, for a "saddle-stitch" imposition format, and assuming a 12 page book, the block 354 generates an instruction specifying that the pages should be positioned as shown in the following table:

| Sheet No. | Side No. | Left Side | Right Side |
|---|---|---|---|
| 1 | 1 | Page 12 | Page 1 |
| 1 | 2 | Page 2 | Page 11 |
| 2 | 1 | Page 10 | Page 3 |
| 2 | 2 | Page 4 | Page 9 |

-continued

| Sheet No. | Side No. | Left Side | Right Side |
|---|---|---|---|
| 3 | 1 | Page 8 | Page 5 |
| 3 | 2 | Page 6 | Page 7 |

It is understood that a different instruction set could be generated (by an imposition program) to impose and print the pages in a different format (i.e. four pages per side) or alternatively, a different number of total pages.

After the block 354 generates the imposition instruction set, the pages are imposed and printed according to an imposition procedure of the present invention. The first imposition procedure of the present invention utilizes an artificial PostScript® operator called "GetTIFF", which is recognized by the Xerox DocuPrint RIP, wherein page files are preprocessed to TIFF ("tagged image file format") format before being provided to the RIP. The second imposition procedure of the present invention (referred to as "imposition-on-the-fly") involves downloading imposition programs to the RIP which redefine various PostScript® operators to automatically position pages while each page is being interpreted.

A user is prompted to specify various information needed for imposition and printing, including the sheet size (i.e. 11×17), imposition style (imposition-on-the-fly or GetTIFF), finishing style (online or offline), the output device (i.e. Xerox DocuPrint or Barco Xeikon) and the name of the directory where the master and variable page files are stored. A sample window to prompt a user to provide this information is shown in FIG. 16.

GetTIFF Imposition

A TIFF (tagged image file format) file is a bitmap representation of a page in the same screen format as the print engine. Several commercially available RIPs (such as Image Alchemy PS or TranverterPro) process pages represented in a page description language format to TIFF format. The Xerox DocuPrint RIP recognizes an artificial PostScript® operator called "GetTIFF" which retrieves a specified TIFF file and quickly processes the file for rendering by the DocuPrint demand printer. (Other demand printer RIPs, including the Barco Xeikon, may also be modified to recognize a GetTIFF-type operator).

In a preferred embodiment of the present invention, the master page PDL files 122 and the variable page PDL files 137, 138 are preprocessed to TIFF format. Because the Xerox DocuPrint system allows for only one input data stream (as opposed to the Barco Xeikon system which allows two data streams—master and variable), the master page PDL files 122 and the variable page PDL files 137, 138 may be premerged. This may be accomplished by forcing all of the master data onto the variable template files. After the master and variable pages are merged, the instruction set and GetTIFF operator are used to quickly impose and process the pages for printing.

Alternatively, the master and variable data streams may be overlayed by first processing the master pages and then overlaying the variable pages onto the master pages.

Figure 17:
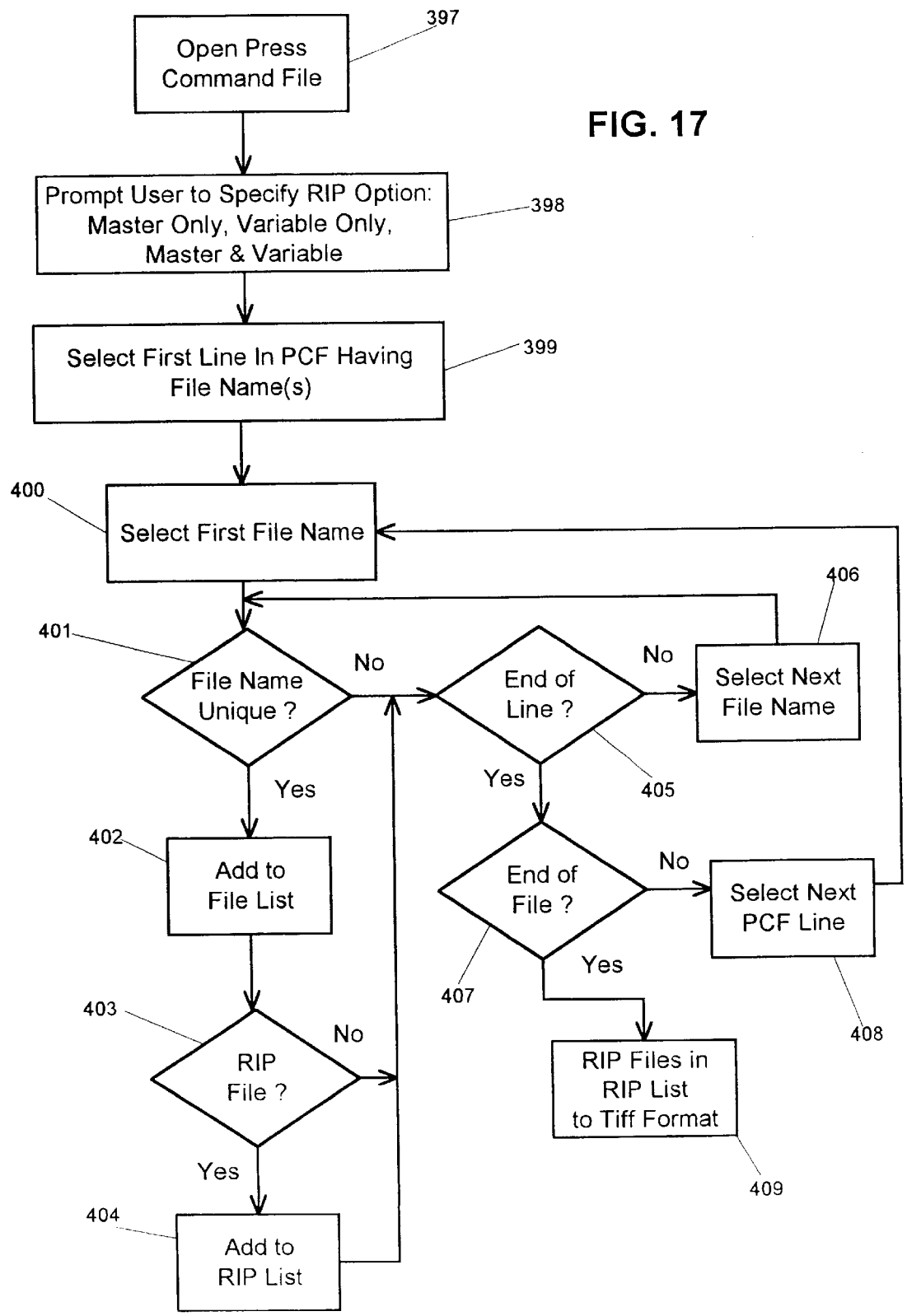
FIG. 17 is a flowchart illustrating the programming implemented to RIP page files to Tiff format for use in "Get Tiff" imposition.

FIG. 17 illustrates programming which may be executed to facilitate conversion of the page files into TIFF format. The programming begins at a block 397 which opens the press command file stored in the memory 53. A block 398 then prompts a user to specify options which are available. The options include the ability to convert only master page files, only variable page files or both master and variable page files into bitmap format. A block 399 then selects the first line in the press command file having at least one file name therein. Thereafter, a block 400 selects a first file name and a block 401 checks a file list stored in the memory 53 to see if the file name has been previously placed in the list. If this is not the case, then this is the first time the file name has been encountered in the programming of FIG. 17. Thus, a block 402 adds the file name to the file list and a block 403 checks the user-specified options set by the block 398 to determine whether the file should be converted into TIFF format. If so, a RIP list stored in the memory 53 is updated by adding the file name thereto (block 404) and control passes to a block 405. Control also passes to the block 405 from the block 403 (bypassing the block 404) if the file is not to be converted into TIFF format, and from the block 401 if the file name currently under consideration is already in the file list.

The block 405 checks to determine whether the end of the current line in the press command file has been reached. If not, a block 406 selects the next file name in the line and control returns to the block 401.

If the block 405 determines that the end of the current line in the press command file has been reached, a block 407 checks to determine whether the end of the press command file has been reached. If not, a block 408 selects the next line in the press command file having at least one file name and control returns to the block 400. On the other hand, if the end of the file has been reached, a block 409 causes the RIP 82 (or another RIP) to convert the files identified in the RIP list into TIFF format.

The programming of FIG. 17 thus facilitates conversion of files to TIFF format as required by the print system 79.

Figure 18:
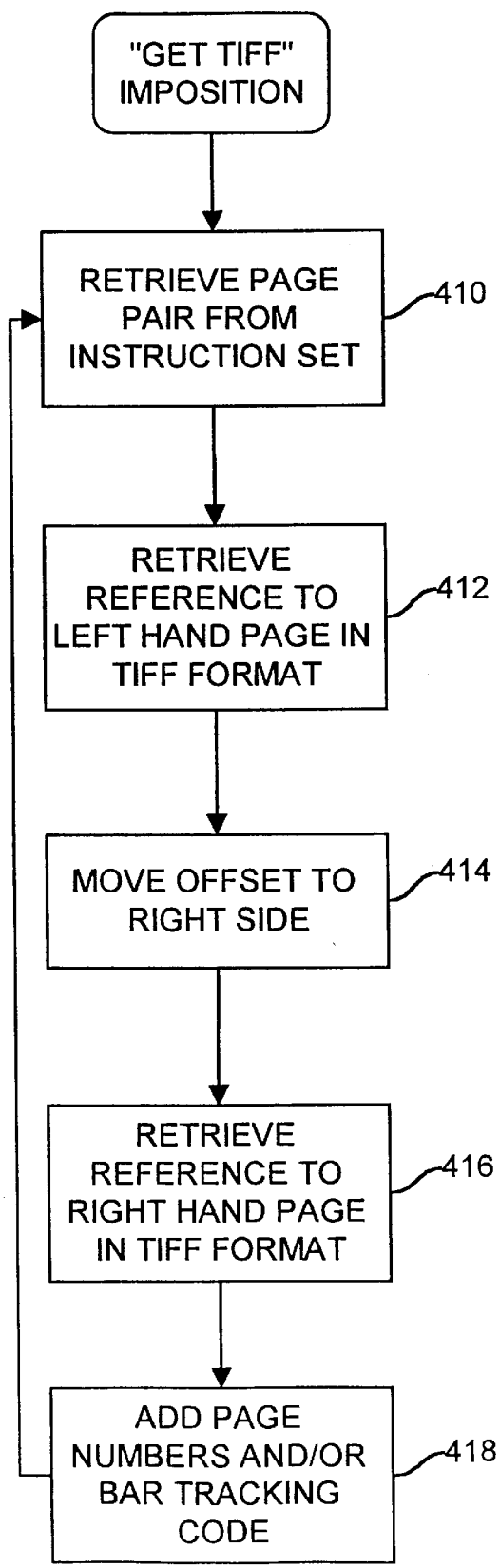
FIG. 18 is flowchart illustrating the programming implemented to impose pages using "Get Tiff" imposition.

Referring to FIG. 18, if the user specified GetTIFF imposition and after the page files have been RIPped to TIFF format by the programming of FIG. 17, a block 410 retrieves the first page pairing from the instruction set (in our example, page 12 as the left hand page and page 1 as the right hand page). A block 412 then retrieves a reference to the page description of the left hand page in TIFF format from the page file and provides it to the RIP 82. Assuming the default offset is positioned at the left side of the sheet, the left hand page is positioned on the left side of the sheet.

A block 414 then moves the offset to position the next page onto the right side of the sheet. A block 416 retrieves the reference to the page description in TIFF format of the right hand page from the page file and provides it to the RIP 82. Next, a block 418 may add page numbers and/or a bar tracking code to the sheet, as explained below. The program then returns to the block 410 to retrieve the next page pair from the instruction set and the program repeats until all pages and all books have been processed.

After all pages have been processed, they are RIPped and printed by the demand printer 84 in accordance with the initialization (INI) file, which was created by the block 212 (FIG. 10b).

If, for example, the demand printer is a DocuPrint (i.e., no INI file was created), the pages are submitted to the queue (which contains the same parameters as the INI file) for RIPping and printing.

A partial Postscript® instruction set for printing the 12-twelve page brochure in accordance with the table above implementing the GetTIFF imposition according to FIG. 18 is set forth below:

```
<<
/PageSize [1224 792]            % set sheet size
>> setpagedevice                % (11 × 17)
(VERON12.V01__dir/  % get left page
    VERON12.V01.00000002.tiff)  GetTIFF
612 0 translate                 % move to right
(VERON01.V01__dir/  % get right page
    VERON01.V01.00000002.tiff)  GetTIFF
showpage
(VERON02.M__dir/    % get left page
    VERON02.M.00000002.tiff)    GetTIFF
612 0 translate         move to right
(VERON11.V01__dir/  % get right page
    VERON11.V01.00000002.tiff)  GetTIFF
showpage
.
.
.
(VERON06.M__dir/    % get left page
    VERON06.M.00000004.tiff)    GetTiff
612 0 translate             % move to right
(VERON07.V03__dir/  % get right page
    VERON07.V03.00000003.tiff)  GetTiff
showpage            % reset to left
```

In the instruction set, the "VERON*.*__dir/VERON*.*" indicates the directory and filename where the page descriptions are located. The suffix ".M" indicates a master page and the suffix ".V_" indicates a variable page (with the version number of the variable page to be printed). The suffix "__*tiff" is the file name created by the RIP which converted the page files to TIFF files and indicates that the files are in TIFF format. The artificial Postscript® "Get-TIFF" operator interprets the TIFF files. The "612 0 translate" command moves the offset to the right hand side of the sheet (block 414) and the Postscript® showpage operator transmits the page to the demand printer 84 for rendering, prepares for interpreting the next page description and resets the offset to the left hand side.

Optionally, the block 418 may print page numbers and/or a bar tracking code onto the sheets printed by the demand printer 84. This may be accomplished by adding the following additional PostScript® code before the showpage operator in the instruction set shown above:

```
/C39P24Dm 24 selectfont         % add bar code info
30 4.5 sub 18 translate 90 rotate  % position on
0 0 moveto                      % side of sheet
(1.12) show                     % indicates sheet 1 of 12
                                %
/Helvetica 12 selectfont        % add page numbers
320 780 moveto                  % center in middle of left page
(12) show                       % print page "12"
-320 780 move to                % center in middle of right page
(1) show                        % print page "1"
```

The first section of code provides the command for printing a bar code (indicating for example, the page number and the total number of pages in the book). The second section of the code prints page numbers centered at the bottom of each page. A similar technique could be used to do any "post page" modifications, such as watermarking samples or QC books, adding variable printers marks or the like.

Imposition-on-the-Fly

Figure 19:
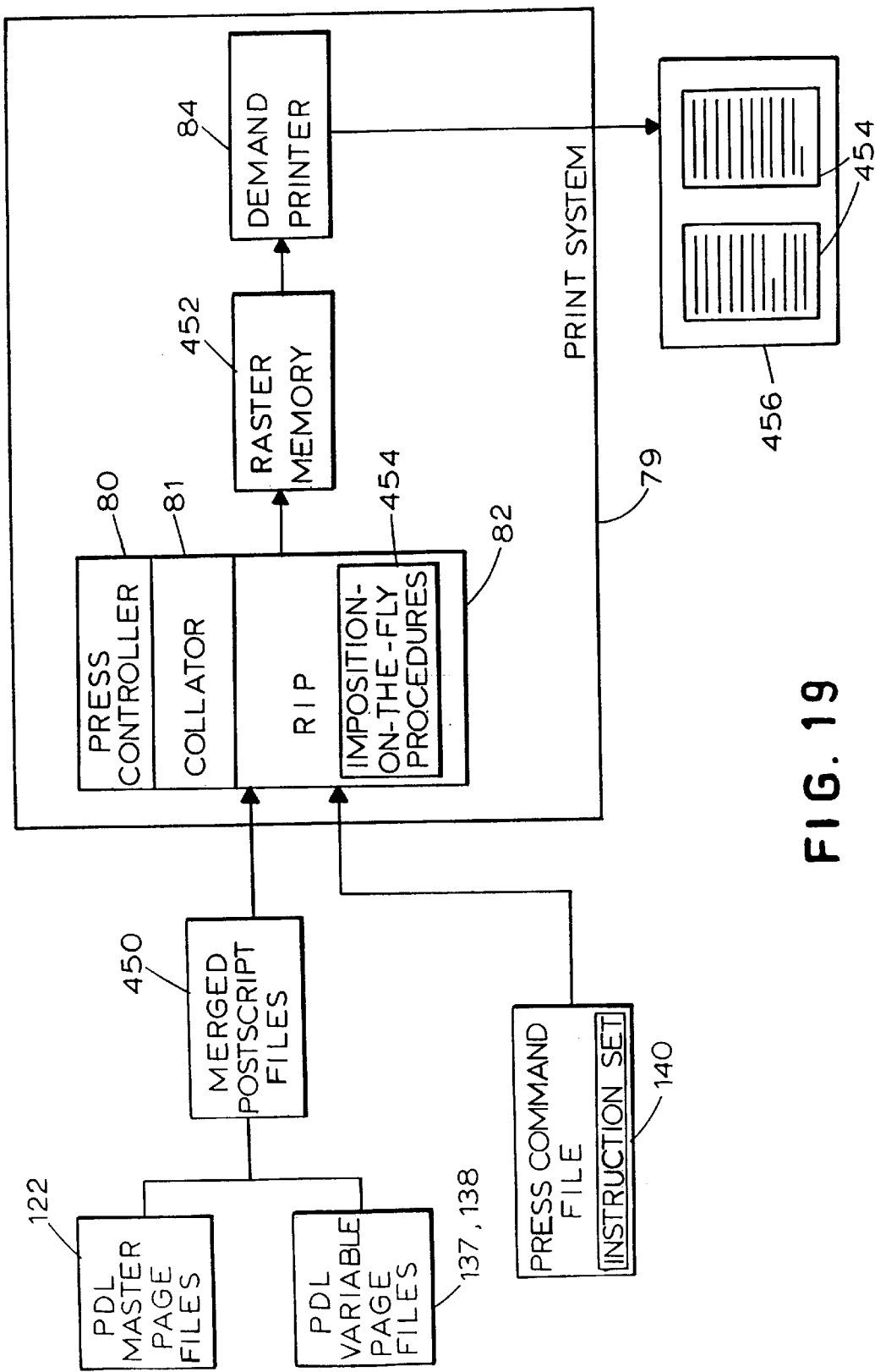
FIG. 19 is a more detailed block diagram of the print system 79 (shown in FIG. 4) incorporating the imposition-on-the- fly procedures.

The user may also specify that the pages be imposed and printed using the imposition-on-the-fly technique of the present invention. This technique positions the pages while the pages are being interpreted by the RIP. FIG. 19 is a more detailed block diagram of the print system 79 shown in FIG.

4. The PDL master page files 122 and the PDL variable page files 137, 138 may be combined into merged PDL files (such as merged PostScript file(s) 450), which are then provided to the print system 79, comprised of RIP 82, collator 81, press controller 80 and demand printer 84. The press command file 140, which includes the instruction set for specifying how pages should be imposed, is also provided to the print system 79.

Alternatively, as described above, the master page files 122 and the variable page files 137, 138 may be provided separately to the print system 79 and overlayed.

The print system 79 may also include a raster memory 452 associated with the RIP 82 and the demand printer 84. The RIP 82 generates a raster description of the "current page" being interpreted, which may be stored in the raster memory 452 or provided to the demand printer 84 for rendering. The demand printer 84 physically renders pages 454 from the merged PostScript® file 450 onto a "flat" (or other medium) 456.

For purposes of illustration, it is assumed that the RIP 82 interprets the widely used PostScript® PDL language. (PostScript® is a registered trademark of Adobe Systems, Inc.) The PostScript® language is fully described in the *PostScript® Language Reference Manual, Second Edition* (1990), from Adobe Systems, Inc., which is incorporated herein by reference. Certain imposition-on-the-fly procedures 454 according to the present invention are downloaded to the RIP 82. (The procedures 454 include, for example, ImposeJob, ImposeFile and various redefined PostScript® operators which are described in detail below). The imposition-on-the-fly procedures 454 will be used by the RIP 82 to process the instruction set and the page descriptions contained in the merged Postscript® files 450 to efficiently transmit pages for rendering by the demand printer 84. (For ease in illustration, it is assumed the master and variable page files were premerged into merged file 450. It is understood, however, that the master and variable page files could also be overlayed.)

Postscript® Background

In order to facilitate the explanation of imposition-on-the-fly procedures of the present invention, some background regarding the PostScript® language is provided. Further background details may be found in the *PostScript® Language Reference Manual, Second Edition* (1990), from Adobe Systems, Inc., which was previously incorporated by reference.

The RIP 82 manages four different stacks, which are "last-in-first-out" (LIFO) data structures. These stacks include:

(1) an Operands Stack which holds (i) the input operands to various PostScript® operators, and (ii) the results of the operations;

(2) an Execution Stack which is controlled by the RIP 82 and which holds executable objects (i.e. procedures and files) that are in stages of execution;

(3) a Dictionary Stack which includes (i) a read only dictionary ("systemdict") which defines the implementation of the various PostScript® operators, (ii) a writeable dictionary ("userdict") which stores all other definitions, and (iii) specialized dictionaries created by the user (e.g., an imposition dictionary); and (4) a Graphics State Stack which is used to store graphics information, such as the parameters of the demand printer 84.

The PostScript® language is device independent such that the page descriptions contained in the merged PostScript® file 450 are specified in a coordinate system (called "user space") that is independent of the particular demand printer 84. The coordinate system (called "device space") used by the demand printer 84 varies depending on the particular demand printer 84 (the "current device") which is specified for rendering the current page. In order to render the pages described in the merged PostScript® file 450, the page descriptions (specified in user space) may be transformed to the current device space by a Current Transformation Matrix ([CTM]).

The PostScript® language uses the Current Transformation Matrix ([CTM]) to describe scaling, rotation, and translation of the page from user space to device space. For mapping the point (x, y) in user space to the point (x', y') in device space:

$$[CTM] = [a \quad b \quad c \quad d \quad t_x \quad t_y], \text{ where}$$

$$x' = ax + cy + t_x$$

$$y' = bx + dy + t_y$$

where a, b, c, and d determine the extent of scaling and rotation and where $t_x$ and $t_y$ determine the extent of translation.

The RIP 82 also maintains a data structure, called the "graphics state," that holds various graphics control parameters, including the [CTM]. The graphics state also includes (i) a clipping path, which defines the rendering area in the raster memory 452 for the current page; (ii) font and line definitions; (iii) a color space (such as DeviceGray, RGB, CMYK or CIE); and (iv) other graphics control parameters.

The PostScript® language includes several operators for setting up the current demand printer 84 to fulfill the processing requirements of the page descriptions contained in the merged PostScript® file 450. The current device setup includes establishing the Current Transformation Matrix ([CTM]) for the current demand printer 84. The default transformation from user space to device space for the current device is specified by a "system default matrix." The system default matrix may be generated by the PostScript® language, for example, by a defaultmatrix operator. The [CTM] may be considered an alteration of the system default matrix.

Once the current demand printer 84 has been set up, the RIP 82 can begin to interpret the page descriptions in the merged PostScript® file 450. For each page in turn, everything that is to appear on that page (including text, graphics, and images) is "painted" into the raster memory 452 and stored and/or rendered by the demand printer 84.

In the merged Postscript® file 450, each description of a page to be rendered includes a PostScript® showpage operator. The showpage operator, which is generally included at the end of each page description, is used to transmit the raster description of the current page (saved in the raster memory 452) to the demand printer 84 for physical rendering of the current page. In general, the showpage operator transmits the contents of the raster memory 452 to the demand printer 84, then erases the current page from the raster memory 452 and partially resets the graphics state in preparation for interpreting the next page description in the merged PostScript® file 450.

In level 2 PostScript® implementations, the function of the showpage operator is controlled by an EndPage procedure and a BeginPage procedure that are defined according to the current demand printer 84. In general, the EndPage procedure specifies the disposition of the current page in the raster memory 452 and the BeginPage procedure sets up and marks the beginning of the next page description to be interpreted. These procedures may be defined, for example, by a level 2 setpagedevice operator which sets up the graphics state for the current demand printer 84 (the "current graphics state").

During normal operation, the level 2 showpage operator provides two operands to the EndPage procedure: a reason code and Pagecount. The reason code operand specifies whether the EndPage procedure is being called by the showpage operator, by a copypage operator, or during a device deactivation. When the EndPage procedure is called by the showpage operator, the reason operand is set to 0. The Pagecount operand is the number of executions of the showpage operator that have occurred since the current device was activated, not including the present execution. Thus, Pagecount is equal to the number of pages that have been rendered prior to the current page. After the EndPage procedure is executed, Pagecount is incremented by one and is provided as an operand to the BeginPage procedure.

Figure 20:
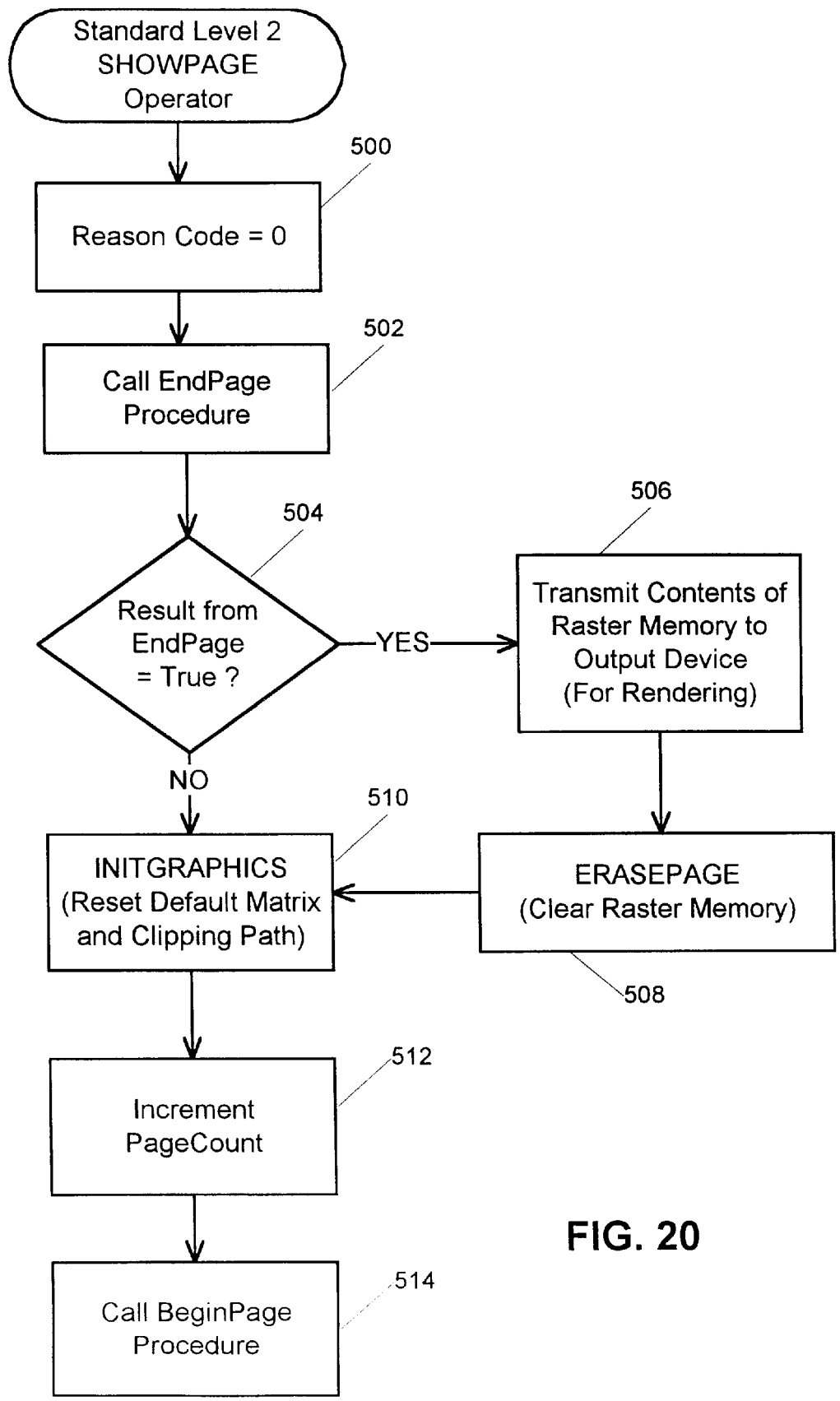
FIG. 20 is a flowchart illustrating the standard operation of the Level 2 Postscript® showpage operator.

The operation of the level 2 showpage operator is illustrated in the flowchart of FIG. 20. A block 500 first sets the reason code operand equal to zero to specify that the EndPage procedure is being called by the showpage operator. A block 502 then calls the EndPage procedure, which consumes the reason code and PageCount operands and returns a boolean result that specifies the disposition of the current page in the raster memory 452. During normal operation, the EndPage procedure returns true during execution of the showpage or copypage operators (causing a physical page to be produced) and returns false during device deactivation. A decision-making block 504 determines whether the result returned from the EndPage procedure is true or false.

If the EndPage procedure returns "true", a block 506 transmits the contents of the raster memory 452 to the demand printer 84 for rendering. A block 508 then clears the raster memory 452 by executing a procedure similar to a Postscript® erasepage operator. Under normal operation, the EndPage procedure returns true if it is called by the showpage or copypage operator. Thus, the showpage and copypage operators cause the contents of the raster memory 452 to be transmitted to the demand printer 84 for rendering.

If the EndPage procedure returns a "false", the showpage operator does not perform either of the functions of the blocks 506 and 508 (i.e., no page is rendered), but skips to a block 510. The block 510 executes a procedure similar to a PostScript® initgraphics operator which resets the [CTM], the clipping path, and other graphics parameters to the default values for the current demand printer 84, thus setting up the graphics state for composing the next page. The clipping path defines the rendering area for the current page stored in the raster memory 452.

A block 512 then increments the Pagecount operand by one and a block 514 calls the BeginPage procedure with Pagecount as an operand. The BeginPage procedure marks the beginning of the next page in the merged PostScript® file 450 to be interpreted by the RIP 82.

The standard operation of the level 2 showpage operator illustrated in FIG. 20 may be represented by the following Postscript® pseudo code:

```
/showpage {
    /reason 0 def                           % reason = 0 for
                                            % showpage
```

```
    { transmit contents of                  % \ do these lines
      raster memory to                      % \ only
      demand printer                        %  / if EndPage
      erasepage } if                        % / returns true
    initgraphics                            % set default graphics
                                            % state
    /pagecount pagecount 1 add def          % increment
                                            % pagecount
    pagecount BeginPage                     % call BeginPage
                                            % procedure
} def
```
pagecount reason EndPage                    % call EndPage
                                            % procedure The Imposition-on-the-Fly Procedures The imposition-on-the-fly procedures of the present invention create a layer on top of the demand printer, called a "virtual device." The desired position (scale, orientation and size) of a page to be printed by the demand printer is specified by a procedure (called "setvirtualdevice") which establishes the virtual device for that page. Thus, from the standpoint of the PostScript® program, the [CTM] is the same as the system default matrix and every page begins with a [CTM] mapping user space coordinates to the lower left corner of the output device. The [CTM] can be explicitly manipulated as if each PostScript® page were imaged on a distinct, but identical, physical page.

Thus, when imposing and rendering a selected page from the merged Postscript® file 450, the current output device (i.e. the demand printer 84) is defined as the virtual device. In general, the virtual device for a selected page is the same size as the page and is positioned at the place on the flat 456 where the page is to be rendered.

The virtual device is established by setting the current transformation matrix ([CTM]) to properly position the page. A clipping path, which defines the rendering area in the raster memory 452, is then created around the border of the page. Thus, the RIP 82 "sees" the position where the page is to be rendered as the current output device.

For pages in the merged PostScript® file 450 that will not be rendered on the current flat 456 (i.e. are not included in the current book), the current output device (the demand printer 84) is defined as a scaled-down virtual device for the next page to be imposed and rendered on the flat. The scaled-down virtual device allows any intervening pages not to be imposed on the flat to be quickly interpreted by the RIP 82.

The imposition-on-the fly procedures include the setvirtualdevice procedure, which establishes the virtual device for the next page to rendered on the flat 456 and an EnableVirtualDevice procedure which sets up the showpage operator to support virtual devices. The EndPage and BeginPage procedures that are invoked by the showpage operator are also redefined. These procedures will be described in detail below.

The Imposition-on-the-Fly Instruction Set

Preferably, the instruction set for implementing imposition-on-the-fly by creating the virtual device for pages to be rendered on the flat are input to the RIP 82 in the below-described format. However, the present invention may be modified to properly impose different instruction set formats.

The imposition-on-the-fly instruction set contains the name(s) of the merged PostScript® file(s) 450 that will be interpreted by the RIP 82 and rendered by the demand printer 84. These file names are associated with entry lists (stored in arrays) containing one or more entries, wherein each entry contains the following information:

1) A first user procedure—The user procedure may contain various instructions, including comments, printer's marks (such as barcodes or watermarks) or other information. (The user procedure may also be null and is not essential to the imposition-on-the-fly procedures of the present invention).

2) A page number—The page number is the sequential number of the page description in the merged PostScript® file 450 of the page to be rendered on the flat 456. The merged PostScript® file 450 is assumed to contain page descriptions in sequential order, wherein the first page description is page "0."

3) Operands to the setvirtualdevice procedure—As explained in detail below, the setvirtualdevice procedure establishes the appropriate virtual device as the current output device for a particular page. The setvirtualdevice procedure requires the following three operands, which are included in each entry in the entry list:

i) the scaling, translation and rotation factors which will be used to generate a "virtual [CTM]" which will properly position the selected page on the flat 456. These factors are listed as follows: [scale_x scale_y translate_x translate_y rotate];

ii) the user space coordinates of the lower-left and upper-right corners of the actual rendering area of the next page to be rendered on the flat 456. These corner coordinates will be used to generate a clipping path around the border of the page in the raster memory 452. The corner coordinates are listed as follows: [ClipllX ClipllY ClipurX ClipurY]; and iii) the size (width and length) of the page to be rendered on the flat. The page size is listed as follows: [PageX PageY]. (The page size is not necessarily equivalent to the clipping path defining the rendering area of the page, as many demand printers are unable to place marks at the extreme edges of the page).

4) A second user procedure ("offsets"): Like the first user procedure, the second user procedure may contain comments, printer's marks (barcodes, watermarks, etc.) or other information or may be null. In a preferred embodiment, however, for the first page on the flat, the second user procedure is used to "offset" the program to the next page to be rendered on the flat.

For example, the merged Postscript® file generally contains many, many pages because it includes separate page descriptions for each variable page. Assume a simple four page book with three master pages and only one variable page. The book may be sent to 1,000 different people, with different variable information for each person. Thus, the merged Postscript® file contains 1,003 page descriptions—3 master pages and 1,000 variable pages. Imposition-on-the-fly with offsets allows for quick printing of the books because it "skips over" (i.e. does not RIP) the 999 variable pages that will not be included in each book.

For imposition-on-the-fly with offsets, the second user procedure for the first entry in the instruction set contains a file object, an offset position and the PostScript® setfileposition operator. The offset position points to the next page description in the file that is to be included on the flat. (The offset positions were calculated and saved by the block 364 of FIG. 13.) The setfileposition operator repositions the current merged Postscript® file 450 to that offset position.

Thus, the PostScript® instruction set format for imposition-on-the-fly imposition of the present invention is as follows:

```
[ (FileName)
    [ { user procedure 1 }
        page# { operands to setvirtualdevice }
        { FileObject offset setfileposition }
    ]
    [ { user procedure 1}
        page# { operands to setvirtualdevice }
        { user procedure 2-barcodes, watermarks, etc. }
    ]
]
```

A sample imposition-on-the-fly with offsets instruction set is attached as Appendix I. The Appendix I instruction set also includes code in certain second user procedures to print a barcode.

Explanation of Variables

The variables used by the imposition-on-the-fly procedures may be conveniently defined and stored in a user dictionary (called, for example, "impositiondict"). These variables include:

1) PageOffset—the cumulative number of pages from any previous Postscript® files that have been interpreted in accordance with the imposition-on-the-fly procedures of the present invention. Initially, PageOffset is set to −1 (no previous files (or pages) have been interpreted).

2) CurrentPage—the number of the next page in the current merged PostScript® file 450 that is to be rendered on the current flat 456. CurrentPage is initially set to 0.

3) LastPage—the number of the last page in the current merged PostScript® file 450 that is to be rendered on the current flat, which is equal to the page number in the last entry of the entry list. LastPage is initially set to 1 and is used to determine how many page descriptions in the merged PostScript® file must be interpreted in order to properly render all of the selected pages on the current flat.

4) PageCount—the number of times that the showpage operator has been executed (initially 0). In level 2 PostScript® implementations, PageCount is stored and incremented internally by the RIP 82 through the showpage operator. However, in level 1 PostScript® implementations, the PageCount variable must be explicitly defined and incremented to emulate the operation of the level 2 showpage operator.

5) PageList—the list of entries (page numbers and imposition procedures) contained in the entry list.

6) CurrentIndex—an index into the PageList.

7) LastIndex—the number of entries in the entry list.

8) DefaultMatrix—used to store the value of the [CTM] describing the virtual device (the "virtual [CTM]"). The scaling, translation and rotation components of the virtual [CTM] are supplied as operands to the setvirtualdevice procedure.

9) PageX and PageY—the width and height respectively of the page to be rendered on the flat 456. The values of PageX and PageY are provided in each entry of the entry list as operands to the setvirtualdevice procedure.

10) DefaultPageX and DefaultPageY—the default values of the page width and height, respectively. Their values are initially set to 8½" (612) and 11" (792), respectively.

11) ClipllX, ClipllY, ClipurX and ClipurY—the user space coordinates of the lower-left and upper-right corners, respectively, of the clipping path defining the border of the virtual device. The values of these variables are also included as operands to the setvirtualdevice procedure.

12) Portrait—a boolean variable used to describe the page orientation of the current page. If Portrait is true, the current page has a portrait orientation (page width<page height). If Portrait is false, the current page has a landscape orientation (page width>page height).

13) DefaultPortrait—the default value for the page orientation, which is initially set to true (portrait orientation).

14) VirtualDeviceEnabled—a boolean variable used to determine whether a procedure called, for example, "EnableVirtualDevice," has been executed. As explained in detail below, the EnableVirtualDevice procedure sets up the standard PostScript® showpage operator to support virtual devices.

15) ImageDone—a boolean variable used to specify when the current flat 456 has been completed. ImageDone is initially and normally set to false, indicating that the current flat 456 has not been completed.

A further description of the variables used is included in the following PostScript® code, which creates the impositiondict dictionary and initializes the variables:

| | |
|---|---|
| /impositiondict 200 dict det | % create dictionary |
| | % impositiondict begin |
| /Identity matrix def | % used as input to setmatrix |
| /Matrix matrix def | % dummy matrix for temp storage |
| /Matrix2 matrix def | % dummy matrix for temp storage |
| /Matrix3 matrix def | % dummy matrix for temp storage |
| /Matrix4 matrix def | % dummy matrix for temp storage |
| /DefaultPageX 612 def | % default page width (X) and |
| /DefaultPageY 792 def | % page length (Y) (8 1/2" × |
| | % 11"{ |
| /DefaultPortrait true def | % assume page orient = |
| | % portrait |
| /PageOffset −1 def | % first file-no previous |
| | % pages |
| /CurrentPage 0 def | % initial value of page to |
| | % impose |
| /CurrentIndex 0 def | % initial value of page to |
| | % impose |
| /LastPage 2147483647 def | % initial value is highest |
| | % number |
| /PageCount 0 def | % used in level 1 only |
| /DefaultMatrix matrix | % the "default" matrix for the |
| currentmatrix def | % current virtual device |
| /VirtualDeviceEnabled false def | % allow normal |
| | % operation |
| /ImageDone false def | % not done with current media |
| | % Set initial job defaults |
| /Portrait DefaultPortrait def | % default to portrait |
| | % mode |
| /PageX DefaultPageX def | % initial page size |
| /PageY DefaultPageY def | % |
| /CliplIX 0 def | % initial lower left |
| /CliplIY 0 def | % and upper right |
| /ClipurX DefaultPageX def | % corners of |
| /ClipurY DefaultPageY def | % clipping path |

The Redefined PostScript® Operators

Also, before executing the imposition-on-the-fly procedures of the present invention, several PostScript® operators must be redefined for compatibility with the EnableVirtualDevice and setvirtualdevice procedures, which will be described in detail below. The virtual device, in effect, "shields" the PostScript® program and RIP from where the pages are being painted into the raster memory 452 through the [CTM]. Thus, in general, the PostScript® operators that affect the [CTM] must be redefined to also "shield" the PostScript® program and RIP from the final mapping of the page description from user space to device space coordinates. The PostScript® operators which must be redefined include:

| | |
|---|---|
| initmatrix | transform |
| initclip | itransform |
| setmatrix | dtransform |
| currentmatrix | idtransform |
| erasepage | nulldevice |
| initgraphics | copypage |

The standard operation of these, and all other PostScript® operators, is fully described in the PostScript® *Language Reference Manual, Second Edition* (1990), from Adobe Systems, Inc., which was previously incorporated by reference.

The first step in redefining the above-listed PostScript® operators is to rename the standard operator, for example, "systemdict_operator," because its definition is stored in the systemdict dictionary. This may be implemented by the following code:

\systemdict_initmatrix systemdict \initmatrix get def
\systemdict_initclip systemdict \initclip get def
\systemdict_setmatrix systemdict \setmatrix get def
\systemdict_erasepage systemdict \erasepage get def
\systemdict_initgraphics systemdict \initgraphics get def
\systemdict_currentmatrix systemdict \currentmatrix get def
\systemdict_transform systemdict \transform get def
\systemdict_itransform systemdict \itransform get def
\systemdict_dtransform systemdict \dtransform get def
\systemdict_idtransform systemdict \idtransform get def As explained below, the standard nulldevice and copypage operators are not renamed because their standard operation will never be used in connection with the present invention. The new definitions of the operators, described below, are then loaded into the userdict dictionary.

The Redefined Initmatrix Operator

The standard PostScript® initmatrix operator sets the [CTM] to the system default matrix for the current device. The initmatrix operator is redefined to set the [CTM] equal to the virtual [CTM] which defines the virtual device.

The Virtual [CTM] May be Stored in the Variable DefaultMatrix

The PostScript® initmatrix operator may be redefined by the following code:

```
/initmatrix {
    impositiondict begin
    DefaultMatrix
    systemdict_setmatrix
    end
} bind def
```

The Redefined Initclip Operator

The default clipping path corresponds to the boundary of the maximum imageable area for the current output device (the demand printer 84). The standard PostScript® initclip operator replaces the current clipping path in the graphics state with the default clipping path for the current demand printer. The initclip operator is redefined to replace the current clipping path in the graphics state with a clipping path defining the border of the virtual device page.

Figure 21:
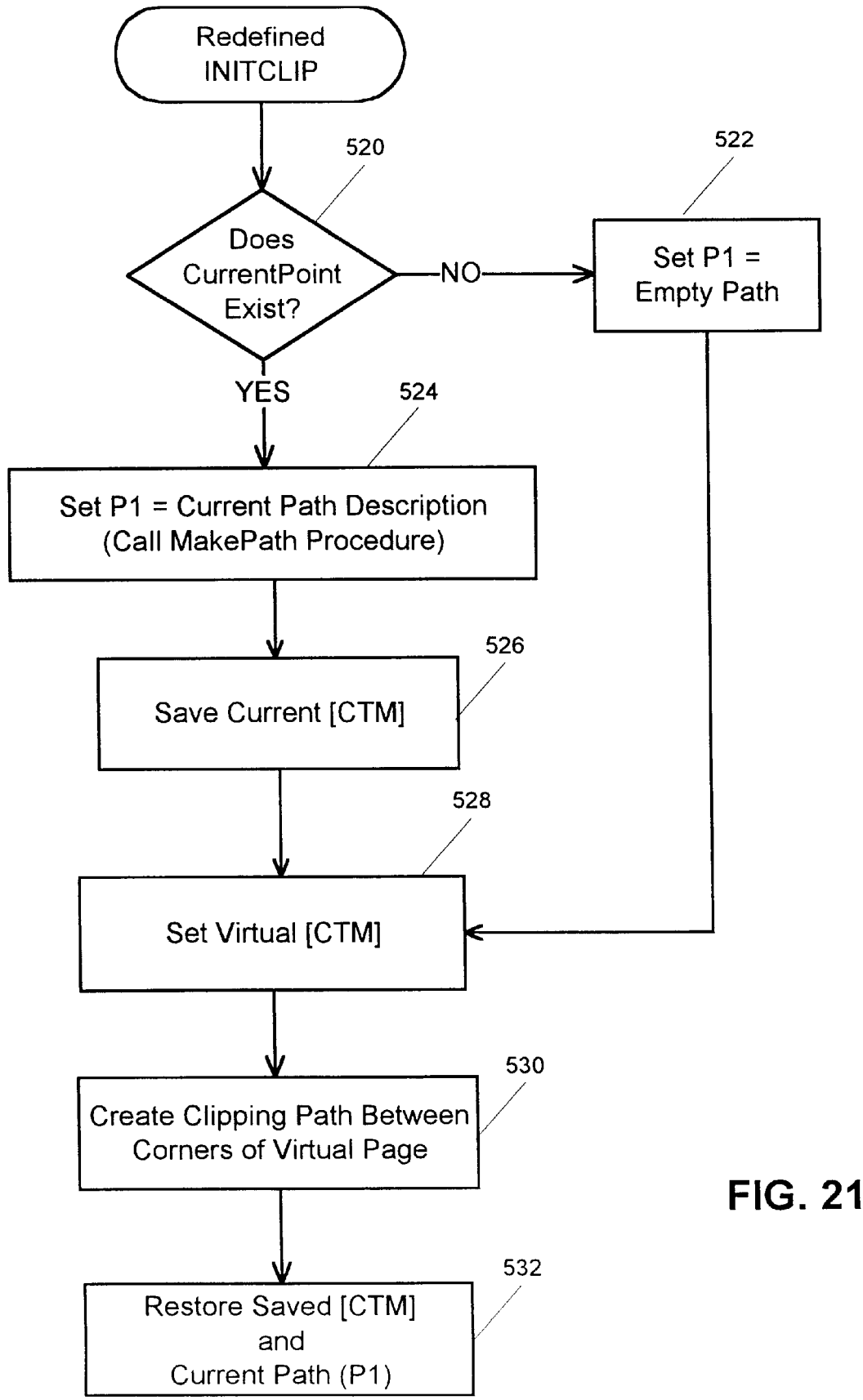
FIG. 21 is a flowchart illustrating the program steps implemented by the redefined PostScript® initclip operator according to the imposition-on-the-fly procedures.

The flowchart of FIG. 21 illustrates the program steps implemented by the redefined initclip operator. A decision-making block 520 determines whether a current path exists by checking for the existence of a currentpoint. If no currentpoint is defined, a block 522 stores an empty path in a variable called, for example, "p1." Alternatively, if a currentpoint is defined, a block 524 invokes a previously defined utility routine called, for example, "MakePath," that creates a path description from the current path. The block 524 then saves the current path description in the variable p1. The MakePath procedure, which may be stored in the impositiondict dictionary, is similar to the level 2 upath operator and may be implemented as follows:

```
/MakePath {
    [ {/moveto cvx} {/lineto cvx} {/curveto cvx}
        {/closepath cvx} pathforall ] cvx
} bind def
```

Next, a block 526 saves the current [CTM] and a block 528 sets the [CTM] to the virtual [CTM]. A block 530 then creates a clipping path between the corners of the virtual device, which were specified by the values of the ClipllX, ClipllY, ClipurX and ClipurY variables provided as operands to the setvirtualdevice procedure. A block 532 then restores the [CTM] which was saved by the block 526 and the current path saved in the variable p1. The initclip operator may be redefined as follows:

```
/initclip
    impositiondict begin
    { currentpoint } stopped
        /pl { } def }              % p1 = empty path
        pop pop /p1 MakePath def}  % p1 = current path
    ifelse
    matrix systemdict_currentmatrix
    initmatrix
    systemdict_initclip
    newpath
    CliplIX CliplIY moveto         % create clippath
    ClipurX CliplIY lineto
    ClipurX ClipurY lineto
    CliplIX ClipurY lineto
    closepath
    clip
    newpath
    systemdict_setmatrix
    p1                             % restore current
    end                            % path
} bind def
```

The Redefined Setmatrix Operator

The standard Postscript® setmatrix operator replaces the current [CTM] in the graphics state with a matrix that is supplied on the Operands stack. The matrix supplied on the Operands stack ("the operand matrix") can be considered the result of the concatenation of the system default matrix with an operations matrix.

The setmatrix operator is redefined to calculate the operations matrix by concatenating the operand matrix with the inverse of the system default matrix. Thus,

[operand matrix]=[operations matrix] [system default matrix], and

[operations matrix]=[operand matrix] [system default matrix]$^{-1}$.

Once the operations matrix is calculated, it is concatenated with the virtual [CTM] (stored in DefaultMatrix) and saved as the new [CTM]. Thus, new [CTM]=[operations matrix] [virtual CTM].

The Postscript® setmatrix operator may be redefined by the following code:

```
/setmatrix {
    impositiondict begin
    Matrix defaultmatrix
    Matrix2 invertmatrix
    Matrix3 concatmatrix
    DefaultMatrix
    Matrix4 concatmatrix
    systemdict_setmatrix
    end
} bind def
```

The Redefined Currentmatrix Operator

The standard currentmatrix operator replaces the matrix supplied on the Operands stack with the current [CTM] in the graphics state.

The current [CTM] can be considered the result of concatenating the virtual [CTM] (saved in DefaultMatrix) with an operations matrix. The redefined currentmatrix operator calculates the operations matrix by concatenating the current [CTM] with the inverse of the virtual [CTM] as set forth below:

[current CTM]=[operations matrix] [virtual CTM], and

[operations matrix]=[current CTM] [virtual CTM]$^{-1}$.

The [operations matrix] is then concatenated with the system default matrix and the resultant matrix is stored in the matrix on the Operands stack.

The Postscript® currentmatrix operator may be redefined by the following code:

```
/currentmatrix {
    impositiondict begin
    Matrix systemdict_currentmatrix
    DefaultMatrix
    Matrix2 invertmatrix
    Matrix3 concatmatrix
    Matrix4 defaultmatrix
    3 -1 roll
    concatmatrix
    end
} bind def
```

The Redefined Erasepage Operator

The standard erasepage operator erases the entire current page stored in raster memory by painting the page white. The erasepage operator is redefined to erase only the virtual device page, which is the area defined by the next page to be rendered on the current flat.

The erasepage operator is redefined by calling the redefined initclip operator, described above, which establishes a clipping path around the border of the virtual device page. The area inside the clipping path is then painted white. The standard PostScript® gsave operator (described in detail in connection with the optional imposition-on-the-fly procedures of the invention) is called immediately before the redefined initclip operator to save the current graphics state, including the current clipping path, gray level, etc. Also, after the virtual device page has been painted white, the standard PostScript® restore operator (also described in detail in connection with the optional procedures) is called to restore the current graphics state.

The Postscript® erasepage operator may be redefined by the following code:

```
/erasepage {
    impositiondict begin
        gsave         % systemdict_gsave for optional procs
        initclip
        clippath 1 setgray fill
        grestore      % systemdict_grestore for optional
                      % procs
    end
} bind def
```

(In the optional imposition-on-the-fly procedures, the standard PostScript® gsave and restore operators are redefined. Thus, in the optional procedures, the erasepage operator is redefined by calling the systemdict_gsave and systemdict_restore operators, as specified above.)

The Redefined Initgraphics Operator

The standard PostScript® initgraphics operator resets several values in the graphics state, including the [CTM], the current path and the clipping path, to their default values. The standard initgraphics operator is equivalent to the following PostScript® language sequence:

initmatrix newpath initclip
    1 setlinewidth 0 setlinecap 0 setlinejoin
    [ ] 0 setdash 0 setgray 10 setmiterlimit The initgraphics operator is redefined to perform the above listed sequence. However, the redefined initgraphics calls the redefined initmatrix and initclip operators, which were described above. Thus, the redefined initgraphics operator resets the [CTM] and the clipping path to their default values for the virtual device. The Postscript® initgraphics operator may be redefined by the following code:

```
/initgraphics {
    initmatrix newpath initclip
    1 setlinewidth 0 setlinecap 0 setlinejoin
    [] 0 setdash 0 setgray 10 setmiterlimit
} bind def
```

The Redefined "Transform" Operators

The standard PostScript® transform operator transforms a supplied user space coordinate (x,y) to the corresponding device space coordinate (x',y') as specified by the [CTM]. Since the [CTM] is altered during the imposition process, the transform operator is redefined to perform the transformation as if the [CTM] had not been altered.

If a matrix operand is supplied to the standard transform operator, the transformation from user to device space is performed according to the supplied matrix. Thus, if a matrix operand is supplied, the transform operator is also redefined to perform the transformation according to the supplied matrix.

The PostScript® language includes three other "transform" operators (dtransform, itransform and idtransform) which are redefined in the same manner as the transform operator.

The standard PostScript® dtransform operator specifies a "distance" transformation of a coordinate from user to device space according to the [CTM] or a supplied matrix operand. In a distance transformation, the translation components ($t_x$ and $t_y$) of the [CTM] are not used.

The standard PostScript® itransform operator specifies a transformation of a coordinate in device space (x',y') to user space (x,y) according to the inverse of the [CTM] or a supplied matrix operand. The standard idtransform operator specifies a distance transformation from device space to user space according to the inverse of the [CTM] or a supplied matrix operand.

Figure 22:
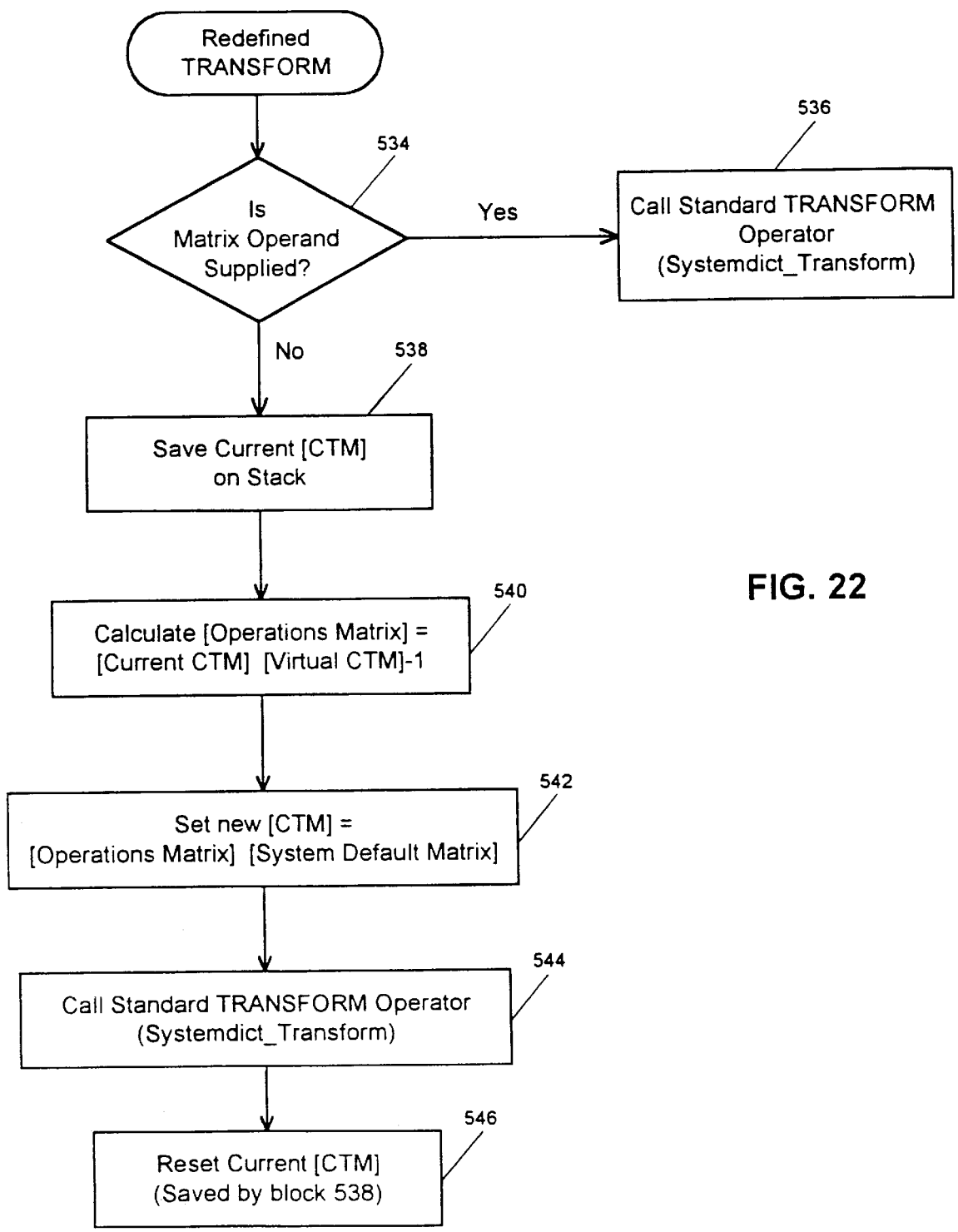
FIG. 22 is a flowchart illustrating the program steps implemented by the redefined PostScript® transform operators according to the imposition-on-the-fly procedures.

FIG. 22 illustrates the program steps implemented by the redefined transform operator. The other transform operators are redefined in the same way. A decision-making block 534 first determines whether a matrix operand was supplied to the transform operator. If a matrix operand was supplied, a block 536 simply calls the standard transform operator (now renamed "systemdict_transform") to perform the transformation according to the supplied matrix. (For the other transform operators, the block 536 calls systemdict_dtransform, systemdict_itransform or systemdict_idtransform).

Alternatively, if the block 534 determines that a matrix operand was not supplied, a block 538 first saves a copy of the current [CTM] in the graphics state on the Operands Stack.

As explained previously, the current [CTM] can be considered the result of the concatenating the virtual [CTM] (saved in DefaultMatrix) with an operations matrix. A block 540 thus calculates the operations matrix by concatenating the current [CTM] with the inverse of the virtual [CTM].

Next, a block 542 sets a new [CTM] equal to the operations matrix concatenated with the system default matrix. The new [CTM] is now equal to what the [CTM] would have been if the setvirtualdevice and imposition procedures were not implemented.

A block 544 then calls the standard transform operator to perform the transformation from user to device space according to the new [CTM]. (Again, for the other transform operators, the block 544 calls the standard dtransform, itransform, or idtransform operator).

Lastly, a block 546 resets the [CTM] equal to the current [CTM] saved on the Operands Stack by the block 538.

The PostScript® transform operators may be redefined by the following code:

```
/transform {
    impositiondict begin
    dup type /arraytype eq {
        systemdict_transform       % or systemdict_dtransform
                                   % or
                                   %    systemdict_itransform
                % or systemdict idtransform
    } {
    Matrix systemdict_currentmatrix
    dup 4 1 roll
    DefaultMatrix
    Matrix2 invertmatrix
    Matrix3 concatmatrix
    Matrix2 defaultmatrix
    Matrix4 concatmatrix
    systemdict_setmatrix
    systemdict_transform       % or
                               %    systemdict_dtransform
                % or systemdict_itransform
                % or systemdict idtransform
    3 -1 roll systemdict_setmatrix
    } ifelse
    end
} bind def
```

The Redefined Nulldevice Operator

The standard Postscript® nulldevice operator installs a "null device" as the current output device. The standard PostScript® nulldevice operator produces no physical output and has no associated raster memory. However, any graphics or font operations executed will be saved in the current graphics state. The PostScript® nulldevice operator also sets the [CTM] to an identity matrix ([1 0 0 1 0 0]) and establishes the clipping path as a single point at the origin.

The standard PostScript® nulldevice operator, however, is not suitable for use with this invention because is not a page device operator and, therefore, has no EndPage and BeginPage procedures associated with it. Thus, the nulldevice operator is redefined to set the [CTM] to the identity matrix and establish a one point clipping path without altering the current page device. The nulldevice operator may be redefined as follows:

```
/nulldevice {
    impositiondict /Identity get
    systemdict_setmatrix
    newpath
    clip
} bind def
```

The Redefined Copypage Operator

Under normal operation, the standard PostScript® copypage operator transmits one copy of the current page to the demand printer without erasing the current page or changing the graphics state. Like the showpage operator, the operation of the copypage operator depends on the EndPage and BeginPage procedures, which are redefined by the present invention. In the present invention, the EndPage and BeginPage procedures are redefined so that the copypage operator has no affect. The EndPage and BeginPage procedures could be redefined to check for the copypage operator (by comparing the reason code to one). Alternatively, the operation of the copypage operator can simply be nulled by the following code:

```
\copypage { } def
```

The EnableVirtualDevice Procedure

Figure 23:
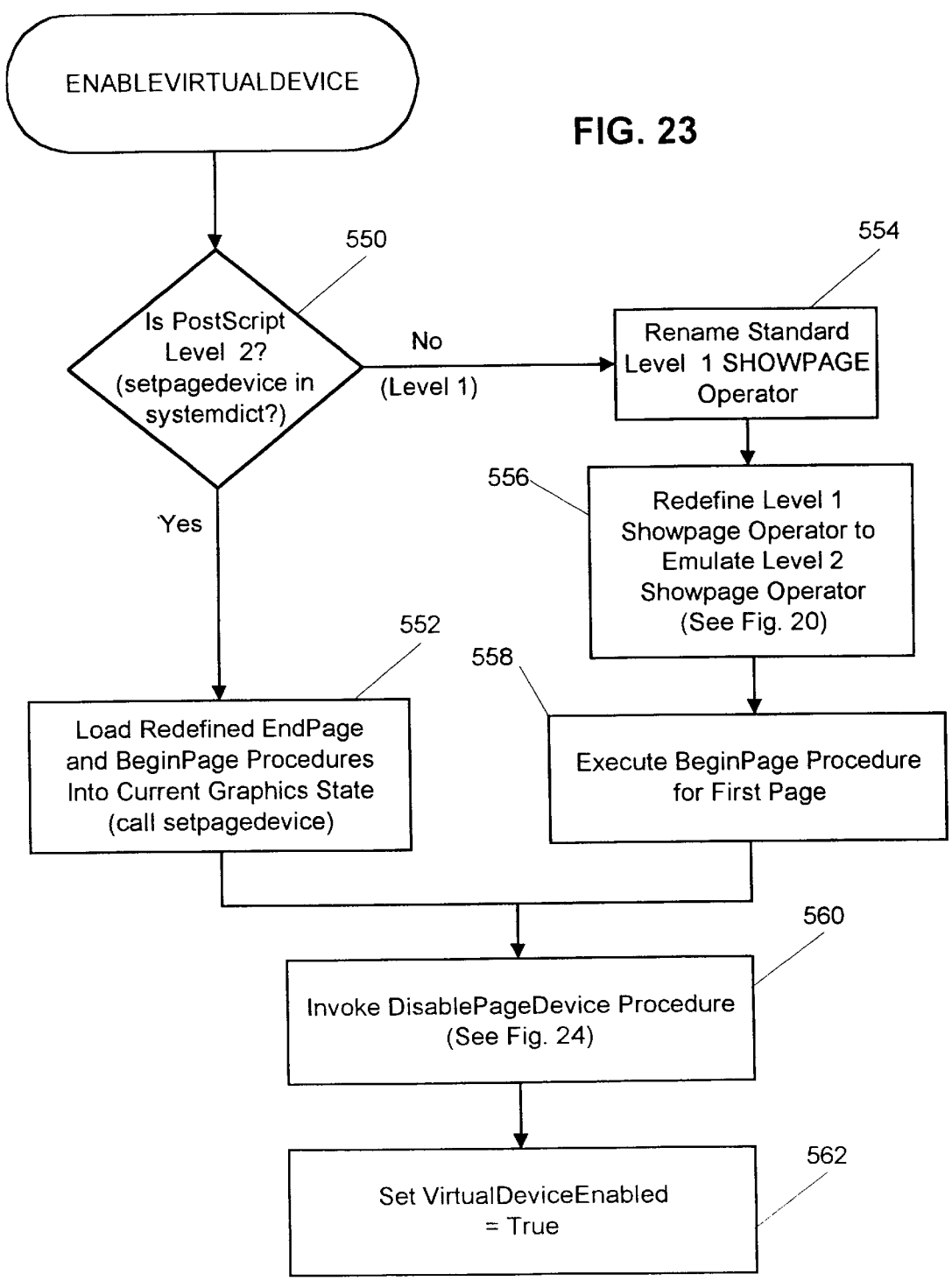
FIG. 23 is a flowchart illustrating the program steps implemented by the EnableVirtualDevice procedure according to the imposition-on-the-fly procedures.

The EnableVirtualDevice procedure, which is called by the ImposeJob procedure at the end of the instruction set, sets up the showpage operator to support virtual devices. FIG. 23 is a flowchart illustrating the program steps implemented by the EnableVirtualDevice procedure. A block 550 first determines whether the RIP 82 implements level 1 or level 2 PostScript® by determining whether the PostScript® setpagedevice operator is defined in the systemdict dictionary. If the RIP 82 implements the level 2 Postscript® language, a block 552 loads the redefined EndPage and BeginPage procedures into the current graphics state for the demand printer 84 by calling the setpagedevice operator. As described in detail below, the EndPage and BeginPage procedures are redefined to define the current output device as a virtual device for pages to be rendered or as a scaled-down virtual device for non-rendered pages.

The blocks 550 and 552 of the EnableVirtualDevice procedure may be implemented by the following code:

```
/EnableVirtualDevice {
    /setpagedevice where {        % level 2
        pop
        2 dict begin
        /EndPage impositiondict /EndPage get def
        /BeginPage impositiondict /BeginPage get
        def
        currentdict end
        setpagedevice
    }
```

Alternatively, if the block 550 determines that the RIP 82 implements level 1 PostScript®, a block 554 renames the standard level 1 showpage operator and a block 556 redefines the showpage operator to emulate the operation of the level 2 showpage operator as illustrated in FIG. 20. Next, a block 558 executes the BeginPage procedure for the first page (page "0") in the merged PostScript® file 450. (This was done automatically in the level 2 implementation by the block 552 by calling the setpagedevice operator).

The blocks 554–558 may be implemented by the following code:

```
{   impositiondict /systemdict showpage      % rename
    systemdict /showpage get put             % showpage
    /showpage {                              % emulate
    impositiondict begin                     % level 2
        Pagecount 0 EndPage
        systemdict_showpage
    } if
    systemdict_initgraphics
    /Pagecount PageCount 1 add def
    PageCount /BeginPage load end exec
    } def
    0 impositiondict /BeginPage get exec
} ifelse
```

Next, a block 560 invokes a procedure (called, for example, "DisablePageDevice") which was previously stored in the impositiondict dictionary. The DisablePageDevice procedure redefines the PostScript® setpagedevice operator and all other compatibility operators that call the setpagedevice operator. Disabling these operators ensures that the raster memory 452 (which may contain the raster descriptions of previously processed pages to be rendered on the flat 456) is not erased by the setpagedevice operator. The DisablePageDevice procedure is described in detail below in connection with FIG. 24.

After the block 560 invokes the DisablePageDevice procedure described above, a block 562 sets the boolean variable called "VirtualDeviceEnabled" to true to indicate that the procedure has been completed and the showpage operator is set up to support virtual devices.

The blocks 560 and 562 of the EnableVirtualDevice procedure may be implemented by the following code:

```
impositiondict \DisablePageDevice get exec impositiondict \VirtualDeviceEnabled true put } bind def
```

The DisablePageDevice Procedure

Figure 24:
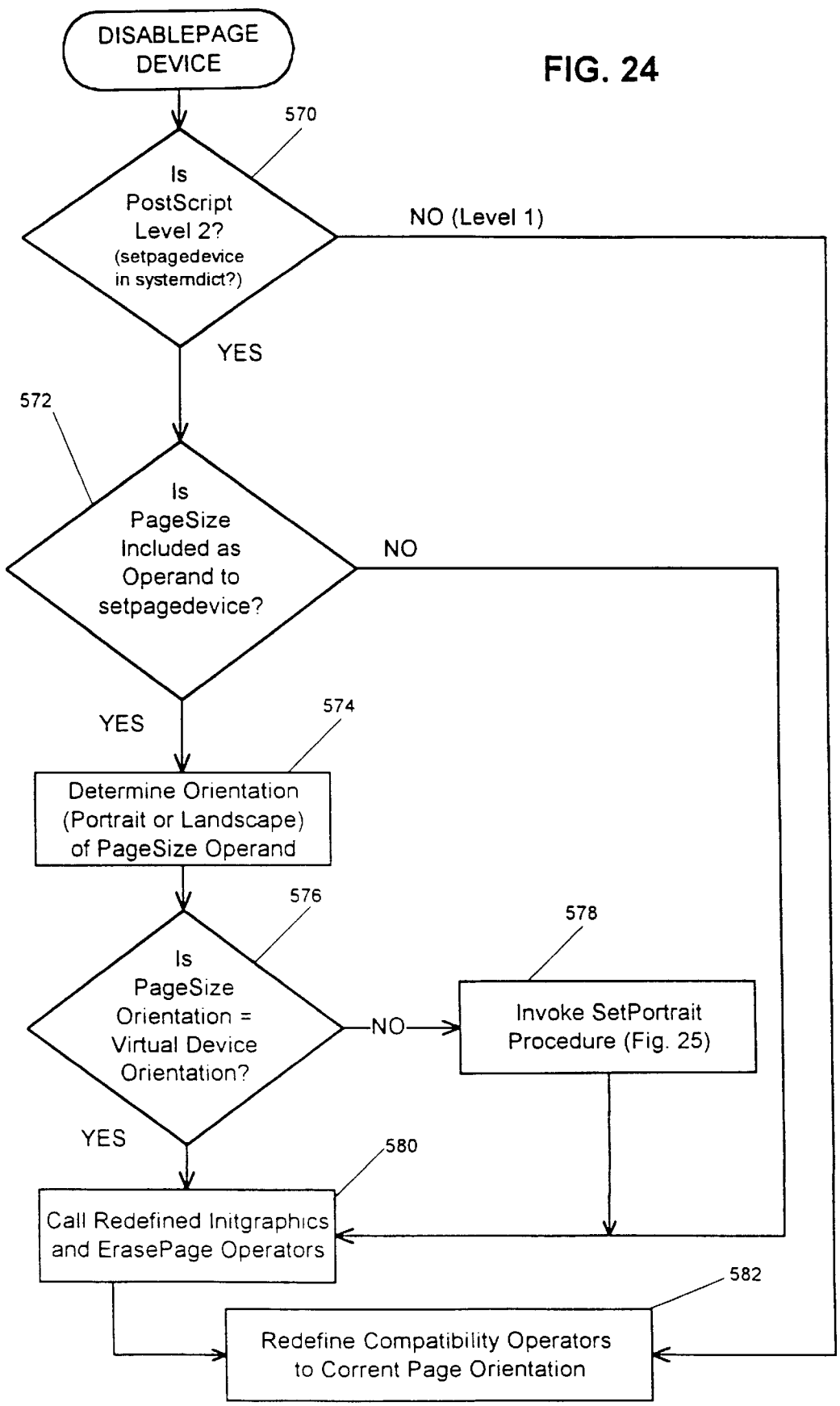
FIG. 24 is a flowchart illustrating the program steps implemented by the DisablePageDevice procedure according to the imposition-on-the-fly procedures.

FIG. 24 is a flowchart illustrating the program steps implemented by the DisablePageDevice procedure, which is invoked by the block 560 of the EnableVirtualDevice procedure. Because setpagedevice is a level 2 operator, a block 570 determines whether the RIP 82 implements the level 1 or the level 2 PostScript® language by determining whether the setpagedevice operator is defined in the systemdict dictionary. If the RIP 82 implements the level 2 PostScript® language, blocks 572–580 redefine the setpagedevice operator to correct the page orientation of the output device, if necessary.

During normal level 2 operation, a dictionary operand containing input media selection entries is provided to the Postscript® setpagedevice operator and the setpagedevice operator establishes the current output device according to the information contained in the current graphics state and the dictionary operand. The dictionary operand may contain, for example, an entry for PageSize, which is an array of two numbers indicating the width and height of the current page. Thus, a call to the setpagedevice operator may alter the page size, which is critical in setting up the virtual device.

The block 572 of the redefined setpagedevice operator first determines whether an entry for PageSize was included in the dictionary operand to the setpagedevice operator. If so, the block 574 then determines whether the PageSize specified in the entry is portrait or landscape orientation by comparing the page width to the page height supplied in the PageSize entry. (As explained above, for purposes of the invention, if the page width is less than the page height, the orientation is referred to as portrait and the variable Portrait is set to true. If the page width is greater than the page height, the orientation is referred to as landscape and the variable Portrait is set to false).

A block 576 then compares the page orientation of the PageSize entry (determined by block 574) to the page orientation of the virtual device (stored in the variable Portrait). If they are not the same, a block 578 invokes a procedure called, for example, "SetPortrait," which changes the orientation of the virtual device from portrait to landscape, or vice versa. (The SetPortrait Procedure is described in detail below). Next, for consistency with the normal operation of the setpagedevice operator, a block 580 calls the redefined initgraphics and erasepage operators. Alternatively, if the block 576 determines that the page orientation of the PageSize entry is the same as the virtual device, or if the block 572 determines that PageSize was not included in the dictionary operand to the setpagedevice operator, the program skips directly to the block 580, which completes the redefinition of the setpagedevice operator.

The blocks 570–580 of the DisablePageDevice procedure may be implemented by the following code:

```
/Disable/PageDevice {
    /setpagedevice where {
        pop
        userdict
        /setpagedevice {
            dup /PageSize known {
                /PageSize get
                impositiondict begin
                aload pop
                lt Portrait ne {
                    SetPortrait
                } if
                end
            } {
                pop
            } ifelse
            initgraphics
            erasepage
        } put
    }if
```

After the block 580 calls the redefined initgraphics and erasepage operators, or if the block 570 determines that the RIP 82 implements level 1 PostScript®, a block 582 redefines the compatibility operators, which are defined in either the statusdict dictionary or the userdict dictionary, which call the setpagedevice operator or perform similar level 1 operations.

For compatibility operators that change the page orientation, the block 582 redefines the operator to set the orientation of the virtual device equal to the orientation of the page specified by the operator and to initialize the virtual device. These operators may be redefined by a utility routine called, for example, "SetPageSize," which is similar to the blocks 576–580 described above. The SetPageSize routine may be implemented by the following code:

```
/SetPageSize {
    lt Portrait ne {        % correct orientation of virtual
        SetPortrait         %    device, if necessary
    } if
    initgraphics            % initialize virtual device
    erasepage               %    (emulate setpagedevice)
} bind def
```

For compatibility operators that do not affect the page orientation, the block 582 simply disables or nulls the operators. The block 582 of the DisablePageDevice procedure, which redefines or disables the compatibility operators, may be implemented by the following code:

```
statusdict begin            % operators in statusdict
/a3tray {impositiondict begin 842 792 SetPageSize end}
def
/a4tray {impositiondict begin 595 842 SetPageSize end}
def
/ledgertray {impositiondict begin 1224 792 SetPageSize
end} def
/setpage {pop pop pop} def
/setpagestackorder {pop} def
/setturnble {pop} def
/11 x 17tray { impositiondict begin 792 1224 SetPageSize
end} def
/b5tray {impositiondict begin 516 729 SetPageSize end}
def
/legaltray {impositiondict begin 612 1008 SetPageSize
end} def
/setdefaulttimeouts {pop} def
/setduplexmode {pop} def
/setmargins {pop pop} def
/setpagemargin {pop} def
/lettertray {impositiondict begin 612 792 SetPageSize
end} def
/setmirrorprint {pop} def
/setpageparams {pop pop pop pop} def
/setresolution {pop} def
end
                            % operators in userdict
/a3 {impositiondict begin 842 1191 SetPageSize end} def
/b5 {impositiondict begin 516 729 SetPageSize end} def
/letter {impositiondict begin 612 792 SetPageSize end}
def
/lettersmall {impositiondict begin 612 792 SetPageSize
end} def
/legal {impositiondict begin 612 1008 SetPageSize end}
def
/ledger {impositiondict begin 1224 792 SetPageSize end}
def
/11 x 17 {impositiondict begin 792 1224 SetPageSize end}
def
/a4 {impositiondict begin 595 842 SetPageSize end} def
/a4small {impositiondict begin 595 842 SetPageSize end}
def
/note { } def
```

The SetPortrait Procedure

Figure 25:
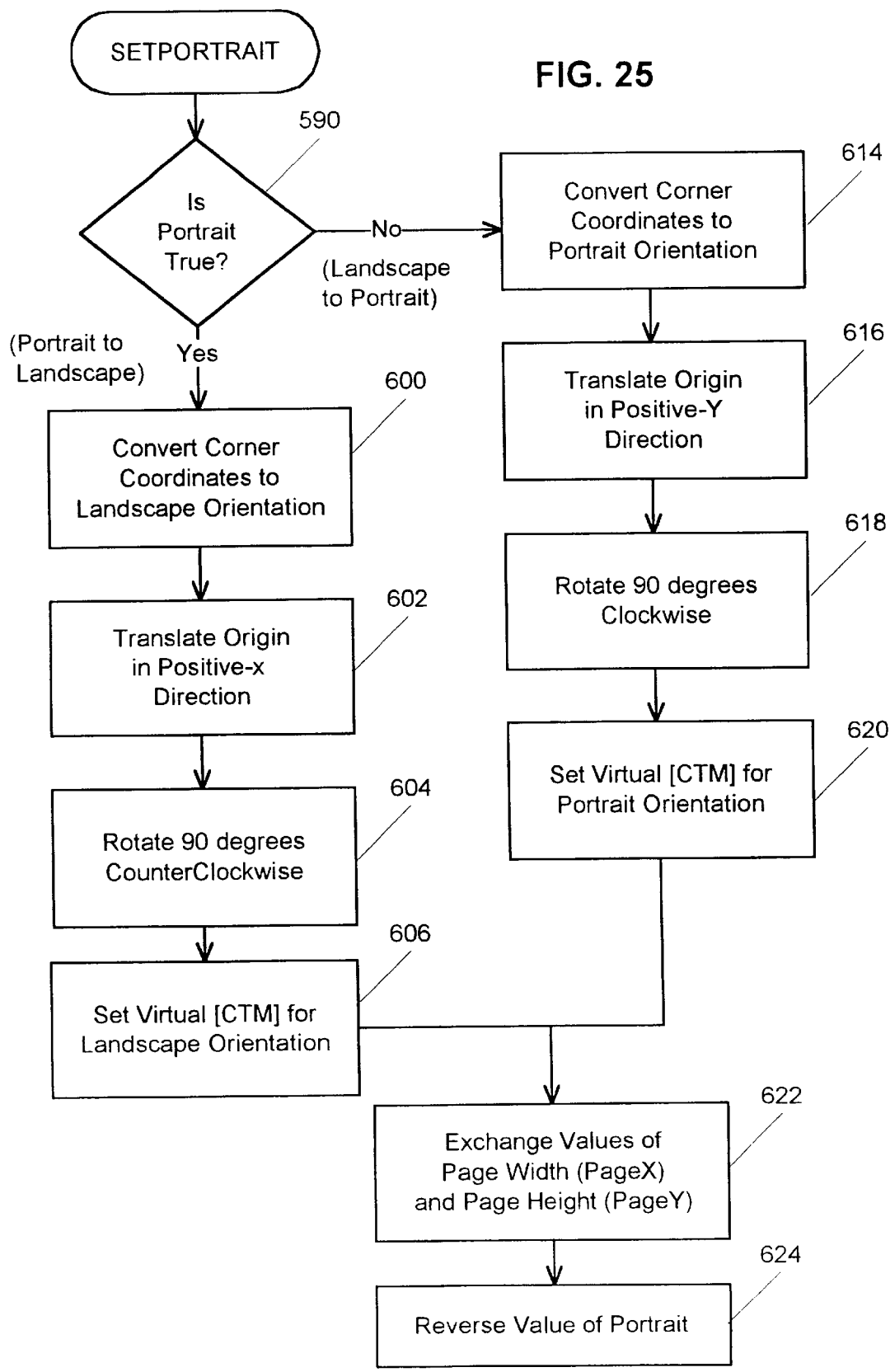
FIG. 25 is a flowchart illustrating the program steps implemented by the SetPortrait procedure according to the imposition-on-the-fly procedures.

The SetPortrait procedure, which is invoked by the block 578 of the DisablePageDevice procedure, changes the orientation of the virtual device from portrait to landscape or vice versa. FIG. 25 illustrates the program steps implemented by the SetPortrait procedure. A block 590 first determines whether the variable Portrait is true (indicating the page is portrait) or false (indicating the page is landscape).

Figure 26A:
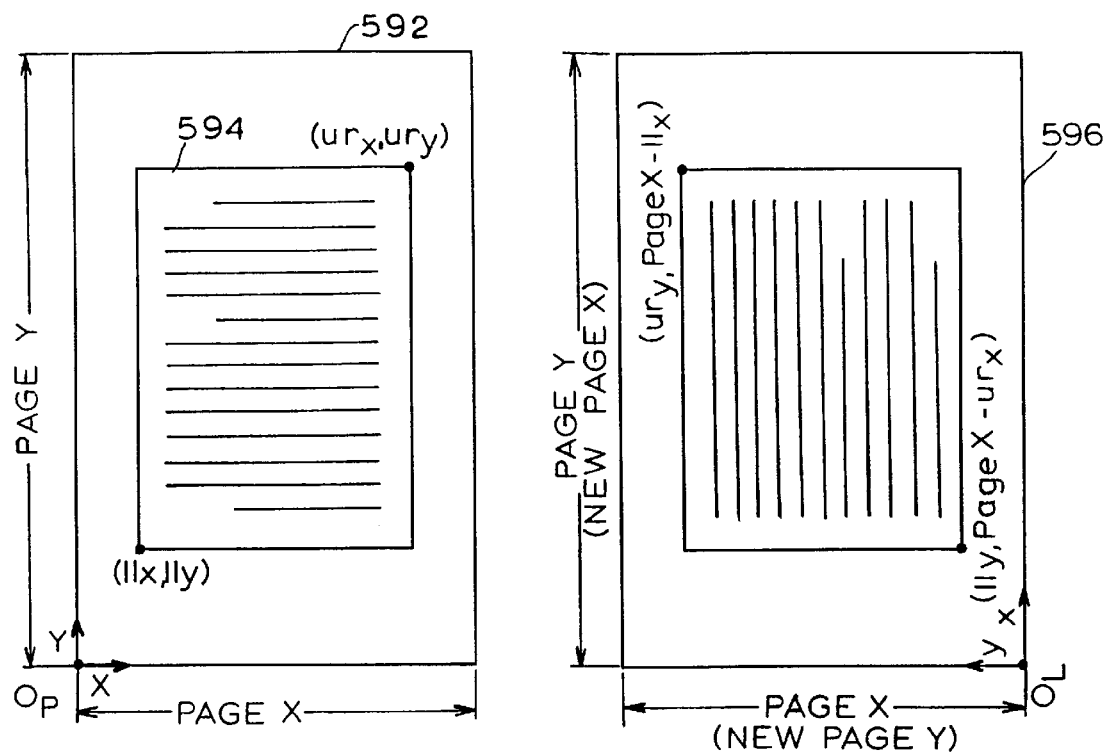
FIG. 26A is a diagram illustrating the conversion of a portrait-oriented page to a landscape-oriented page according to the SetPortrait procedure of FIG. 24.

If Portrait is true, the orientation of the device must be converted from portrait to landscape. As illustrated in FIG. 26A, a portrait-orientated page 592 is represented in a Cartesian coordinate system with an origin at point $O_P$. The portrait-orientated page 592 has a width PageX and a height PageY. The rendering area on the page 592 is bordered by a clipping path 594, which may be defined by the coordinates of its lower-left corner (llx, lly) and the coordinates of its upper-right corner (urx, ury).

The portrait-oriented page 592 is converted to a landscape-oriented page 596 by translating the origin $O_P$ of the page 592 in the positive x-direction and then rotating the coordinate system 90 degrees counterclockwise, resulting in the landscape-orientated coordinate system of the page 596 with an origin $O_L$. Although the device space coordinates of the clipping path 594 are unchanged, the clipping path 594 must be redefined with respect to the new landscape coordinate system.

Referring again to FIG. 25, after the block 590 determines that the orientation of the device must be converted from portrait to landscape, a block 600 redefines the corner coordinate variables as follows:

| Portrait Coordinate | Landscape Coordinate |
|---|---|
| ClipllX | ClipllY |
| ClipllY | PageX – ClipurX |
| ClipurX | ClipurY |
| ClipurY | PageX – ClipllY |

Next, blocks 602 and 604 create matrices which will translate the origin $O_P$ by the page width (PageX) in the positive x-direction and then rotate the portrait coordinate system 90 degrees counterclockwise about the origin $O_P$. A block 606 then concatenates the matrices with the current virtual [CTM] to create the new virtual [CTM], which specifies the device in landscape orientation.

The blocks 590 and 600–606 of the SetPortrait procedure may be implemented by the following code:

```
/SetPortrait {
    Portrait {
        /tmp ClipllX def
        /ClipllY PageX ClipurX sub def
        /ClipurX ClipurY def
        /ClipurY PageX tmp sub def
        90 Matrix rotate
        PageX 0 Matrix2 translate
        DefaultMatrix
        Matrix3 concatmatrix
        DefaultMatrix concatmatrix
        pop
    }
```

Figure 26B:
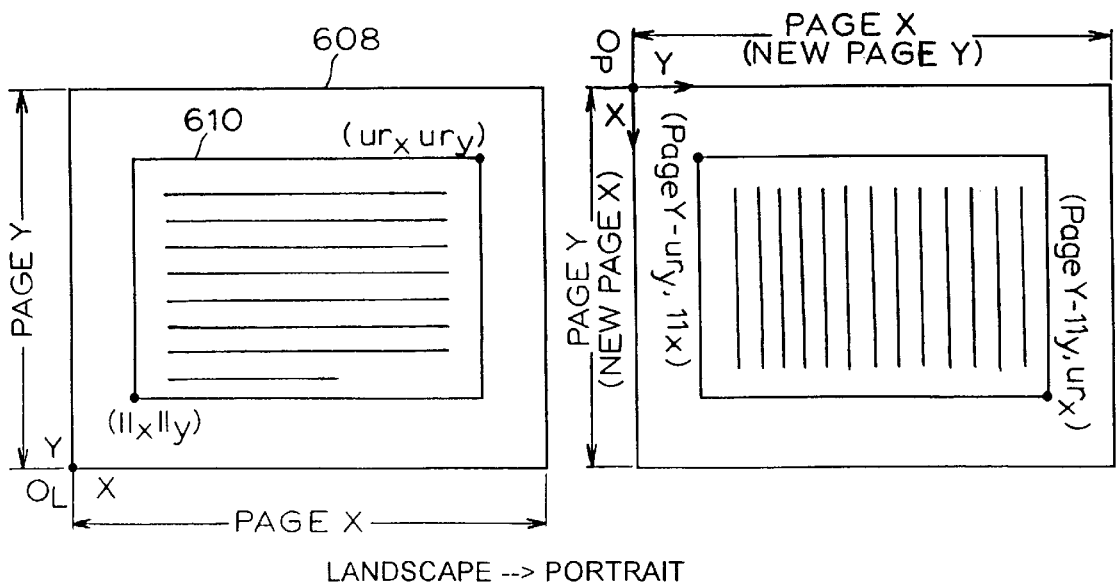
FIG. 26B is a diagram illustrating the conversion of a landscape-oriented page to a portrait-oriented page according to the SetPortrait procedure of FIG. 24.

If the block 590 determines that the variable Portrait is false, the orientation of the device must be converted from landscape to portrait. Referring also to FIG. 26B, a landscape-oriented page 608 is specified in a Cartesian coordinate system with an origin $O_L$. The rendered area on the page 608 is bordered by a clipping path 610 defined by the coordinates of its lower-left and upper-right corners. The landscape-oriented page 608 is converted to a portrait-oriented page 612 by translating the origin $O_L$ in the positive y-direction and then rotating the coordinate system 90 degrees clockwise about the origin $O_L$. This generates a portrait-oriented coordinate system with an origin $O_P$.

Similar to the above-described portrait to landscape procedure, a block 614 first redefines the corner coordinates of the clipping path as follows:

| Landscape Coordinate | Portrait Coordinate |
|---|---|
| ClipllY | ClipllX |
| ClipllX | PageY – ClipurY |
| ClipurY | ClipurX |
| ClipurX | PageY – ClipllY |

Next, blocks 616 and 618 create matrices to translate the origin $O_L$ in the positive y-direction and then rotate the origin $O_L$ 90 degrees clockwise. A block 620 then concatenates the matrices with the current virtual [CTM] to generate the new virtual [CTM], which specifies the device in a portrait coordinate system.

The blocks 614–620 of the SetPortrait procedure, which convert from landscape to portrait orientation, may be implemented by the following code:

```
    /tmp ClipllY def
    /ClipllY ClipllX def
    /ClipllX PageY ClipurY sub def
    /ClipurY ClipurX def
    /ClipurX PageY tmp sub def
    -90 Matrix rotate
    0 PageY Matrix2 translate
    DefaultMatrix
    Matrix3 concatmatrix
    DefaultMatrix concatmatrix
    pop
} ifelse
```

After the clipping path corners are redefined and the new virtual [CTM] is generated, a block 622 exchanges the values of PageX and PageY. Thus, for example, when converting from portrait to landscape, the portrait page width becomes the landscape page height and the portrait page height becomes the landscape page width. Lastly, a block 624 changes the value of the variable Portrait. Thus, if Portrait was initially true (indicating portrait orientation), it is set to false to indicate that the device is now in landscape orientation. Conversely, if Portrait was initially false (indicating landscape orientation), it is set to true to indicate that the device is now in portrait orientation.

The blocks 622–624 may be implemented by the following code:

```
    /tmp PageX def
    /PageX PageY def
    /PageY tmp def
    /Portrait Portrait not def
} bind def
```

The SetPortrait procedure described above comprises an optional part of the present invention and is not necessary for use with Postscript® applications which do not alter the page orientation.

The Setvirtualdevice Procedure

The setvirtualdevice procedure establishes the current transformation matrix ([CTM]), the clipping path, and the page size such that the current output device is specified as a virtual device. The virtual device is defined to be the size of the next page to be rendered, with the origin and page boundary at the position on the flat 456 where the page is to be rendered.

The setvirtualdevice procedure requires the following three "operands," which are provided in the instruction set list:

1) the imposition procedure, which includes the scaling, translation and rotation factors—[scale_x scale_y translate_x translate_y rotate];

2) the user space coordinates of the lower-left and upper-right corners of the rendering area of the page to be imposed, which will be used to generate a clipping path around the border of the virtual page in the raster memory 22—[clip_ll_x clip_ll_y clip_ur_x clip_ur_y]; and 3) the page width and page length—[page_size_x page_size_y].

Figure 27:
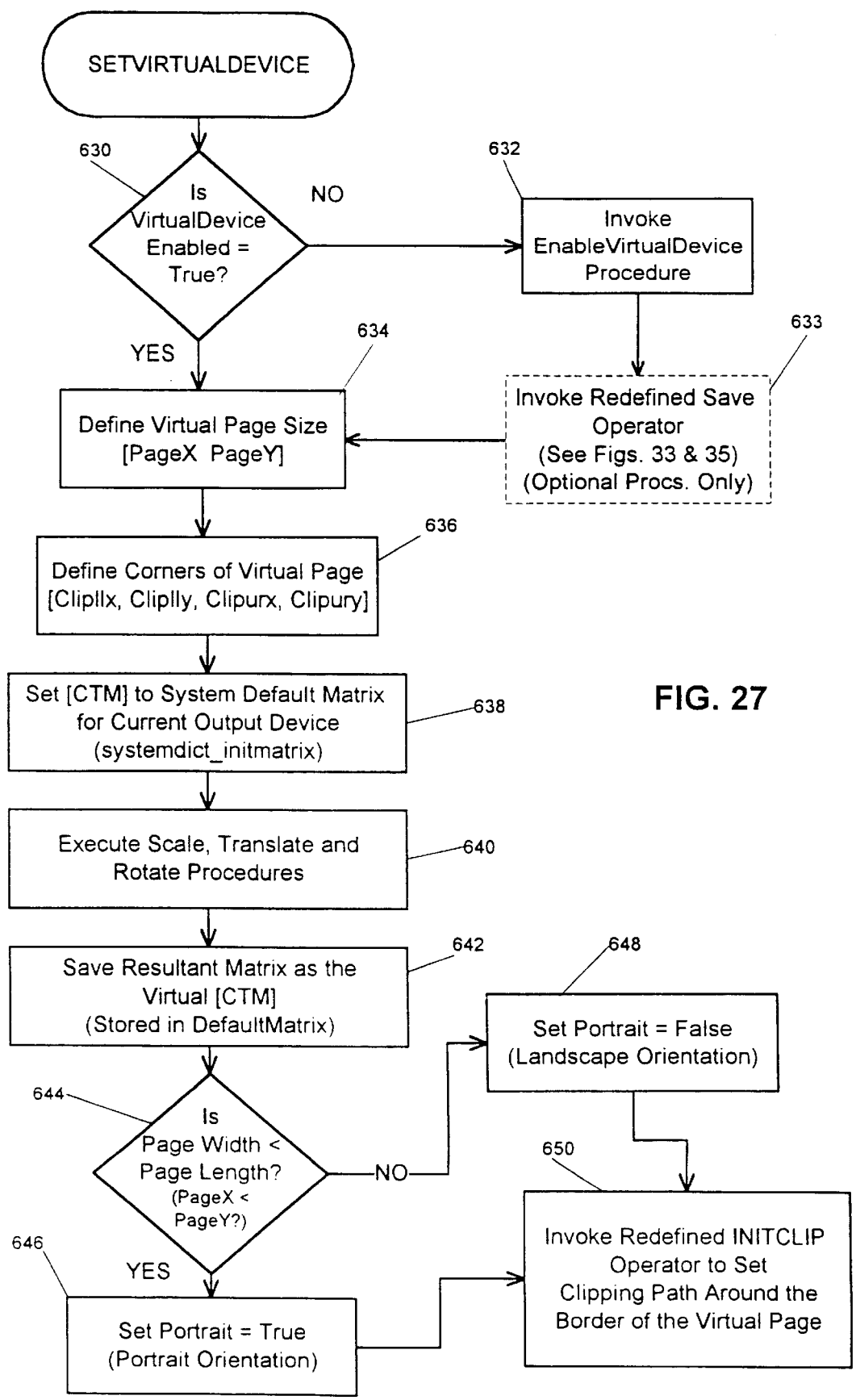
FIG. 27 is a flowchart illustrating the program steps implemented by the setvirtualdevice procedure according to the imposition-on-the-fly procedures.

FIG. 27 illustrates the program steps implemented by the setvirtualdevice procedure. A block 630 first determines whether the variable VirtualDeviceEnabled is set to true, indicating that the EnableVirtualDevice procedure has been executed and the showpage operator is set up to support virtual devices. If the block 630 determines that VirtualDeviceEnabled is false, a block 633 invokes the EnableVirtualDevice procedure. (A block 6333, which is implemented only in connection with the optional imposition-on-the-fly-procedures, will be described below.)

Next, a block 634 defines the variables PageX and PageY as the width and height of the virtual device, respectively. Similarly, a block 636 defines the variables ClipllX and ClipllY as the x and y coordinates of the lower-left corner of the virtual device and the variables ClipurX and ClipurY as the x and y coordinates of the upper-right corner of the virtual device.

A block 638 then calls the standard PostScript® initmatrix operator (renamed "systemdict_initmatrix"), which sets the [CTM] to the system default matrix for the current output device. A block 640 then executes the scale, translate and rotate operators with the operands to the setvirtualdevice procedure. These scale, translate and rotate operations alter the system default matrix to specify the virtual [CTM]. A block 642 saves the resultant virtual [CTM] in the variable DefaultMatrix. The virtual [CTM] specifies that the origin of the virtual device is at the position on the flat where the next page is to be rendered on the flat 456.

A decision-making block 644 then compares the page width (PageX) to the page height (PageY). If PageX is less than PageY, a block 646 sets the variable Portrait to true (indicating portrait orientation). Alternatively, if PageX is greater than PageY, a block 648 sets the variable Portrait to false (indicating landscape orientation).

Next, a block 650 calls the redefined initclip operator to set the clipping path around the border of the virtual page. (See FIG. 21). The setvirtualdevice procedure may be implemented by the following code:

```
/setvirtualdevice {
   impositiondict begin
   VirtualDeviceEnabled not { EnableVirtualDevice } if
   aload pop
   /PageY exch def                  % set page size
   /PageX exch def
   aload pop pop
   /ClipurY exch def                % set clipping path corners
   /ClipurX exch def
   /ClipllY exch def
   /ClipllX exch def
   systemdict_initmatrix
   aload pop
   5 -2 roll scale                  % execute scale, translate
   3 -2 roll translate              % and rotate
   rotate
   DefaultMatrix systemdict_currentmatrix pop  % set
                                               % [CTM]
   /Portrait PageX PageY lt def
   initclip                         % set clipping path
   end
} bind def
```

The ImposeJob Procedure

The ImposeJob procedure is invoked after references to the merged PostScript® files 450 and the instruction set have been placed on the Operands stack. Further, the above-described procedures and variables have been loaded into the impositiondict dictionary.

Figure 28:
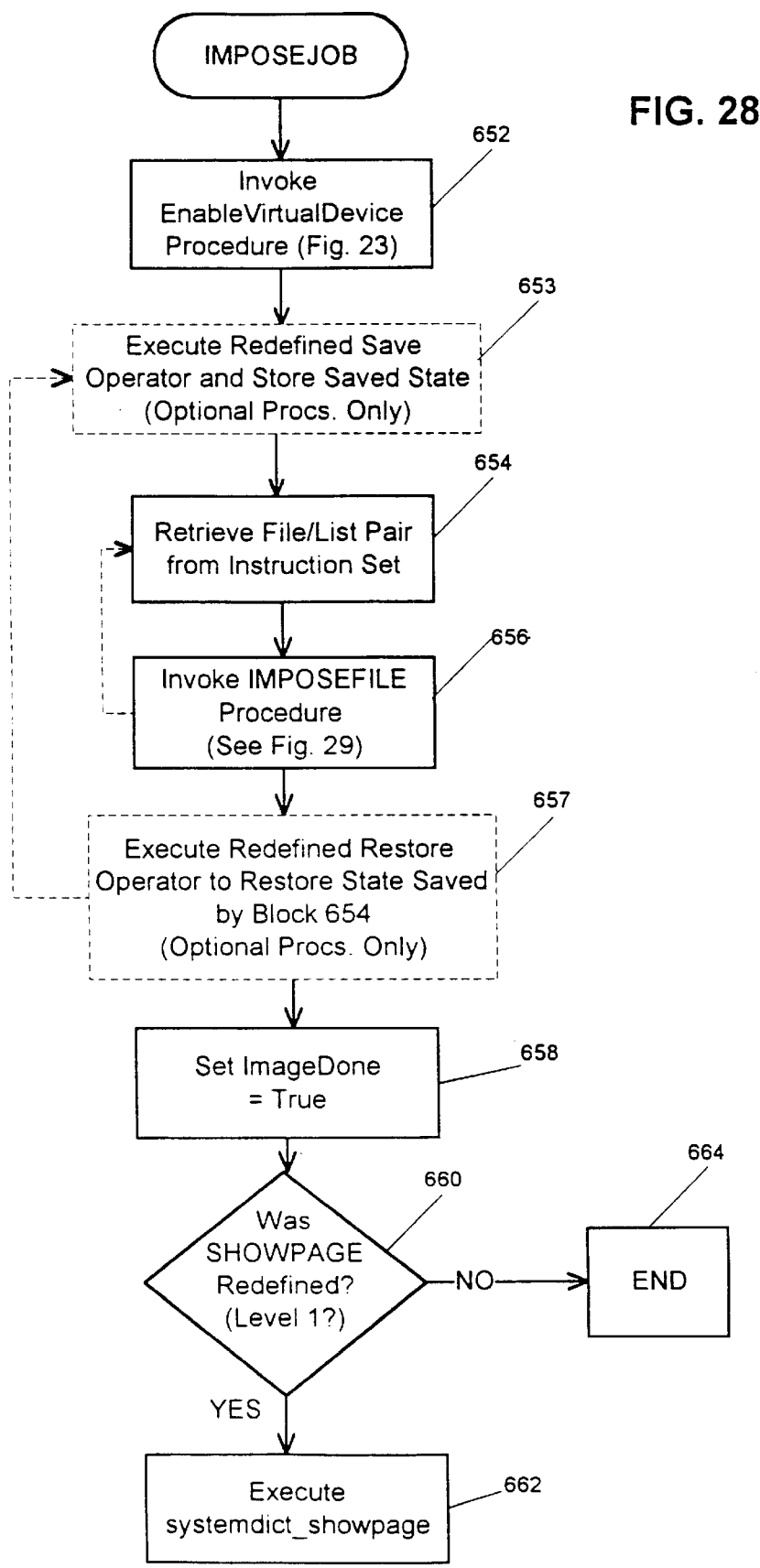
FIG. 28 is a flowchart illustrating the program steps implemented by the Imposejob procedure according to the imposition-on-the-fly procedures.

FIG. 28 is a flowchart illustrating the program steps implemented by the ImposeJob procedure according to the imposition-on-the-fly procedures of the present invention. A block 652 invokes the EnableVirtualDevice procedure, described above in connection with FIG. 23, to set up the showpage operator to support virtual devices.

A block 654 then retrieves the first file/list pair (containing the name of the merged PostScript® file and the corresponding entry list with the user procedures, page numbers and operands for the setvirtualdevice procedures for the current flat 456) from the instruction set. The file/list pair is stored in an array that was placed on the Operands Stack prior to calling the ImposeJob procedure.

For each file/list pair, a block 656 invokes the ImposeFile procedure, described below, which retrieves each entry from the entry list and determines which pages described in the merged PostScript® file 450 should be rendered on the flat 456. Assuming more than one file/list pair is contained in the array, the blocks 654 and 656 are implemented in a loop which individually retrieves each file/list pair from the array and invokes the ImposeFile procedure to process each file/list pair.

After every file/list pair from the instruction set has been processed by the ImposeFile procedure, a block 658 sets the boolean variable ImageDone to true. ImageDone will be used to instruct the RIP 82 that the imposition job is complete and the flat 456 can be ejected. The value of ImageDone at this point could be determined by a global variable. ImageDone could also be set to true in the user procedure in the last entry of the last instruction set list.

Next, a block 660 determines whether the showpage operator was redefined to emulate level 2. If so, a block 662 executes the standard level 1 showpage operator (renamed "systemdict_showpage") in order to transmit the contents of the raster memory 452 to the demand printer 84 for physical rendering of the flat 456. In the level 2 implementation, the flat 456 is automatically rendered by the showpage operator when the redefined EndPage procedure returns a "true." (See FIG. 20). If the showpage operator was not redefined, a block 664 ends the program. The blocks 652–662 of the ImposeJob procedure may be implemented by the following code:

```
/ImposeJob          % Impose pages from each input file
{
   impositiondict /EnableVirtualDevice get exec
   {                         % Call ImposeFile for
      aload pop pop          % each file in instruction
                             % set
      impositiondict /ImposeFile get
      exec
```

```
    } forall
    impositiondict /ImageDone true put
    impositiondict /systemdict_showpage
    known {                 % Did we redefine showpage
        impositiondict /systemdict_showpage
        get exec            % If yes, execute it.
        } if
} def
```

(Blocks 653 and 657 of the Imposejob procedure, which are implemented only in connection with the optional imposition-on-the-fly of the invention, will be described below.)

The ImposeFile Procedure

Figure 29:
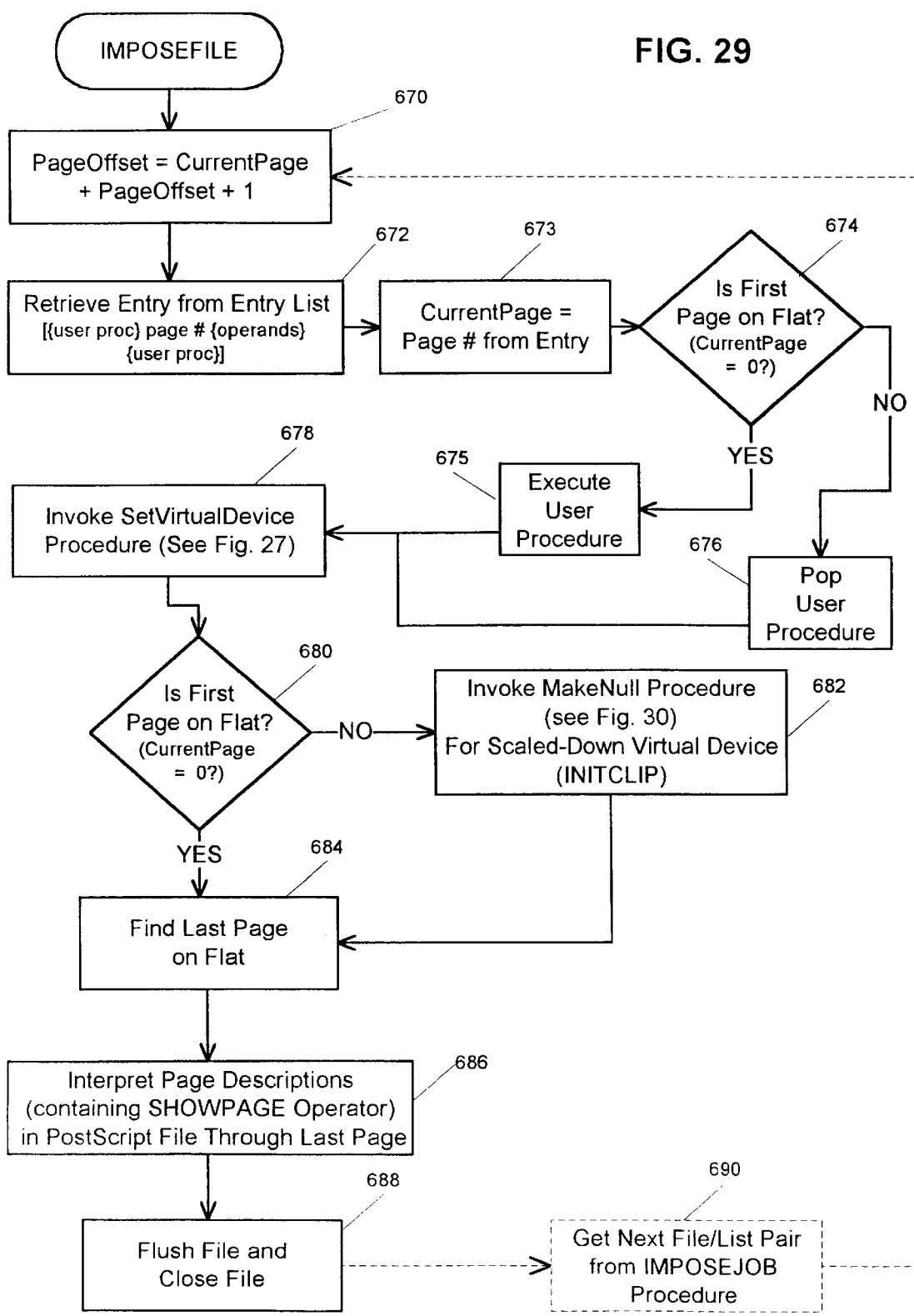
FIG. 29 is a flowchart illustrating the program steps implemented by the ImposeFile procedure according to the imposition-on-the-fly procedures.

FIG. 29 illustrates the program steps implemented by the ImposeFile procedure of the imposition-on-the-fly procedures of the invention. When the ImposeFile procedure is invoked, the Imposejob procedure has placed a file/list pair from the instruction set on the Operands stack. The file/list pair contains a list of entries (the "PageList"), wherein each entry specifies:

1) a first user procedure;

2) the number of the page to rendered on the flat 456;

3) the operands to the setvirtualdevice procedure (which generates the virtual [CTM] for properly positioning the page on the flat 456); and 4) a second user procedure (specifying offsets).

A block 670 sets the variable PageOffset=CurrentPage+PageOffset+1. CurrentPage (representing the number of the next page in the current merged Postscript® file 450 that is to be rendered on the flat 456) is initially 0 and PageOffset (representing the cumulative number of pages from previous files processed) is initially −1. Therefore, on the first pass of the ImposeFile procedure, PageOffset is equal to 0 (indicating that no previous files have been processed). A block 672 then uses the pointer CurrentIndex to retrieve the first entry from the entry list received from the ImposeJob procedure. A block 673 then retrieves the page number from the entry and sets CurrentPage equal to its value. Thus, CurrentPage now specifies the number of the first page in the current merged PostScript® file that should be rendered on the flat.

Next, a decision-making block 674 determines whether the first page in the current PostScript® file (page number 0) should be rendered on the flat by comparing CurrentPage to 0. If CurrentPage is equal to 0, the first page in the merged PostScript® file 450 should be imposed and rendered on the flat, and a block 675 executes the first user procedure contained in the current entry retrieved by the block 672. Alternatively, if the block 674 determines that the first page is not on the flat, a block 676 pops the first user procedure from the retrieved entry from the stack.

After the block 675 has executed the user procedure or after the block 676 pops the user procedure, a block 678 executes the setvirtualdevice procedure, which was described in detail above in connection with FIG. 25. The setvirtualdevice procedure sets the virtual [CTM] and the clipping path according to the operands included in the retrieved entry. The blocks 670–678 of the ImposeFile procedure may be implemented as follows:

```
/ImposeFile {
    impositiondict begin
    /PageOffset CurrentPage PageOffset add 1 add def
    /PageList exch def
    /CurrentIndex 0 def
    PageList CurrentIndex get              % get entry
    aload pop pop
    5 -2 roll dup
    /CurrentPage exch def                  % get page number for 1st
                                           % page
    0 eq {                                 % if 1st page is on flat
        exec                               % execute user procedure
        } {
        pop                                % if 1st page is not on
                                           % flat
        } ifelse                           % pop user procedure
    setvirtualdevice                       % call setvirtualdevice
```

Next, a decision-making block 680 determines whether the first page in the current Postscript® file (page number 0) should be rendered on the flat by comparing CurrentPage to 0. If CurrentPage is not equal to zero (i.e. the first page should not be rendered on the flat), a block 682 invokes a procedure called, for example, "MakeNull." The MakeNull procedure, which is described in detail below in connection with FIG. 30, creates a scaled-down version of the virtual device for the next page to be rendered on the flat. The MakeNull procedure will be used to quickly interpret pages included in the merged PostScript® file 450 that will not be rendered on the current flat 456. The block 682 also calls the redefined initclip operator (see FIG. 21).

After the block 682 executes the MakeNull procedure, or, alternatively, if the block 680 determines that CurrentPage is equal to zero (i.e. the first page should be rendered on the flat), a block 684 sets the variable LastPage equal to the page number of the last page in the PostScript® file to be rendered on the flat. The last page is determined by defining LastIndex as the number of entries in the instruction set minus one. The entries are indexed starting with zero (i.e., 0, 1, 2, 3,) such that the last of four entries will be entry number 3. LastIndex is then used to retrieve the page number from the last entry in the entry list, which is stored in the variable LastPage. The block 684 thus determines the number of page descriptions in the current merged Postscript® file 450 that need to be interpreted in order to properly render all of the selected pages on the flat 456.

The blocks 680–684 of the ImposeFile procedure may be implemented by the following code:

```
/CurrentPage 0 ne {                  % if page is not on flat
    MakeNull                         % execute MakeNull
                                     % procedure
    initclip
    } if
/LastIndex PageList length 1 sub def
/LastPage PageList LastIndex get 1 get def
```

A block 686 then opens the current merged Postscript® file 450, if necessary, and defines a file object (i.e. "TheFile") to access the current merged PostScript® file 450. The block 686 then interprets the current merged PostScript® file 450, which contains various page descriptions, including the selected pages to be rendered on the current flat 456. Each page description includes the showpage operator, which will invoke the redefined EndPage and BeginPage procedures of the present invention.

Preferably, the block 686 executes the merged PostScript® file 450 in stopped mode, which dictates that the execution will stop once the last page that needs to be processed for the flat 456 is executed (determined by the value of LastPage). Once execution is complete, a block 688 flushes and closes the current PostScript® file and a block 690 returns to the block 654 of the ImposeJob procedure (FIG. 26) to retrieve the next file/list pair from the instruction set.

The blocks 686–690 of the ImposeFile procedure may be implemented by the following code:

```
dup type 1 string type eq { (r) file } if
dup /TheFile exch def
cvx
end
stopped { count 0 eq dup not
    { pop dup (done with current file) ne } if
    { stop } { pop } ifelse
impositiondict /TheFile get dup flushfile
closefile
} bind def
```

The MakeNull Procedure

The MakeNull Procedure is invoked by the block 682 of the ImposeFile procedure before processing pages that will not be rendered on the current flat 456. The MakeNull Procedure creates a low resolution (scaled-down) replica of the virtual device for the next page to be rendered on the flat. This low resolution virtual device allows for fast processing of the non-rendered pages. The non-rendered pages are processed using a low resolution replica of the virtual device for the next page to be rendered on the flat to ensure that any marks generated by the processing do not overwrite a portion of the flat 456 that is already imaged.

The MakeNull procedure creates a low resolution replica of the virtual device by scaling the components of the virtual [CTM]. Further, the MakeNull procedure positions the scaled-down virtual device in the middle of the original virtual device. This ensures that the scaled-down virtual device will be completely contained within the clipping path defining the original virtual device.

As explained earlier, by definition, the virtual [CTM] contains the components [a b c d $t_x$ $t_y$] and specifies a transformation of the coordinates (x, y) in user space to the coordinates (x', y') in device space as follows:

$$x' = ax + cy + t_x$$

$$y' = bx + dy + t_y.$$

The Postscript® language includes a scale operator which creates a temporary matrix from supplied x and y scale factors and concatenates the temporary matrix with the current [CTM]. The scale operator then replaces the current [CTM] with the resultant matrix.

Invoking the PostScript® scale operator with x and y scale factors ($s_x$ and $s_y$) as operands, the scaled [CTM]=[$s_x$a $s_x$b $s_y$c $s_y$d $t_x$ $t_y$]. Thus, the new transformation from user to device space specified by the scaled [CTM] is given by:

$$x' = s_x ax + s_y cy + t_x \quad (1)$$

$$y' = s_x bx + s_y dy + t_y. \quad (2)$$

The exact scale factors sx and sy may vary according to the type of Postscript® RIP 82 used. However, a 1 to 1 ratio between user and device space coordinates leads to significantly faster processing of pages over normal processing on a high resolution device. Also, the Postscript® nulldevice operator installs a [CTM] with a 1 to 1 ratio of user to device coordinates. Therefore, although the scale factors could be tuned for optimal performance on a given Postscript® RIP 82, it is assumed that a 1 to 1 ratio between user and device space coordinates will run with reasonable efficiency on any Postscript® RIP 82. Thus, the scale factors s, and sy used by the MakeNull procedure are preferably calculated to achieve a 1 to 1 ratio between user and device space as follows.

To achieve a 1 to 1 ratio between user and device space coordinates with only the scale factors, the unit vector in user space from coordinate points (0,0) to (1,0) and from (0,0) to (0,1) must have unit length in device space. Therefore, $$|(x'(1,0), y'(1,0)) - (x'(0,0), y'(0,0))| = 1 \quad (3)$$

and $$|(x'(0,1), y'(0,1)) - (x'(0,0), y'(0,0))| = 1. \quad (4)$$

From equations (1) and (3), $$|(s_x a + t_x, s_x b + t_y) - (t_x, t_y)| = 1$$

$$|(s_x a, s_x b)| = 1$$

$$((s_x a)^2 + (s_x b)^2)^{1/2} = 1$$

Thus, $s_x = 1/(a^2 + b^2)^{1/2}$.
Similarly, $s_y = 1/(c^2 + d^2)^{1/2}$.

Figure 30:
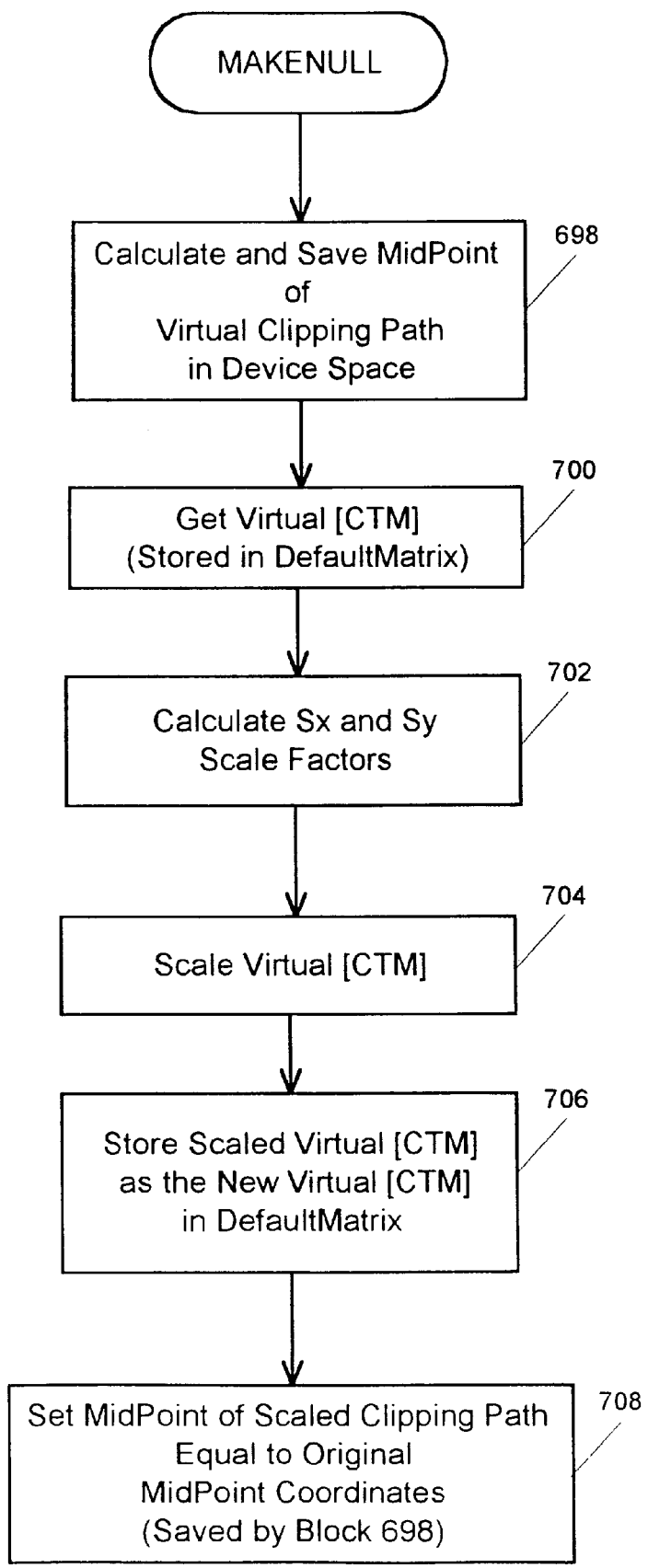
FIG. 30 is a flowchart illustrating the program steps implemented by the MakeNull procedure according to the imposition-on-the-fly procedures.

FIG. 30 illustrates the program steps implemented by the MakeNull procedure. A block 698 first determines and saves the device space coordinates of the midpoint of the virtual clipping path. The midpoint (mpx, mpy) is determined by first retrieving the corner coordinates of the virtual clipping path, which are stored in the variables ClipllX, ClipurX, ClipllY, and ClipurY. The x-axis midpoint (mpx) is calculated by adding the lower left and upper right x-axis corner coordinates (ClipllX and ClipurX) and dividing by two. Similarly, the y-axis midpoint (mpy) is calculated by adding the y-axis corner coordinates (ClipllY and ClipurY) and dividing by two. After the midpoint is calculated, the standard PostScript® transform operator (renamed "systemdict_transform") is executed to convert the user space coordinates to device space coordinates.

Next, a block 700 gets the virtual [CTM] which is stored in the variable DefaultMatrix. A block 702 then calculates the scale factors, s, and sy, as specified above and a block 704 applies the scale factors to the virtual [CTM]. A block 706 then saves the scaled virtual [CTM] as the new virtual [CTM] in the variable DefaultMatrix.

A block 708 then sets the midpoint of the scaled clipping path (specified by the new virtual [CTM]) to correspond with the coordinates of the midpoint of the original clipping path (saved by the block 698). The block 708 determines the difference between the saved midpoint coordinates and the new midpoint coordinates and then translates the new coordinates by that difference.

The MakeNull procedure may be implemented by the following code:

```
/MakeNull {
    impositiondict begin
    ClipllX ClipurX add 2 div ClipllY ClipurY add 2 div
```

```
           systemdict_transform
    /mpy exch def                       % calculate
    /mpx exch def                       % midpoint
    DefaultMatrix
    dup
    dup dup
    dup 0 get dup mul                   % compute a²
    exch 1 get dup mul                  % compute b²
    add 1 exch div sqrt dup 1.0 gt      % compute sₓ
       { pop 1.0 } if exch
    dup 2 get dup mul                   % compute c²
    exch 3 get dup mul                  % compute d²
    add 1 exch div sqrt dup 1.0 gt      % compute s_y
       { pop 1.0 } if
    Matrix scale                        % scale matrix
    exch Matrix2 concatmatrix           % save as the new
    systemdict_setmatrix                % virtual default
                                        % matrix
    ClipllX ClipurX add 2 div ClipllY ClipurY add 2 div
       systemdict_transform
    /mpy exch mpy sub neg def           % translate
    /mpx exch mpx sub neg def           % midpoint
    mpx mpy systemdict_idtransform translate
    systemdict_currentmatrix pop
    end
} bind def
```

The Redefined EndPage Procedure

The page descriptions contained in the merged PostScript® file 450 all include the showpage operator, which will invoke the redefined EndPage and BeginPage procedures.

The redefined EndPage procedure updates the CurrentPage variable, which represents the number of the next page in the merged PostScript® file 450 that should be imposed and rendered on the flat. The redefined EndPage procedure also calls the setvirtualdevice and MakeNull procedures for the pages to be interpreted.

Figure 31:
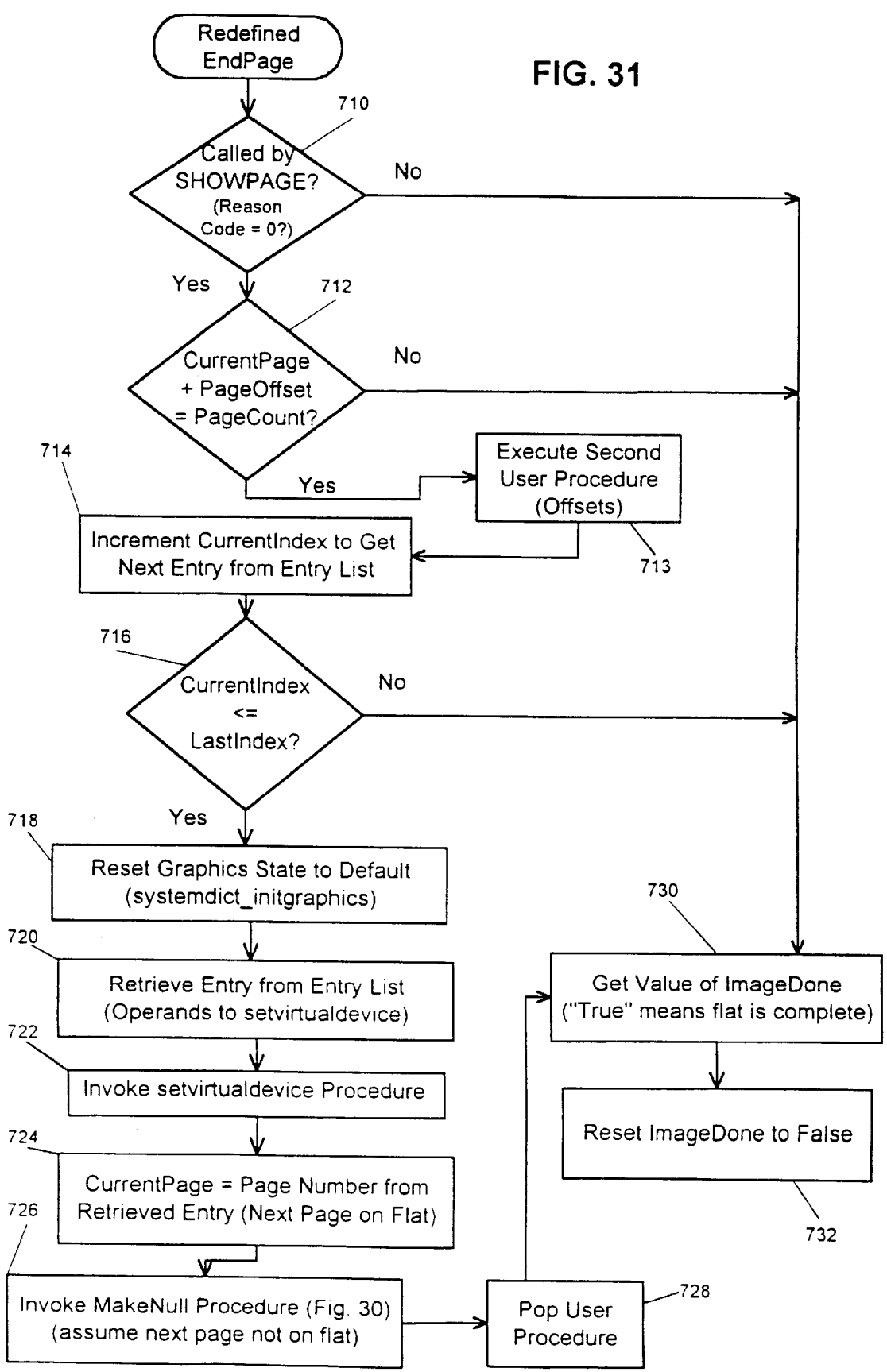
FIG. 31 is a flowchart illustrating the program steps implemented by the redefined EndPage procedure according to the imposition-on-the-fly procedures.

FIG. 31 is a flowchart illustrating the program steps implemented by the redefined EndPage procedure. A block 710 determines whether the EndPage procedure was called by the showpage operator by determining whether the reason code is 0. A block 712 compares CurrentPage plus PageOffset to PageCount to determine whether the current page in the PostScript® file should be imposed and rendered on the flat 456.

Assuming both of the blocks 710 and 712 are true, a block 713 set ups the default environment by calling the standard initgraphics operator (now renamed "systemdict_initgraphics"). The block 713 then retrieves and executes the second user procedure (containing, for example, the offset instructions) from the current entry. If the second user procedure contains offset instructions, the Postscripts file will be repositioned to the start of the next page to be included in the book, thereby skipping processing of any irrelevant pages. If the second user procedure contains other instructions (such as barcodes, watermarks, etc.), they will also be executed.

Next, a block 714 increments the pointer CurrentIndex, which will be used to retrieve the next entry from the entry list (PageList). The decision-making block 716 then determines whether there is another entry in the instruction set by comparing CurrentIndex to LastIndex.

If CurrentIndex is less than or equal to LastIndex, a block 718 resets the graphics state to its system default value by calling the standard PostScript® initgraphics operator (now renamed "systemdict_initgraphics"). A block 720 then uses CurrentIndex to retrieve the next entry in the entry list to place the operands for the setvirtualdevice procedure on the Operands stack and a block 722 invokes the setvirtualdevice procedure.

A block 724 then sets CurrentPage equal to the number of the page from the retrieved entry. CurrentPage is now updated to contain the number of the next page from the merged Postscripts file 450 that should be imposed and rendered on the flat 456.

Next, a block 726 invokes the MakeNull procedure to set up the low resolution virtual device for processing of non-rendered pages. The MakeNull procedure is called because it is assumed that the next page in the merged PostScript® file 450 will not be rendered on the flat 456. (If the next page should be rendered on the flat, the redefined BeginPage procedure, described in detail below, will establish the virtual device for that page). A block 728 then removes the user procedure (which is contained in the retrieved entry) from the Operands Stack.

If any of the blocks 710, 712 or 716 are false, or after the block 728 pops the user procedure, a block 730 places the value of the variable ImageDone on the stack. If ImageDone has the value of true, indicating that the flat is completed, the calling of the EndPage procedure (i.e., by the showpage operator or for new device activation) will automatically transfer the contents of the raster memory 452 to the demand printer 84 to physically render the selected pages on the flat 456. (See FIG. 19).

A block 732 then resets ImageDone to false to specify that the flat is not completed and the contents of the raster memory 452 will not yet be transferred to the demand printer 84 for physical rendering.

The redefined EndPage procedure may be implemented by the following code:

```
/EndPage {
    impositiondict begin
        0 eq
        exch
        CurrentPage PageOffset add eq
        and {
            systemdict_initgraphics
            PageList CurrentIndex get
            5 get exec
            /CurrentIndex CurrentIndex 1 add def
            CurrentIndex LastIndex le {
                systemdict_initgraphics
                PageList CurrentIndex get
                aload pop
                setvirtualdevice
                /CurrentPage exch def
                MakeNull
                pop
            } if
        } if
        ImageDone
        /ImageDone false def
    end
} bind def
```

The Redefined BeginPage Procedure

Figure 32:
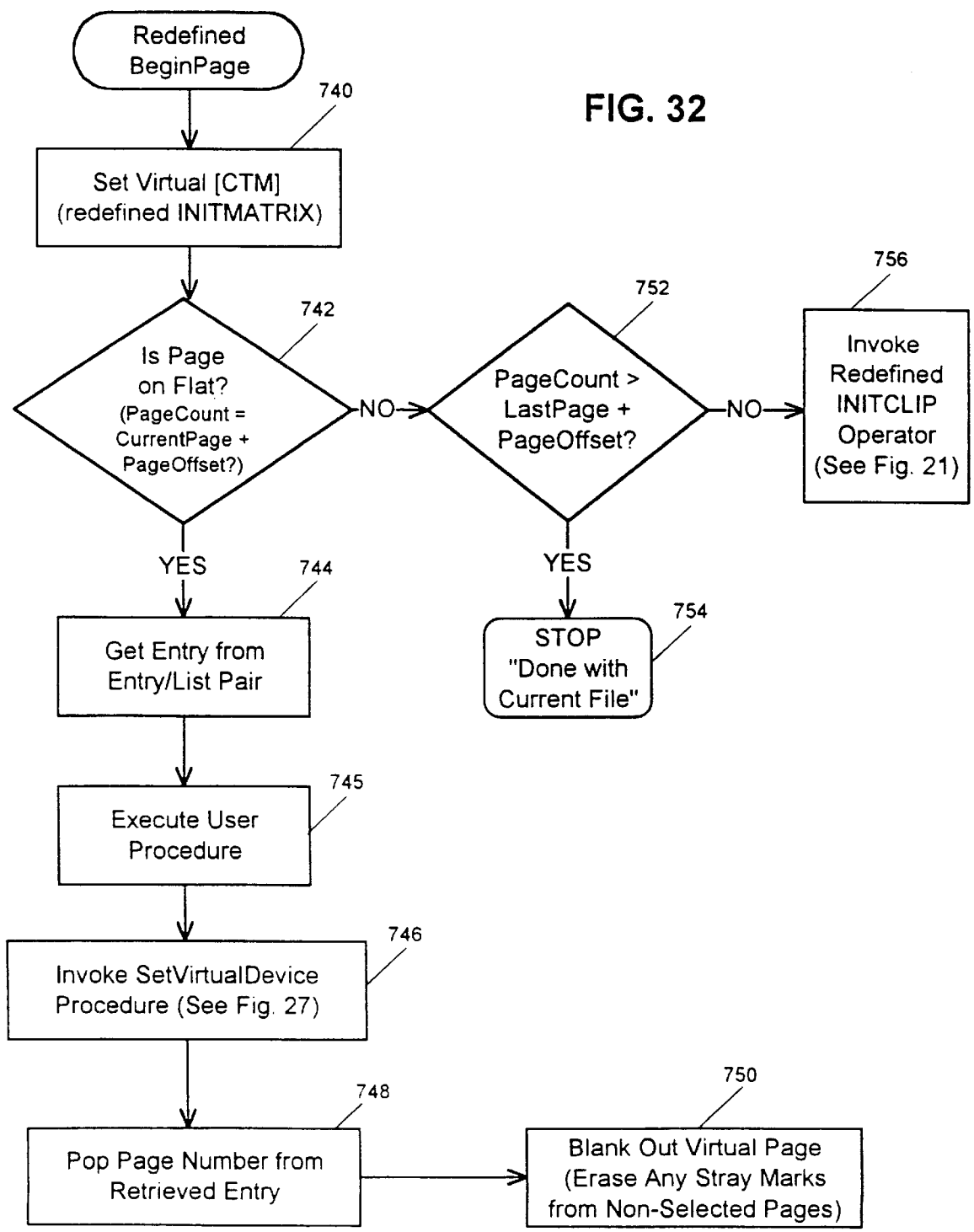
FIG. 32 is a flowchart illustrating the program steps implemented by the redefined BeginPage procedure according to the imposition-on-the-fly procedures.

FIG. 32 is a flowchart illustrating the program steps implemented by the redefined BeginPage procedure. A block 740 first calls the redefined initmatrix operator to set the virtual [CTM].

Referring also to FIG. 20, the BeginPage procedure receives PageCount as an operand from the showpage operator. A decision-making block 742 compares CurrentPage (which was updated by the block 724 of the redefined EndPage procedure of FIG. 31) to PageCount. CurrentPage contains the number of the next page in the PostScript® file to be rendered on the flat 456. Thus, if CurrentPage and PageCount are equal, the current page in the merged PostScript® file 450 should be imposed and rendered on the flat 456 and a block 744 retrieves the next entry (containing the user procedures, page number and setvirtualdevice operands) from the entry list.

A block 745 then executes the user procedure from the retrieved entry and a block 746 invokes the setvirtualdevice procedure to set up the virtual [CTM] and clipping path for the virtual device (see FIG. 27). A block 748 then pops the page number from the retrieved entry.

Next, a block 750 "blanks out" the virtual page by coloring the area inside of the clipping path white. This is necessary to erase any stray marks that may have been placed on the page when the non-rendered pages were processed using the MakeNull procedure.

Alternatively, if the block 742 determines that the next page in the merged PostScript® file 450 should not be rendered on the flat (i.e. CurrentPage is not equal to PageCount), a decision-making block 752 compares Page-Count to LastPage plus PageOffset. If PageCount is greater than LastPage plus PageOffset, subsequent pages in the PostScript® file do not need to be interpreted because they are beyond the last page that should be rendered on the flat 456. Thus, a block 754 stops the execution of the merged PostScript® file 450. As explained earlier, the ImposeFile procedure executes the merged PostScript® file 450 in stopped context. In order to distinguish between the expected stop in the block 754 and an unexpected stop caused, for example, by a PostScript® error, the string "done with current file" is generated by the block 754 of the redefined BeginPage procedure. Referring also to FIG. 27, the block 386 of the ImposeFile procedure checks for the "done with current file" string to determine when to proceed to the block 688 to flush and close the merged Postscript® file 450.

Alternatively, if the block 752 determines that PageCount is less than or equal to LastPage plus PageOffset (i.e. the current page is before the last page to be rendered on the flat), a block 756 calls the redefined initclip operator to reset the virtual clipping path. (See FIG. 20).

The redefined BeginPage procedure may be implemented by the following code:

```
/BeginPage {
    initmatrix
    impositiondict begin
    dup
    CurrentPage PageOffset add eq {         % page on flat
        pop                                 % PageCount
        PageList CurrentIndex get           % get entry
        aload pop
        5 -1 roll
        exec                                % execute user procedure
        setvirtualdevice
        pop                                 % pop the page number
        clippath 1 setgray fill             % blank out virtual
                                            % page
        0 setgray newpath
    } bind {
                                            % page not on
                                            % flat
        LastPage PageOffset add gt {
            end (done with current file) stop } if
        initclip
    } ifelse
    end
} bind def
```

The ImageDone Variable

As explained earlier, the variable ImageDone is a boolean variable used to indicate when all the pages for the current flat 456 have been interpreted and painted into the raster memory 452 such that the flat 456 can be physically rendered by the demand printer 84. ImageDone is initially and normally set to false, indicating that the current flat 456 has not yet been completed. However, referring to FIG. 26, after all the file/list pairs from the instruction set have been processed by the Imposejob procedure, the block 658 sets ImageDone to true to indicate that the flat is completed. Also, the user procedure contained in the last entry in a file/list pair in the instruction set could include an instruction to set ImageDone to true to specify that the current flat is completed.

The ImageDone variable is used by the redefined EndPage procedure. Referring to FIGS. 20 and 31, the block 730 of the redefined EndPage procedure returns the value of ImageDone to the block 502 of the showpage operator. If ImageDone is true, the block 504 transmits the contents of the raster memory to the demand printer to render the current flat.

The ImageDone variable may be utilized to allow for multiple flats to be rendered by a single file/list pair in the instruction set (see Appendix I sample instruction set).

The Showdevice Procedure

The imposition-on-the-fly procedures may include an additional procedure, called, for example, "showdevice," which uses the ImageDone variable to allow a user to render the flat at any time. The showdevice procedure sets Image-Done to true and then calls the showpage operator, which will invoke the redefined EndPage procedure and render the current flat, as described above. The showdevice procedure may be implemented by the following code:

```
/showdevice {
    impositiondict /ImageDone true put
    showpage
} def
```

The showdevice procedure will normally be used when a user implements the setvirtualdevice (and related) procedures in a non-imposition application in which the Impose-Job and ImposeFile procedures are eliminated. For example, the showdevice procedure could be implemented to render any selected page(s) contained in the merged Postscript® file 450.

Optional Imposition-on-the-Fly Procedures

Optionally, additional procedures may be included in the imposition-on-the-fly procedures which will allow the proper imposition of page descriptions using the Post-Script® save and restore operators.

The PostScript® save operator takes a "'snapshot" of the state of virtual memory, which stores all values of composite objects, such as strings and arrays. Many of the variables used by the imposition-on-the-fly procedures of the present invention are stored in virtual memory. The save operator also saves the current graphics state by pushing a copy of the current graphics state onto the Graphics State Stack. The PostScript® restore operator restores the virtual memory and the current graphics state to the state at the time the corresponding save operator was executed.

The Postscript® gsave operator pushes a copy of the current graphics state onto the Graphics State Stack and the PostScript® restore operator pops the saved graphics state from the Graphics State Stack and restores it as the current graphics state. The PostScript® grestoreall operator restores either the bottom-most graphics state stored on the Graphics State Stack or the first graphics state that was stored by the save operator (as opposed to the gsave operator). The elements of the current graphics state affected by these operators include the current [CTM], clipping path and current path. However, they do not affect the contents of the raster memory 452.

The PostScript® save and restore operators may adversely affect the imposition-on-the-fly procedures of the present invention, as well as on other imposition methods. The problem arises if a page description in the merged PostScript® file 450 invokes a save operator, which will save the [CTM] that specifies the desired position for that page on the device. If a subsequent page description invokes a restore operator, the [CTM] for the prior page will replace the [CTM] for the subsequent page. Thus, the subsequent page will be incorrectly positioned on the flat 456.

To overcome this problem, two new procedures (Vsave and Vrestore) are used in connection with the above-described procedures. The Vsave and Vrestore procedures will be used to redefine the PostScript® save and restore operators such that they do not interfere with the other imposition-on-the-fly procedures of the present invention.
The Vsave Procedure Generally, the Vsave procedure appends the page size components (PageX and PageY) and the virtual [CTM] components (which define the virtual device) to the current path, which will be saved by the PostScript® save operator. Later, the Vrestore procedure will retrieve these components, remove them from the current path, and use them to generate the correct clipping path, page orientation and [CTM] for the restored page.

Figure 33:
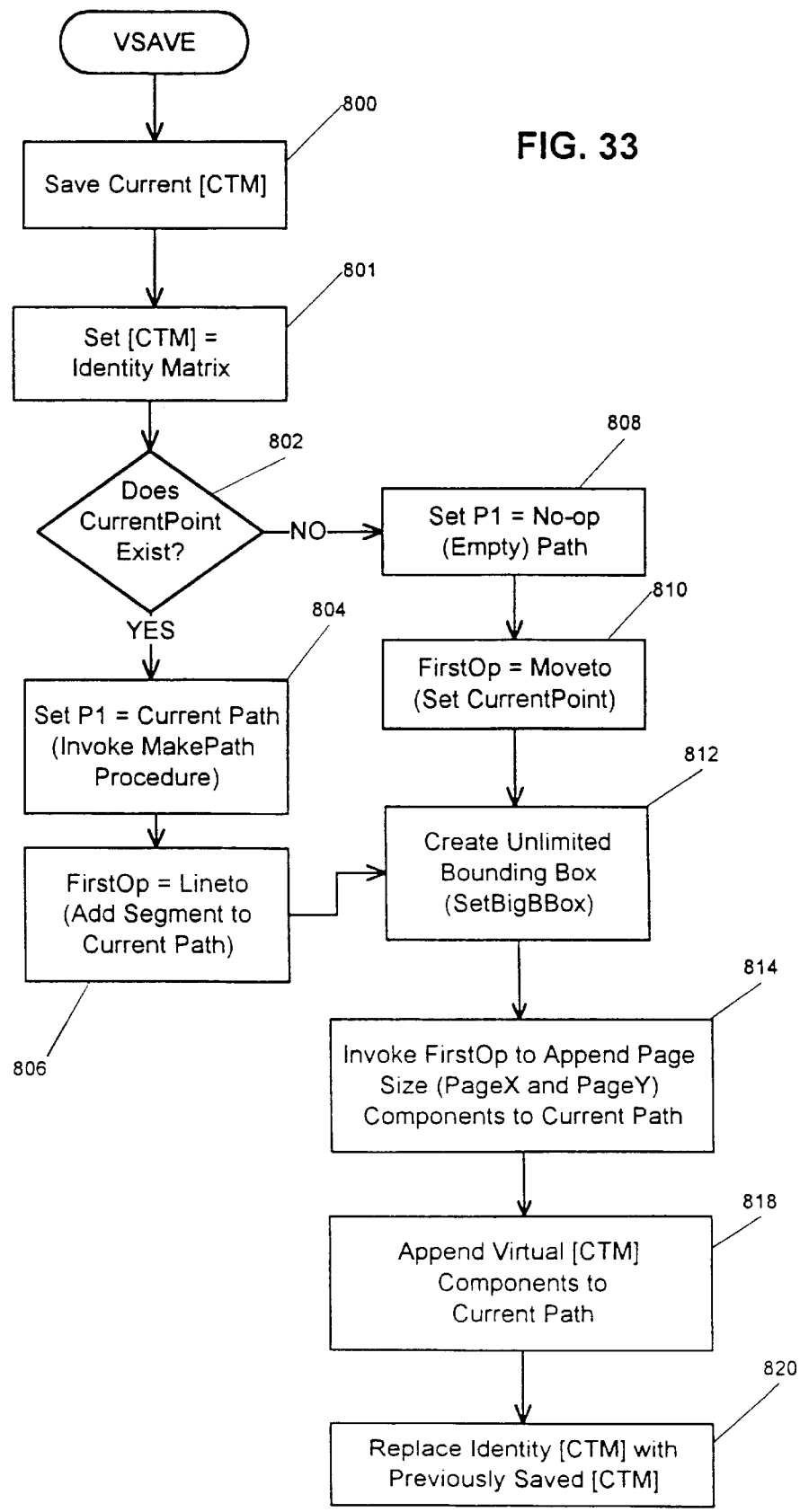
FIG. 33 is a flowchart illustrating the program steps implemented by the Vsave procedure according to the imposition-on-the-fly procedures.

FIG. 33 is a flowchart illustrating the program steps implemented by the optional Vsave procedure. A block 800 saves a copy of the current [CTM] and then a block 801 sets the [CTM] equal to an identity matrix ([1 0 0 1 0 0]).

The identity matrix is used because all points used to describe the current path are specified in user space coordinates. However, at the time a Postscript® program enters a point into the current path, each coordinate is transformed into device space according to the [CTM]. Thus, the identity matrix will be used when adding the components to the current path to avoid any round off errors that may occur in this conversion from user space to device space.

A decision-making block 802 then determines whether a currentpoint is defined. If a currentpoint is defined, a block 804 sets the variable pi equal to the current path. This may be accomplished by invoking the previously defined MakePath procedure, which creates a description of the current path in the current coordinate system. (The MakePath procedure was described above in connection with the block 524 of the redefined initclip operator of FIG. 20).

A block 806 then defines a variable called, for example, "firstop" to be the PostScript® lineto operator. By definition, the PostScript® lineto operator adds a straight line segment to the current path by connecting the previous current point to the new one.

Alternatively, if the block 802 determines that no currentpoint exists, a block 808 sets p1 equal to an empty path. A block 810 then defines firstop to be the Postscript® moveto operator, which establishes a new currentpoint.

After firstop is defined by either the block 806 or the block 810, a block 812 creates an "unlimited" bounding box for the current path. A bounding box, which is normally established by the PostScript® setbbox operator, defines the area in which the current path coordinates must fall. The operands to the setbbox operator are the user space coordinates of the lower-left and upper-right corners of the bounding box. Since the page size and [CTM] components will be added to the current path during the Vsave procedure, the bounding box must be set large enough to encompass the "points" defined by those components. Thus, a previously defined procedure called, for example, "SetBigBBox," may be invoked to set the bounding box to be the largest possible. The SetBigBBox procedure may be implemented by the following code:

```
/SetBigBBox /setbbox where {
    pop {
        -2147483648 -2147483648 2147483648 2147483648
        setbbox
    } bind def
} {
{
} def
} ifelse
```

After the large bounding box is set, a block 814 invokes the firstop operator (defined by the block 806 or the block 810) to append the page size components (PageX and PageY) to the current path. Next, a block 818 appends the virtual [CTM] components (stored in the variable DefaultMatrix) to the current path. A block 820 then replaces the identity [CTM] with the [CTM] that was saved by the block 800.

The Vsave procedure may be implemented by the following code:

```
/Vsave {
    Matrix systemdict_currentmatrix
    dup
    Identity systemdict_setmatrix        % [CTM] =
                                         % identity
    { currentpoint} stopped {            % no current
                                         % point
    /p1 { } def                          % define empty
                                         % path
            /firstop { moveto } def
            } {                          % current point
            pop pop                      % create real
                                         % path
        /p1 MakePath def
        /firstop { lineto } def
        } ifelse
    SetBigBBox
    PageX PageY firstop                  % append page
                                         % size
    DefaultMatrix
    aload pop
    lineto                               % append [CTM]
    lineto
    lineto
    systemdict_setmatrix
} bind def
```

The Vrestore Procedure

The Vrestore procedure retrieves the page size and virtual [CTM] components (which defined the virtual device) appended to the current path by the Vsave procedure and uses them to generate the correct clipping path, page orientation and virtual [CTM] for the restored page.

Figure 34:
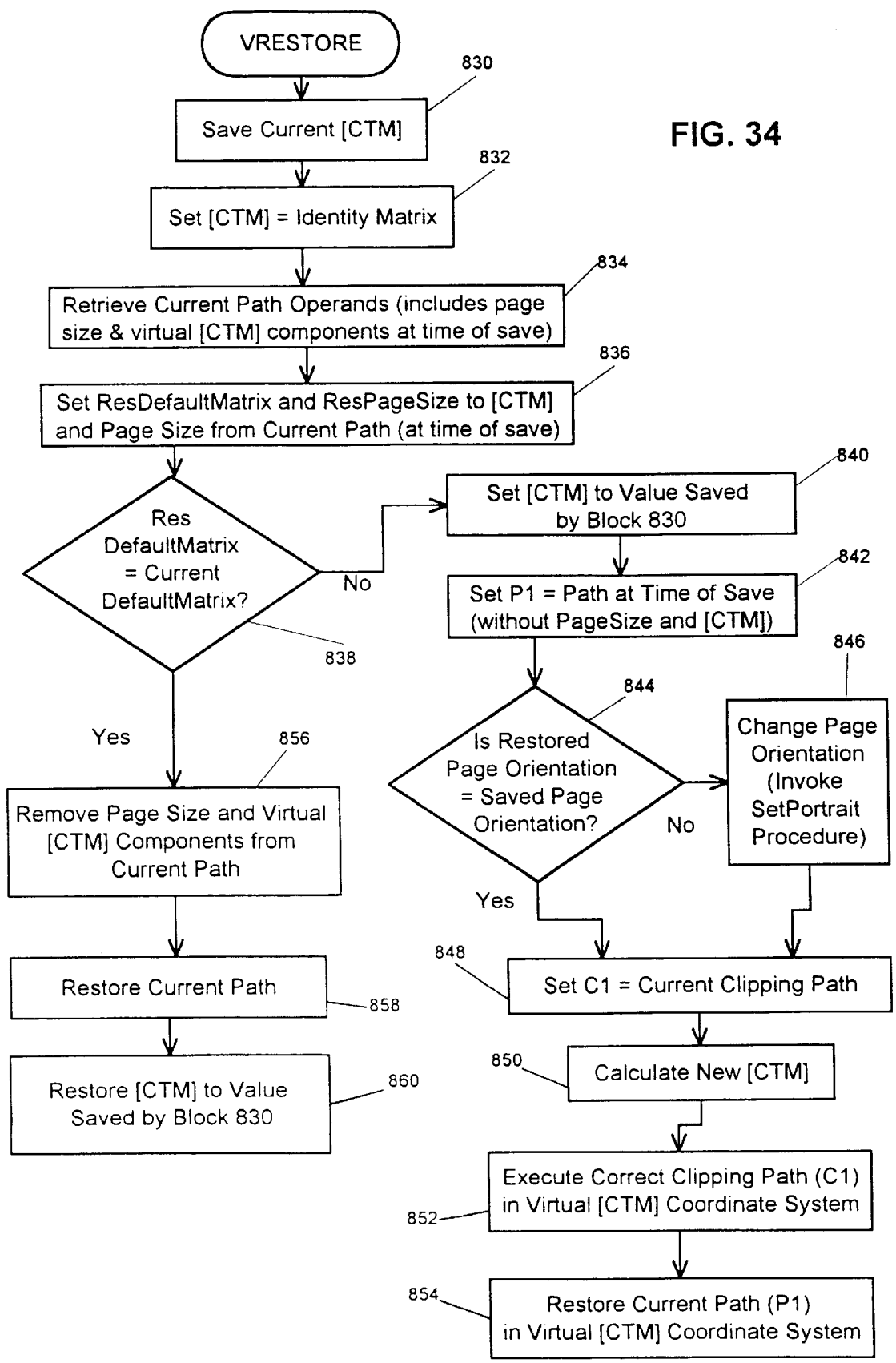
FIG. 34 is a flowchart illustrating the program steps implemented by the Vrestore procedure according to the imposition-on-the-fly procedures.

FIG. 34 is a flowchart illustrating the program steps implemented by the Vrestore procedure. A block 830 saves the current [CTM] and a block 832 then sets the [CTM] to an identity matrix. As in the Vsave procedure, the use of the identity [CTM] will avoid any round off errors when transforming coordinates from user space to device space in the current path.

A block 834 then retrieves the elements of the current path by calling the Postscript® pathforall operator, which pushes the user space coordinates of each path element onto the Operands stack. The retrieved elements will include the page size and virtual [CTM] components that were appended to the path by the Vsave procedure. A block 836 then performs various stack manipulation operations to place the page size and virtual [CTM] components on top of the stack. The block 836 then stores the components in variables called, for example, "ResDefaultMatrix," "ResPageX" and "ResPageY," which represent the page size and virtual [CTM] at the time that the Postscript® save operator was called.

Next, a decision-making block 838 compares the ResDefaultMatrix (at time of save) to the current virtual [CTM] (at time of restore), which is saved in the variable DefaultMatrix. The equivalency of the matrices may be easily determined by using a previously defined utility routine, called, for example, "EqualMatrix," which performs a component-by-component comparison of the two matrices, allowing for a slight floating point round-off error. If the two matrices are equivalent, the EqualMatrix routine returns a true on the stack; if they are not equivalent, the EqualMatrix routine returns a false. The EqualMatrix routine may be implemented by the following code:

```
/EqualMatrix {
    true
    impositiondict begin
    /Count 0 def
    6 { 1 index Count get 3 index Count get
        eq
        sub abs .0001 lt and
        /Count Count 1 add def } repeat
    3 1 roll pop pop
    end
} bind def
```

If the block 838 determines that the restored [CTM] and current [CTM] are not equivalent, it is assumed that the save operator was called during interpretation of one page and the restore operator was called during interpretation of another page. A block 840 then sets the [CTM] back to the value saved by the block 830. Next, a block 842 calls p1, which contains the current path at the time the save operator was called. The block 842 then removes the page size and [CTM] components that were added to the current path and sets p1 equal to the remaining path elements.

The blocks 830–842 of the Vrestore procedure may be implemented by the following code:

```
/Vrestore {
    Matrix systemdict_currentmatrix
    Identity systemdict_setmatrix
    mark
    {} {} {} {} pathforall
    6 2 roll
    4 2 roll
    mark 7 1 roll
    ] /ResDefaultMatrix exch def
    /ResPageY exch def
    /ResPageX exch def
    cleartomark
    DefaultMatrix ResDefaultMatrix EqualMatrix not
    {
        systemdict_setmatrix
        /p1 mark
        MakePath aload pop
        pop pop pop
        pop pop pop
        pop pop pop
```

-continued

```
        pop pop pop
    ] cvx def
```

Next, a decision-making block 844 determines the orientation of the restored page by comparing ResPageX to ResPageY. If ResPagex is greater than ResPagey, a variable called ResPortrait is set to false to indicate a landscape orientation. Alternatively, if ResPagex is less than ResPageY, the variable ResPortrait is set to true to indicate a portrait orientation. The block 844 then compares ResPortrait (the restored page orientation) to Portrait (the saved page orientation). If the page orientation has changed (ResPortrait and Portrait are not equal), a block 846 calls the SetPortrait procedure to change the orientation of the device. (See FIGS. 25 and 26A&B).

The blocks 844 and 846 of the Vrestore procedure may be implemented by the following code:

```
ResPageX ResPageY gt {
    /ResPortrait false def
} {
    /ResPortrait true def
} ifelse
ResPortrait Portrait ne {
    SetPortrait
} if
```

If the block 844 determines that the orientation is the same, or after the block 846 corrects the orientation, a block 848 saves the procedures for generating the current clipping path in a variable called, for example, "c1," by calling the MakePath procedure.

A block 850 then calculates the new [CTM] by determining the accumulation of operations applied on the restored virtual [CTM] and applying those operations on the current virtual [CTM]. The block 850 calculates the new [CTM] by first getting the current [CTM], which may be considered the result of the restored virtual [CTM] (i.e., the virtual [CTM] restored from the save operator) concatenated with an operations matrix. The block 850 then calculates the operations matrix by concatenating the current [CTM] with the inverse of the restored virtual [CTM]. The operations matrix is then concatenated with the current virtual [CTM] to generate the new [CTM]. Thus, the block 850 assumes that:

[current CTM]=[operations] [restored virtual CTM].

Further, the block 850 performs the following operations:

[operations]=[current CTM] [restored virtual CTM]$^{-1}$;

and

[new CTM]=[operations] [current virtual CTM].

The blocks 848 and 850 of the Vrestore procedure may be implemented by the following code:

```
clippath                            % generate clip path procedures
/c1 MakePath def
Matrix systemdict_currentmatrix     % calculate new
ResDefaultMatrix                    % [CTM]
Matrix2 invertmatrix
```

```
        Matrix3 concatmatrix
        DefaultMatrix Matrix4 concatmatrix
            systemdict_setmatrix
```

A block 852 then regenerates the clipping path (saved in c1) and a block 854 regenerates the current path (saved in p1) in the new coordinate system specified by the new [CTM]. The blocks 852 and 854 may be implemented by the following code:

```
            systemdict_initclip
            newpath
            c1
            clip newpath
            p1 }
```

Alternatively, if the block 838 determines that the restored virtual [CTM] is equivalent to the current virtual [CTM] (i.e., the save and restore operators were called on the same page), a block 856 simply removes the page size and virtual [CTM] components from the current path. A block 858 then restores the current path and a block 860 sets the [CTM] back to the value saved by the block 830.

The blocks 856–860 may be implemented by the following code:

```
            {
            /pl mark
            MakePath aload pop
            pop pop pop
            pop pop pop
            pop pop pop
            pop pop pop
            ] cvx def
            newpath
            p1
            systemdict_setmatrix
            } ifelse
        } bind def
```

The Redefined PostScript® Save Operators

The postscripts save operators (which include save and gsave) are redefined to invoke the Vsave procedure. Before the operators are redefined, however, they are renamed ("systemdict_operator," for example) because their normal operation is defined in the systemdict dictionary. The save operators may be renamed by the following code:

\systemdict_save systemdict \save get def
\systemdict_gsave systemdict \gsave get def The Postscript® save and gsave operators are then redefined. FIG. 35 is a flowchart illustrating the program steps implemented to redefine the PostScript® save operators. A block 872 first invokes the Vsave procedure, which was described above in connection with FIG. 33. The Vsave procedure saves the current path in p1 and then appends the page size and virtual [CTM] components to the current path.

A block 874 then invokes the standard Postscript® save (or gsave) operator (now renamed "systemdict_save" or "systemdict_gsave"). The save operator performs its standard function of saving the current state of virtual memory and the current graphics state, including the current path (which now includes the page size and virtual [CTM] components). The gsave operator performs its standard function of saving the current graphics state.

Next, a block 876 sets the [CTM] to an identity matrix. As before, this will eliminate any round off errors in the current path. A block 878 then restores the current path to the path stored in p1 (the path without the added page size and virtual [CTM] components) and a block 880 restores the [CTM] back to the virtual [CTM].

The blocks 870–880 for redefining the Postscript® save operator may be implemented by the following code:

```
            /save {
                impositiondict begin
                Vsave
                systemdict_save
                Identity systemdict_setmatrix
                newpath
                p1
                exch systemdict_setmatrix
                end
            } bind def
```

Similarly, the PostScript® gsave operator may be redefined by implementing the following code:

```
            /gsave {
                impositiondict begin
                Vsave
                systemdict_gsave
                Identity systemdict_setmatrix
                newpath
                p1
                systemdict_setmatrix
                end
            } bind def
```

The Redefined PostScript® Restore Operators

The PostScript® restore operator must also be renamed and redefined to invoke the Vrestore procedure. Like the save operators, the restore operator is renamed, for example, "systemdict_restore," by the following code:

\systemdict_restore systemdict \restore get def

Because the PostScript® save and restore operators affect the contents of virtual memory and the graphics state, the values of many variables used during the imposition and setvirtualdevice procedures may be inadvertently altered by the use of these operators. However, simple values stored on the Operands Stack are not affected. Therefore, the PostScript® restore operator is redefined to protect the values of the variables stored in virtual memory by saving them on the Operands Stack before calling the standard PostScript® restore operator.

FIG. 36 is a flowchart illustrating the program steps implemented by the redefined restore operator. A block 892 places the values of all the imposition variables stored in virtual memory on the Operands stack so their values are not overwritten by the restore operator. Then, a block 894 calls the standard restore operator (now renamed "systemdict_restore"). A block 896 then puts the values of the variables on the Operands stack back to their pre-restore values. Lastly, a block 898 invokes the Vrestore procedure.

The blocks 892–898 of the redefined restore operator may be implemented by the following code:

```
/restore {
    impositiondict begin
```

```
      ImageDone             % put variables on stack
      CurrentIndex
      CurrentPage
      PageCount
      Portrait
      PageX
      PageY
      ClipllX
      ClipllY
      ClipurX
      ClipurY
      mark DefaultMatrix    % put [CTM] components on
      aload pop             % stack
      19 −1 roll
      systemdict_restore    % call standard restore operator
      ]
      /DefaultMatrix exch def   % replace variables with
      /ClipurY exch def         % pre-restore values
      /ClipurX exch def
      /ClipllY exch def
      /ClipllX exch def
      /PageY exch def
      /PageX exch def
      /Portrait exch def
      /PageCount exch def
      /CurrentPage exch def
      /CurrentIndex exch def
      /ImageDone exch def
      Vrestore              % invoke Vrestore procedure
      end
} bind def
```

The Redefined PostScript® restore Operators

The standard PostScript® restore or grestoreall operators, are renamed, for example, "systemdict_operator." This may be implemented by the following code:

```
      /systemdict_grestore systemdict /grestore get def
      /systemdict_grestoreall systemdict /grestoreall get def
```

Because the PostScript® restore and grestoreall operators affect only the graphics state, it is not necessary to protect the values of any variable stored in virtual memory. Thus, the restore or grestoreall operators are more simply redefined.

FIG. 37 is a flowchart illustrating the program steps implemented by the redefined PostScript® restore and grestoreall operators. A block 902 invokes the renamed standard restore or grestoreall operator and then a block 904 invokes the Vrestore procedure, which will calculate the correct [CTM] and correct the page orientation and clipping path.

The blocks 902–904 for redefining the PostScript® restore operator may be implemented by the following code:

```
      /grestore {
          impositiondict begin
          systemdict_grestore
          Vrestore
          end
      } bind def
```

Similarly, the grestoreall operator may be redefined by implementing the following code:

```
      /grestoreall {
          impositiondict begin
          systemdict_grestoreall
          Vrestore
          end
      } bind def
```

The PostScript® Level 2 Gstate Operators

Level 2 PostScript® implementations support the following three additional operators that affect the current graphics state (and therefore the [CTM]) and that may interfere with the imposition procedures of the present invention: gstate, currentgstate and setgstate. The PostScript® gstate operator creates a new graphics state object (whose initial value is the current graphic state) and pushes it on the Operand stack. The PostScript® currentgstate operator replaces the value of the gstate object with the current graphics state. The PostScript® setgstate operator replaces the current graphics state with the value of the gstate object.

Similarly to the gsave and restore operators described above, the gstate operators are renamed and redefined to invoke the Vsave the Vrestore procedures. The gstate operators may be renamed by the following code:

```
      /gstate where {           % is this level 2?
          pop
          /systemdict_gstate systemdict /gstate get def
          /systemdict_setgstate systemdict /setgstate get
              def
          /systemdict_currentgstate systemdict
              /currentgstate get def
      } if
```

Similar to the redefined gsave operator described above in connection with FIG. 35, the gstate and currentgstate operators are redefined to first invoke the Vsave procedure and then to call the renamed standard gstate or currentgstate operator. The redefined operators then restore the current path without the page size and [CTM] components and reset the virtual [CTM].

Also, like the redefined restore operator described above in connection with FIG. 37, the setgstate operator is redefined to first call the renamed setgstate operator and then to invoke the Vrestore procedure.

The PostScript® level 2 gstate operators may be redefined by the following code:

```
      /gstate where {              % is this level 2?
          pop
          /gstate {                % redefine gstate operator
              impositiondict begin % (like gsave operator)
              Vsave
              systemdict_gstate
              Identity systemdict_setmatrix
              newpath
              p1
              exch systemdict_setmatrix
              end
          } bind def
          /currentgstate {  % redefine currengstate operator
              impositiondict begin    % (like gsave
                                      % operator)
              Vsave
              systemdict_currentgstate
              Identity systemdict_setmatrix
```

```
            newpath
            p1
            exch systemdict_setmatrix
        end
    } bind def
/setgstate {                        % redefine setgstate operator
    impositiondict begin            % (like grestore
                                    % operator)
        systemdict_setgstate
        Vrestore
    end
    } bind def
} if
```

These optional procedures are used when it is anticipated that the page descriptions in the merged PostScript® file 450 may include a save operator in one page description and a restore operator in a subsequent page description. If the optional procedures are used, a slight modification should be made to the setvirtualdevice procedure, described above in connection with FIG. 27. Referring to FIG. 27, an additional block 633 invokes the redefined save operator and then pops the save object from the Operands Stack after the block 632 invokes the EnableVirtualDevice procedure. This is necessary because the restore and grestoreall operators can be called without a corresponding save or gsave operator. If restore is called without a gsave operator, it restores the graphics state from the top of the graphics state stack. If grestoreall is called without a gsave or save operator, it restores either the graphics state from the bottom of the graphics state stack or the graphics state saved by the last save operator. If the topmost save object was created prior to the redefinition of the save operator, the saved current path will not include the additions of the page size and [CTM] components and, therefore, will not operate properly with the redefined restore and grestorall operators. Thus, invoking the redefined save operator at the block 633 of the setvirtualdevice procedure ensures that the restore and grestoreall operators will always restore a saved graphics state compatible with the present invention.

The blocks 630–633 of the setvirtualdevice procedure may be implemented by the following code: VirtualDevice-Enabled not {EnableVirtualDevice save pop}if Also, in some Postscript® applications, interpreting different PostScript® files consecutively may interfere with the operation of the invention. For example, two different Postscript® files may use the same name for variables with different definitions. If the second PostScript® file interpreted does not explicitly initialize the variable, the definition of the variable from the first PostScript® file will be used, interfering with proper interpretation of the second PostScript® file. To overcome this problem, the Imposejob procedure (FIG. 28) may be altered.

Referring to FIG. 28, blocks 653 and 657 are added to the ImposeJob procedure to save the state of virtual memory (which includes many variable definitions) before retrieving a file/list pair from the instruction set and restoring that saved state before retrieving the next file/list pair. Specifically, the block 653 executes the redefined save operator and stores the saved state in a variable called, for example, "SavedState." The blocks 654 and 656 then retrieve a file/list pair from the instruction set and invoke the ImposeFile procedure to process the file/list pair, as described above. However, after the ImposeFile procedure finishes processing each entry in the file/list pair, the block 657 retrieves the saved state stored in the variable Saved-State and executes the redefined restore operator to restore that state. The block 657 thus initializes the virtual memory before the block 654 retrieves the next file/list pair from the instruction set.

The blocks 650–662 of the ImposeJob procedure incorporating the blocks 653 and 657 may be implemented by the following code:

```
/Imposejob                          % impose pages from each input
                                    % file
{
    impositiondict /EnableVirtualDevice get exec
    {
        aload pop pop
        impositiondict /SavedState
            save put                % save state
        impositiondict /ImposeFile
            get                     % call ImposeFile for each
            exec                    % file in instruction set
                                    % cleardictstack
        clear
        impositiondict /SavedState get
            restore                 % restore saved state
    } forall
    impositiondict /ImageDone true put
    impositiondict /systemdict_showpage
    known {                         % Did we redefine showpage
        impositiondict /systemdict_showpage
        get exec                    % If yes, execute it.
        } if
} def
```

Further, as explained earlier, for compatibility with the optional procedures, the PostScript® erasepage operator is redefined by calling the systemdict_gsave and restore operators. All of the remaining imposition-on-the-fly procedures are compatible with the optional procedures.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of controlling a display device to display variable graphics information in graph format, wherein the variable graphics information is provided in a database having a number of fields, each of which represents variable information or variable graphics information, the method comprising the steps of:

(a) developing template page files, each page file having master data representing fixed information and placeholders representing an area of a page for variable information;

(b) selecting areas of the page for the variable graphics information;

(c) specifying graph parameters; and (d) causing the display device to display the pages with the fixed information, selected variable information from the database, and selected variable graphics information from the database, wherein the selected variable graphics information is displayed according to the specified graph parameters.

2. The method of claim 1, wherein the step of causing the display device to display the pages with the selected variable graphics information from the database further comprises executing a graph file to generate a graph.

3. The method of claim 1, wherein the step of selecting the areas of the page for variable graphics information further comprises the steps of:
   (i) creating an image box at a selected area of the page;
   (ii) selecting the fields in the database corresponding to the variable graphics information;
   (iii) layering a text box over the image box;
   (iv) inserting the specified graph parameters and information from the selected database fields into the text box; and
   (v) tagging the text box as containing variable graphics information.

4. The method of claim 3, further comprising the step of inserting an executable graph file into the image box.

5. The method of claim 3, wherein the step of tagging the text box comprises assigning the text box an unusual attribute.

6. The method of claim 3, wherein the step of tagging the text box comprises inserting a text delimiter in the text box.

7. The method of claim 1, wherein the template page files are creating using QuarkXPress®.

8. The method of claim 1, wherein the step of specifying the graph parameters comprises prompting a user to specify the graph type, scaling, labels and other graph parameters.

9. The method of claim 8, further comprising the step of assigning a default value for each graph parameter that the user does not select.

10. The method of claim 1, wherein the step of causing the display device to display the pages further comprises the steps of:
   determining if a page file contains an area selected for variable graphics information; and
   if a page file contains an area selected for variable graphics information, saving the specified graph parameters and selected fields from the database representing variable graphics information, and executing a graph file to generate a graph using the specified graph parameters and selected database fields.

11. The method of claim 1, wherein the display device displays the pages to a remote location over a computer network.

12. The method of claim 1, wherein the display device is a demand printer which prints the pages.

13. The method of claim 1, wherein the database further contains fields specifying variable graph parameters.

14. The method of claim 1, wherein the variable graphics information is displayed as a bar chart and the step of causing the display device to display the pages with selected variable graphics information further comprises the steps of:
   (i) generating a bar chart at the selected area on the page, wherein the chart includes a bar for each database field representing variable graphics information and each bar corresponds to a maximum value of the database entries representing variable graphics information; and
   (ii) analyzing each database field representing variable graphics information and covering a portion of the bar corresponding to that field based on a comparison of the value of that field with the maximum value.

15. The method of claim 14, wherein the portions of the bars are covered using named image boxes, and wherein each named image box corresponds to a name of a database entry.

16. The method of claim 14, wherein the bars on the bar chart are graphic objects.

17. The method of claim 1, wherein the variable graphics information is displayed as a bar chart and the step of causing the display device to display the pages with selected variable graphics information further comprises the steps of:
   (i) generating a bar chart at the selected area on the page, wherein the chart includes an image box for each database entry representing variable graphics information and each image box corresponds to a maximum value of the database fields representing variable graphics information;
   (ii) retrieving the value of each database field representing variable graphics information; and
   (iii) anamorphically scaling each image box to correspond to the value of the database field.

18. The method of claim 17, wherein the image box contains graphic objects.

19. The method of claim 1, the step of causing the display device to display the pages with selected variable graphics information further comprises the steps of:
   (i) retrieving the values of the database fields representing variable graphics information;
   (ii) transferring the database values to a spreadsheet program;
   (iii) generating a graph using the spreadsheet program based on the transferred database values and the specified graph parameters; and
   (iv) linking the graph back to the selected area on the pages.

20. The method of claim 19, wherein the graph parameters are specified in the spreadsheet program.

21. The method of claim 19, wherein the spreadsheet program is Excel®.

22. The method of claim 1, wherein the step of selecting areas of the page for the variable graphics information comprises creating an image box at a selected area of the page and inserting a graph design file into the image box.

23. The method of claim 22, wherein the graph design file specifies the graph size.

24. The method of claim 22, wherein the graph design file specifies fields from database that will be used to generate a graph.

25. The method of claim 24, wherein the specified database fields comprise graph data values and graph attributes.

26. The method of claim 22, wherein the graph design file references an executable external graph engine file and the external graph engine file includes instructions for drawing a graph according to the specified graph parameters.

27. The method of claim 1, wherein step of specifying the graph parameters comprises generating a graph design file.

28. A method of reproducing pages including variable data, wherein the variable data is stored in a database, the method comprising the steps of:
   (a) creating template page files, each page file having fixed information and a placeholder at the location on the page where the variable data will be reproduced;
   (b) specifying graph parameters;
   (c) selecting fields from the database that contain variable graph data;
   (d) tagging the placeholders that correspond to variable graph data;
   (e) layering the specified graph parameters and the selected variable graph data fields from the database over the placeholder corresponding to the variable graph data;
   (f) interpreting the page files, including executing a graph file to generate a graph using the specified graph parameters and variable graph data fields; and
   (g) transmitting the pages to a display device.

29. The method of claim 28, further comprising the step of reproducing the pages over a computer network.

30. The method of claim 28, wherein the display device is a demand printer.

31. The method of claim 28, wherein the page files are generated using QuarkXPress®.

32. The method of claim 28, wherein the placeholder for variable text data is a database field name and the placeholder for variable image data is an image box including a dummy picture file and a database field name.

33. The method of claim 28, wherein the placeholder for variable graphics data is an image box.

34. The method of claim 28, wherein the graph parameters are specified by prompting a user to select various graph parameters.

35. The method of claim 28, wherein the graph parameters are specified by setting the parameters to a default value.

36. The method of claim 28, wherein the placeholder for the variable graphics data is an image box and the specified graph parameters and the selected variable graph data entries from the database are placed in a text box which is layered over the image box.

37. The method of claim 36, wherein the graph file is stored in the image box.

38. The method of claim 28, wherein the variable graph data placeholders are tagged by assigned a unusual attribute to the placeholder.

39. The method of claim 28, wherein the variable graph data placeholders are tagged using a text delimiter.

40. The method of claim 28, wherein the step of interpreting the page files is performed by a page description language (PDL) interpreter and further comprises the steps of:

determining if a page file contains a tagged placeholder for variable graphics data; and if a page file contains a tagged placeholder, invoking a redefined PDL operator to save the graph parameters and fields from the database representing variable graphics data as PDL variables and executing the graph file to generate a graph using the PDL variables.

41. The method of claim 40, wherein the page description language is Postscript® and the redefined operator is the PostScript® show operator.

42. The method of claim 41, wherein if a page file does not contain a tagged placeholder, invoking the standard PostScript® operator.

43. The method of claim 28, further comprising the step of generating an instruction set for imposing selected page files and imposing the pages according to the instruction set while the page files are being interpreted.

44. The method of claim 43, further comprising the step of converting the page files to TIFF format before interpreting the page files.

45. A method of reproducing pages including variable information and variable graphics information, wherein the variable information and variable graphics information is stored in a database, the method comprising the steps of:

(a) creating template page files, each page file having fixed information and a placeholder at the location on the page where the variable information will be reproduced;

(b) specifying which placeholders correspond to variable graphics information;

(c) inserting a graph design file at the specified placeholders corresponding to variable graphics information;

(d) interpreting the page files, including mapping the variable information from the database to the location on the page of the corresponding placeholder and generating a graph according to the graph design file.

46. The method of claim 45, wherein the graph design file specifies the size of the graph.

47. The method of claim 45, wherein the graph design file specifies fields from database that will be used to generate a graph.

48. The method of claim 47, wherein the specified database fields comprise graph data values.

49. The method of claim 47, wherein the specified database fields comprise graph data values and graph attributes.

50. The method of claim 45, wherein the graph design file references an executable external graph engine file that includes instructions for drawing a graph according to the specified graph parameters.

51. The method of claim 45, wherein the graph design file is generated by interactively creating a sample graph.

52. The method of claim 45, wherein the graph design file is in Encapsulated Postscript® (EPS) format.

* * * * *